US010833619B2

(12) United States Patent
McDonald et al.

(10) Patent No.: US 10,833,619 B2
(45) Date of Patent: *Nov. 10, 2020

(54) VARIABLE TORQUE MOTOR/GENERATOR/TRANSMISSION

(71) Applicant: Falcon Power, LLC, Titusville, FL (US)

(72) Inventors: Harley C. McDonald, Merritt Island, FL (US); James L. Bailey, Titusville, FL (US); Matthew C. McDonald, Merritt Island, FL (US)

(73) Assignee: Falcon Power, LLC, Titusville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/109,147

(22) Filed: Aug. 22, 2018

(65) Prior Publication Data

US 2019/0068102 A1 Feb. 28, 2019

Related U.S. Application Data

(60) Continuation of application No. 15/688,036, filed on Aug. 28, 2017, now Pat. No. 10,084,404, which is a
(Continued)

(51) Int. Cl.
*B60L 11/02* (2006.01)
*B61C 9/38* (2006.01)
(Continued)

(52) U.S. Cl.
CPC ............ *H02P 25/188* (2013.01); *B60K 6/26* (2013.01); *B60K 6/48* (2013.01); *B63H 21/14* (2013.01);
(Continued)

(58) Field of Classification Search
CPC .... H02K 21/023; H02K 21/024; H02K 16/04; B60L 15/00
(Continued)

(56) References Cited

U.S. PATENT DOCUMENTS 3,401,290 A 9/1968 Potter
3,973,137 A 8/1976 Drobina
(Continued)

FOREIGN PATENT DOCUMENTS

CA 2652833 A1 8/2010
DE 19960168 A1 6/2001
(Continued)

OTHER PUBLICATIONS

International Search Report and Written Opinion for PCT/US2015/043296, dated Oct. 23, 2015.
(Continued)

*Primary Examiner* — Tulsidas C Patel
*Assistant Examiner* — Thomas K Quigley
(74) *Attorney, Agent, or Firm* — Kevin E. West; Advent, LLP

(57) ABSTRACT

A motor/generator/transmission system includes: an axle; a stator ring having a plurality of stator coils disposed around the periphery of the stator ring, wherein each phase of the plurality of stator coils includes a respective set of multiple parallel non-twisted wires separated at the center tap with electronic switches for connecting the parallel non-twisted wires of each phase of the stator coils all in series, all in parallel, or in a combination of series and parallel; a rotor support structure coupled to the axle; a first rotor ring and a second rotor ring each having an axis of rotation coincident with the axis of rotation of the axle, at least one of the first rotor ring or the second rotor ring being slidably coupled to the rotor support structure and configured to translate along
(Continued)

the rotor support structure in a first axial direction or in a second axial direction.

20 Claims, 41 Drawing Sheets

Related U.S. Application Data continuation of application No. 15/486,727, filed on Apr. 13, 2017, now Pat. No. 9,748,886, which is a continuation-in-part of application No. 15/332,824, filed on Oct. 24, 2016, now Pat. No. 9,819,296, which is a division of application No. 14/815,733, filed on Jul. 31, 2015, now Pat. No. 9,479,037.

(60) Provisional application No. 62/399,907, filed on Sep. 26, 2016, provisional application No. 62/353,413, filed on Jun. 22, 2016, provisional application No. 62/322,052, filed on Apr. 13, 2016, provisional application No. 62/146,725, filed on Apr. 13, 2015, provisional application No. 62/146,694, filed on Apr. 13, 2015, provisional application No. 62/032,468, filed on Aug. 1, 2014.

(51) Int. Cl.

| | |
|---|---|
| *H02P 25/18* | (2006.01) |
| *H02K 21/02* | (2006.01) |
| *H02K 16/04* | (2006.01) |
| *H02K 3/28* | (2006.01) |
| *B63H 23/10* | (2006.01) |
| *B63H 21/20* | (2006.01) |
| *B60K 6/26* | (2007.10) |
| *B60K 6/48* | (2007.10) |
| *B63H 21/14* | (2006.01) |
| *H02K 7/18* | (2006.01) |
| *H02K 19/16* | (2006.01) |
| *H02P 31/00* | (2006.01) |

(52) U.S. Cl.
CPC .............. *B63H 21/20* (2013.01); *B63H 23/10* (2013.01); *H02K 3/28* (2013.01); *H02K 7/183* (2013.01); *H02K 16/04* (2013.01); *H02K 19/16* (2013.01); *H02K 21/024* (2013.01); *H02P 31/00* (2013.01); *B60K 2006/262* (2013.01); *B60K 2006/4808* (2013.01); *B63H 2021/202* (2013.01); *B63H 2021/205* (2013.01); *H02K 2213/09* (2013.01); *Y02T 70/5236* (2013.01); *Y10S 903/906* (2013.01)

(58) Field of Classification Search
USPC ...................... 290/45; 31/112–114, 191, 209
See application file for complete search history.

(56) References Cited

U.S. PATENT DOCUMENTS

| | | |
|---|---|---|
| 4,027,229 A | 5/1977 | Frink |
| 4,093,882 A | 6/1978 | Furuta |
| 4,472,673 A | 9/1984 | Miller |
| 4,734,604 A | 3/1988 | Sontheimer |
| 4,920,293 A | 4/1990 | Kanda |
| 5,019,766 A | 5/1991 | Hsu |
| 5,189,357 A | 2/1993 | Woodson |
| 5,614,777 A | 3/1997 | Bitterly |
| 5,675,203 A | 10/1997 | Schulze |
| 5,763,977 A | 6/1998 | Shimasaki |
| 5,831,366 A | 11/1998 | Kern |
| 5,834,872 A | 11/1998 | Lamb |
| 6,005,317 A | 12/1999 | Lamb |
| 6,166,469 A | 12/2000 | Osama |
| 6,211,591 B1 | 4/2001 | Kowalski |
| 6,242,832 B1 | 6/2001 | Lamb |
| 6,337,527 B2 | 1/2002 | Lamb |
| 6,380,648 B1 | 4/2002 | Hsu |
| 6,492,753 B2 | 12/2002 | Zepp |
| 6,555,941 B1 | 4/2003 | Zepp |
| 6,737,786 B2 | 5/2004 | Hsu |
| 6,759,780 B2 | 7/2004 | Liu |
| 7,482,903 B2 | 1/2009 | Kaumann |
| 7,497,285 B1 | 3/2009 | Radev |
| 7,863,789 B2 | 1/2011 | Zepp |
| 7,965,006 B2 | 6/2011 | Kang |
| 8,269,389 B1 | 9/2012 | Somerville |
| 8,415,910 B2 | 4/2013 | Fulton |
| 8,608,521 B1 | 12/2013 | Snyder |
| 9,479,037 B2 | 10/2016 | Bailey |
| 2002/0163262 A1 | 11/2002 | Hsu |
| 2003/0094929 A1 | 5/2003 | Pendell |
| 2003/0137149 A1 | 7/2003 | Northrup |
| 2005/0104469 A1 | 5/2005 | Zepp |
| 2006/0121139 A1 | 6/2006 | Murb |
| 2007/0096581 A1 | 5/2007 | Zepp et al. |
| 2008/0116759 A1 | 5/2008 | Lin |
| 2008/0197730 A1 | 8/2008 | Himmelmann et al. |
| 2008/0265702 A1 | 10/2008 | Yeh |
| 2008/0272664 A1 | 11/2008 | Flynn |
| 2009/0160392 A1 | 6/2009 | Mularcik |
| 2009/0267434 A1 | 10/2009 | Park |
| 2010/0007225 A1 | 1/2010 | Platon |
| 2010/0013346 A1 | 1/2010 | Peek |
| 2010/0109448 A1 | 5/2010 | Mamba |
| 2010/0213778 A1 | 8/2010 | Knutson |
| 2010/0327791 A1 | 12/2010 | Casey |
| 2011/0227523 A1 | 9/2011 | Grantz |
| 2012/0086380 A1 | 4/2012 | Krieger |
| 2012/0115662 A1 | 5/2012 | Han |
| 2012/0309242 A1* | 12/2012 | Haugland .............. B63H 21/20 440/3 |
| 2012/0326553 A1 | 12/2012 | Peng et al. |
| 2014/0091746 A1 | 4/2014 | Fujishima |
| 2014/0232233 A1 | 8/2014 | Fukushima |
| 2014/0340013 A1 | 11/2014 | Li et al. |

FOREIGN PATENT DOCUMENTS

| | | |
|---|---|---|
| DE | 102004041227 A1 | 3/2006 |
| DE | 102007018734 A1 | 10/2008 |
| DE | 102012022456 A | 5/2014 |
| EP | 1265341 A1 | 12/2002 |
| EP | 1401087 A1 | 3/2004 |
| EP | 2306621 A1 | 6/2011 |
| EP | 2400656 A2 | 12/2011 |
| JP | 2008155313 A | 7/2008 |
| JP | 2014506113 A | 3/2014 |
| KR | 20090060388 A | 6/2009 |
| WO | 8807782 | 10/1988 |
| WO | 2007128742 A1 | 11/2007 |
| WO | 2015138766 A1 | 9/2015 |

OTHER PUBLICATIONS

Office Action for Taiwan Patent Application No. 104124994, dated Jul. 21, 2016.
Goudarzi, N. et. al., "Aerodynamic and Electromagnetic Analysis of a Variable Electromotive-Force Generator for a Wind Turbine", ASME 2012 International Mechanical Engineering Congress and Exposition, vol. 4; Dynamics, Control and Uncertainty, Parts A and B, Houston, Texas, USA, Nov. 9-15, 2012, pp. 1-14.
Nipp, Eckart, "Permanent Magnet Motor Drives with Switched Stator Windings", Royal Institute of Technology, Department of Electrical Power Engineering Electrical Machines and Drives, Stockholm 1999, TRITA-EMD-9905, ISSN-1102-0172, 315 pages.
https://duratracmotors.com/technical-papers/.
https://duratracmotors.com/patents/.
International Search Report and Written Opinion for PCT/US2017/027383, dated Jul. 25, 2017.

(56) References Cited

OTHER PUBLICATIONS

Partial Supplementary European Search Report for EP 15826799.7, dated Feb. 19, 2018.
Extended European Search Report for EP 15826799.7, dated Jun. 22, 2018.
International Preliminary Search Report on Patentability for PCT/US2017/027383, dated Oct. 16, 2018.
Steiger, W. et al., "Directhybrid—a Combination of Combustion Engine and Electric Transmission," 2006.
Extended Supplementary European Search Report for European Application No. 17783121.1, dated Nov. 21, 2019.
International Preliminary Report on Patentability for Application No. PCT/US2015/043296 dated Feb. 7, 2019.

* cited by examiner

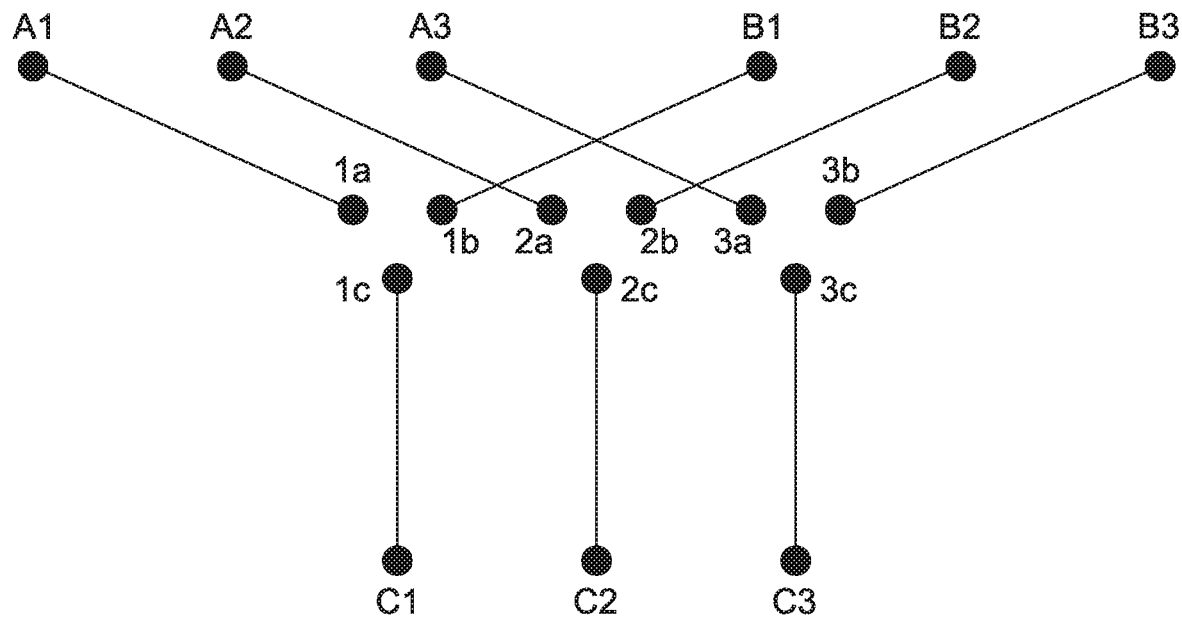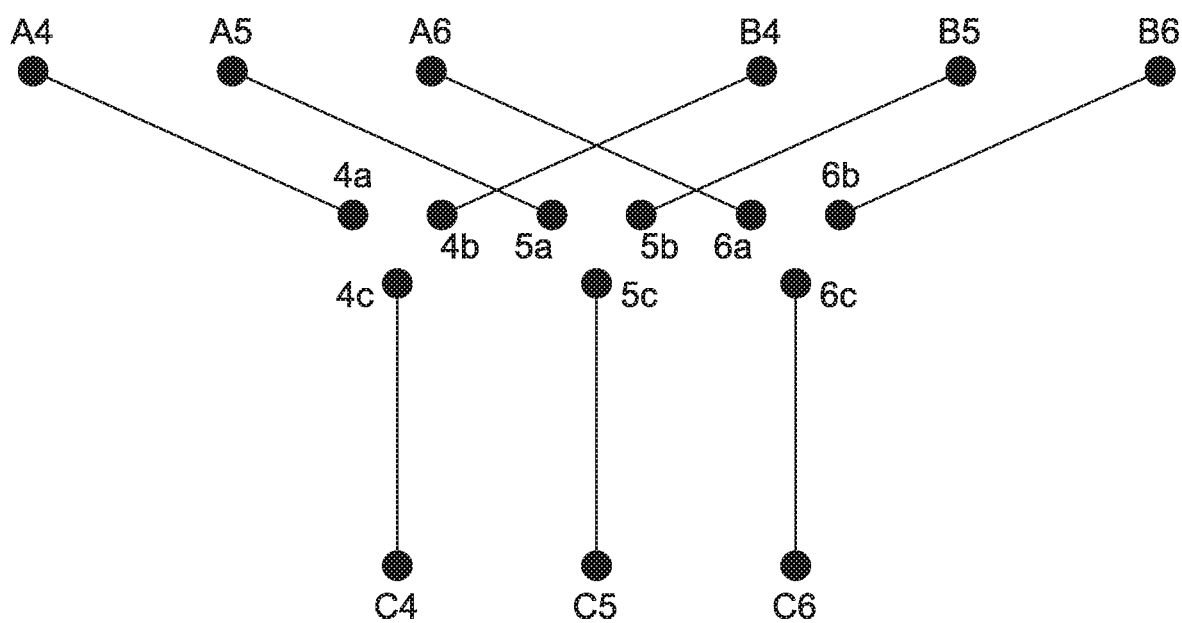
FIG. 10

VARIABLE TORQUE MOTOR/GENERATOR/TRANSMISSION

CROSS-REFERENCE TO RELATED APPLICATIONS

The present application is a continuation of U.S. Non-Provisional patent application Ser. No. 15/688,036 (U.S. Pat. No. 10,084,404), filed on Aug. 28, 2017, which is a continuation of Ser. No. 15/486,727, filed on Apr. 13, 2017 (U.S. Pat. No. 9,748,886), which is a continuation-in-part (CIP) of U.S. Non-Provisional patent application Ser. No. 15/332,824 (U.S. Pat. No. 9,819,296), filed Oct. 24, 2016 which is a divisional of U.S. Non-Provisional patent application Ser. No. 14/815,733 (U.S. Pat. No. 9,479,037), filed Jul. 31, 2015, which claims the benefit under 35 U.S.C. § 119(e) of U.S. Provisional Application No. 62/032,468, filed Aug. 1, 2014; U.S. Provisional Application No. 62/146,694, filed Apr. 13, 2015; and U.S. Provisional Application No. 62/146,725, filed Apr. 13, 2015. The present application also claims the benefit under 35 U.S.C. § 119(e) of U.S. Provisional Application No. 62/322,052, filed Apr. 13, 2016, U.S. Provisional Application No. 62/353,413, filed Jun. 22, 2016, and U.S. Provisional Application No. 62/399,907, filed Sep. 26, 2016. The foregoing U.S. provisional and non-provisional applications are incorporated herein by reference in their entireties.

BACKGROUND

To date more than 99.9% of electricity generated worldwide is from some form of generator with rotational movement. Solar panels account for about 0.05%. Between 65 and 70% of the world industrial power and about 57% of all consumed power is used by electric motors. This relates to an estimated 16,000-plus terawatt-hours (TWh) annual consumption of electrical power worldwide. Due to this trend of consumption and efficiency improvement, conventional modern electrical generators and motors can operate in the 90 to 98% efficiency range near their rated revolutions per minute (RPM) and torque specifications. For this reason it is thought that the modern generator and motor industries are very mature and small incremental improvements can be made. However, while the narrow band of high efficiency rating in generators and motors is high, when these same generators and motors are operating outside the specified RPM and/or torque rating, the efficiencies dramatically decrease sometimes as low as 30 to 60%.

While most conventional generation systems use a continuous RPM and torque power source, renewable energies that are now emerging have much greater RPM and torque changes, as the power source is variable, untimely and most times unpredictable. As our capacity in conventional generation and distribution is reached, the need for generators in the renewable energies to be sensitive to this torque and still be efficient can be a very high priority. Likewise in the motor sector there exists a greater need for wider operating ranges with high efficiency for the industrial use and especially in the transportation sector as the demand for hybrid and "plug in" electric vehicles increases exponentially. An electrical motor's efficiency rarely stays constant, as the real world operating conditions require starts, stops and variable loads.

The modern day vehicle alternator converts some of the rotational power of the combustion engine into electrical power in order to operate the electronics and maintain battery charge. These alternators generally are 50 to 60% efficient. In 2007 there were about 806 million vehicles and today it is estimated to exceed a billion in operation. Almost 16% of manmade $CO_2$ comes from these vehicles. Even a small amount of efficiency improvement in these alternators can make a dramatic improvement in fewer emissions and a considerable decrease in fuel consumption. This alternator efficiency loss is due primarily to air gap and inefficiencies in the rotor coil system (electromagnet). Permanent magnets in the rotor are not generally used in vehicular alternators due to the inability to regulate the output for variable loads efficiently.

Permanent magnet alternators (PMA) are used in small wind machines today. They typically have a high startup speed, as cogging of the rotor and the natural magnetic attraction of the stator tend to require a substantial minimum wind speed in order to overcome this limitation. They also lack the RPM range required to produce efficient power in the lower speed range as well as having a current limitation at very high wind speeds. They do not have the ability to regulate their output as the construction allows maximum power production at a given RPM. The stator selection limits the maximum current or voltage; it has a very limited efficiency range.

With medium to large wind systems, large AC generators are used and are converted to DC. Then power invertors invert the DC power signal to AC and distribute this current to the grid. This conversion comes with lost efficiency and heat production. This also limits the turbine startup speed and maximum output power. In large wind turbines, synchronous 3-phase generators can be used that usually have the rotor powered by the electrical grid in order to tie into the power grid frequency. While using the power inverter system to regulate the output power, they lose efficiency as well as limiting the turbine RPM range. Other renewable energy system generators such as tidal and wave generators have the same problems with efficiency loss due to limited RPM and torque ranges for the wide variations in RPM and torque range of these systems.

The use of permanent magnet motors in hybrid and "plug-in" electric vehicles has a very limited efficiency range as well. These motors like their PMA counterparts are limited by their construction in RPM, torque and current usage. They also have a problem with back EMF and extreme drag while in coast mode due to the permanent magnet passing continuously by the iron core of the stator.

DRAWINGS

The Detailed Description is described with reference to the accompanying figures. The use of the same reference numbers in different instances in the description and the figures may indicate similar or identical items.

FIG. 10 is a diagrammatic illustration of a six-wire separated stator winding assembly, in accordance with an example embodiment of the present disclosure.

DETAILED DESCRIPTION

Overview

Figure 1:
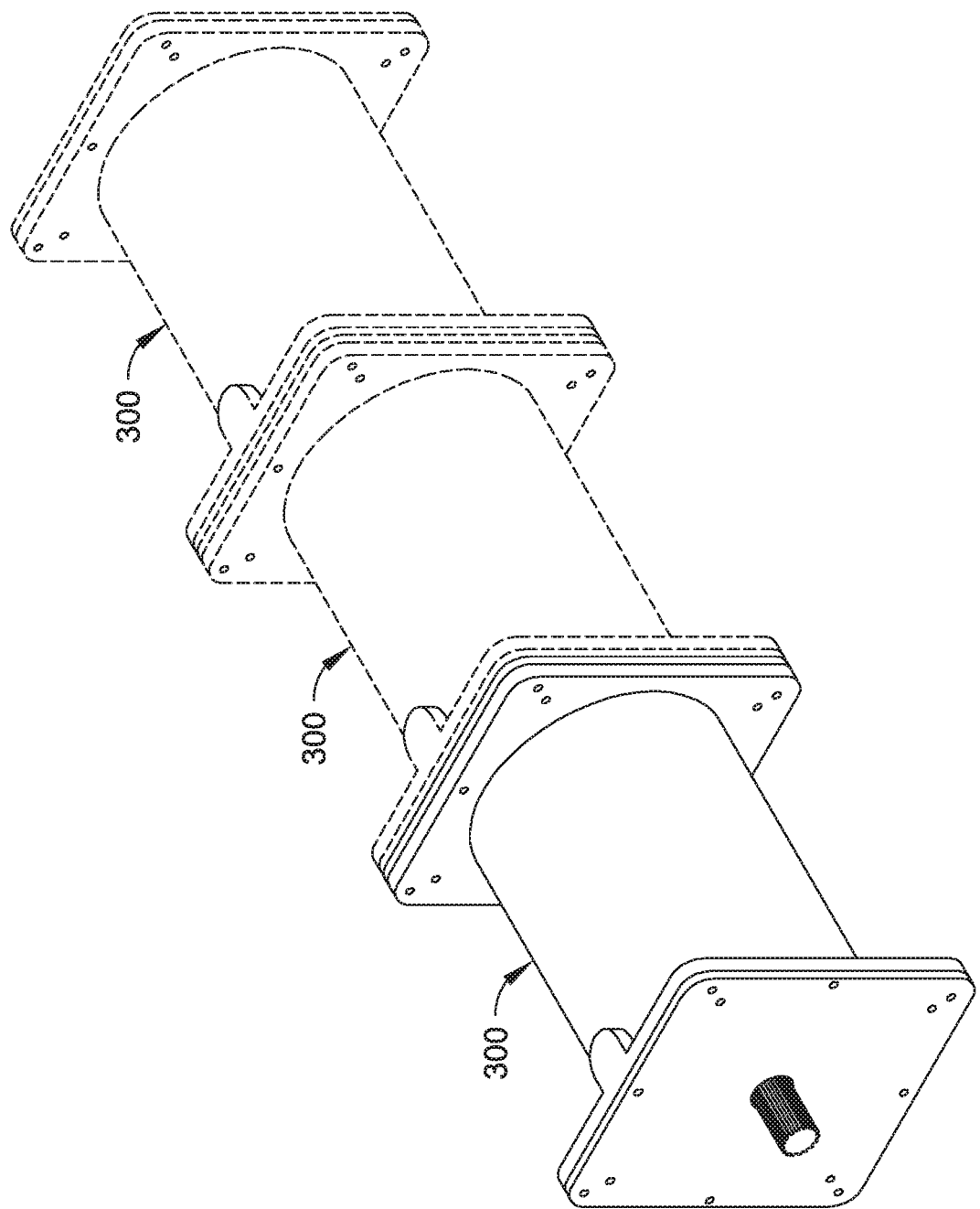
FIG. 1 is a perspective view illustrating a motorlgeneratorltransmission (MGT) unit, which may be connected to one or more additional MGT units, in accordance with an example embodiment of the present disclosure.
Figure 2:
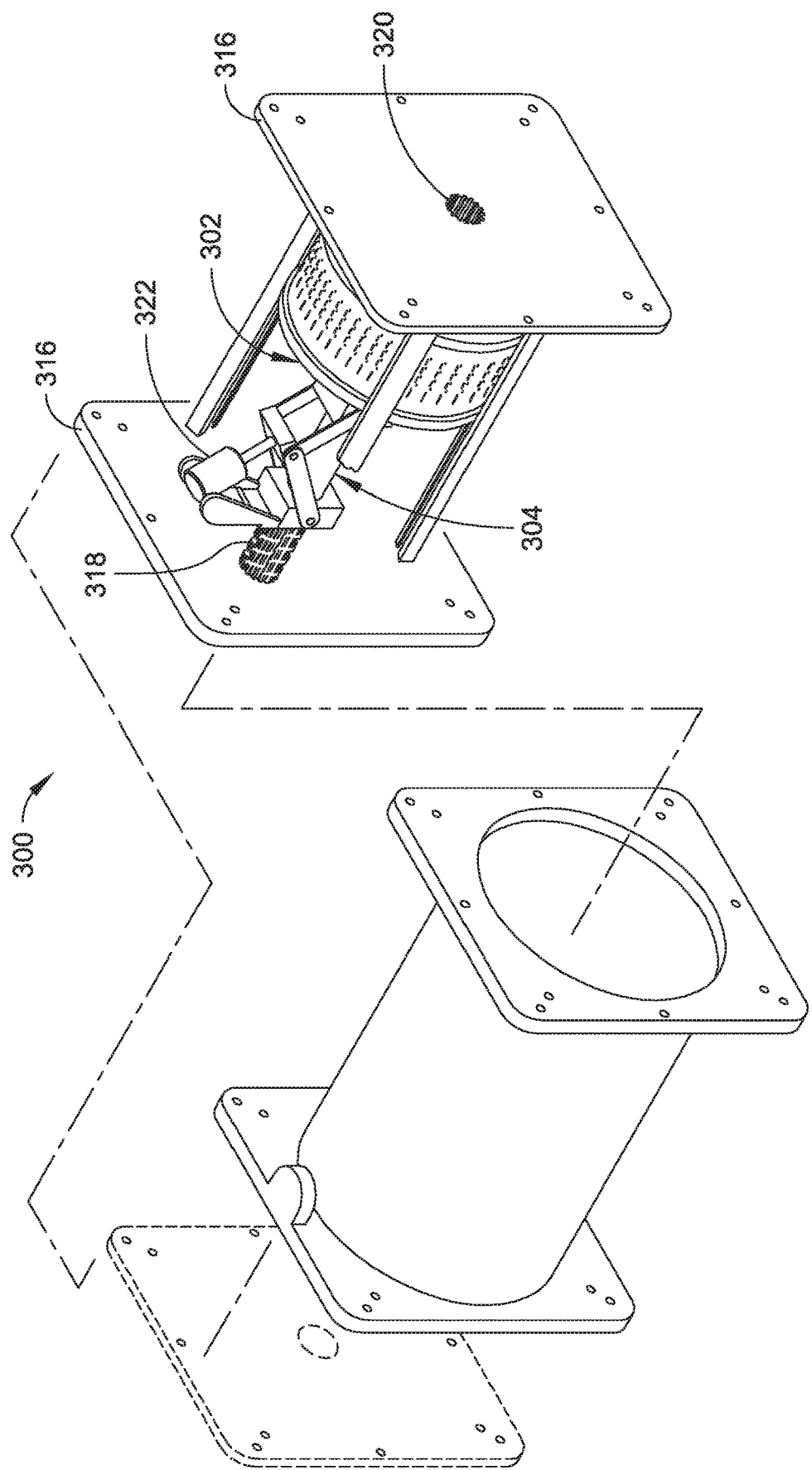
FIG. 2 is an exploded perspective view of a MGT unit, such as the MGT unit illustrated in FIG. 1, in accordance with an example embodiment of the present disclosure.
Figure 3:
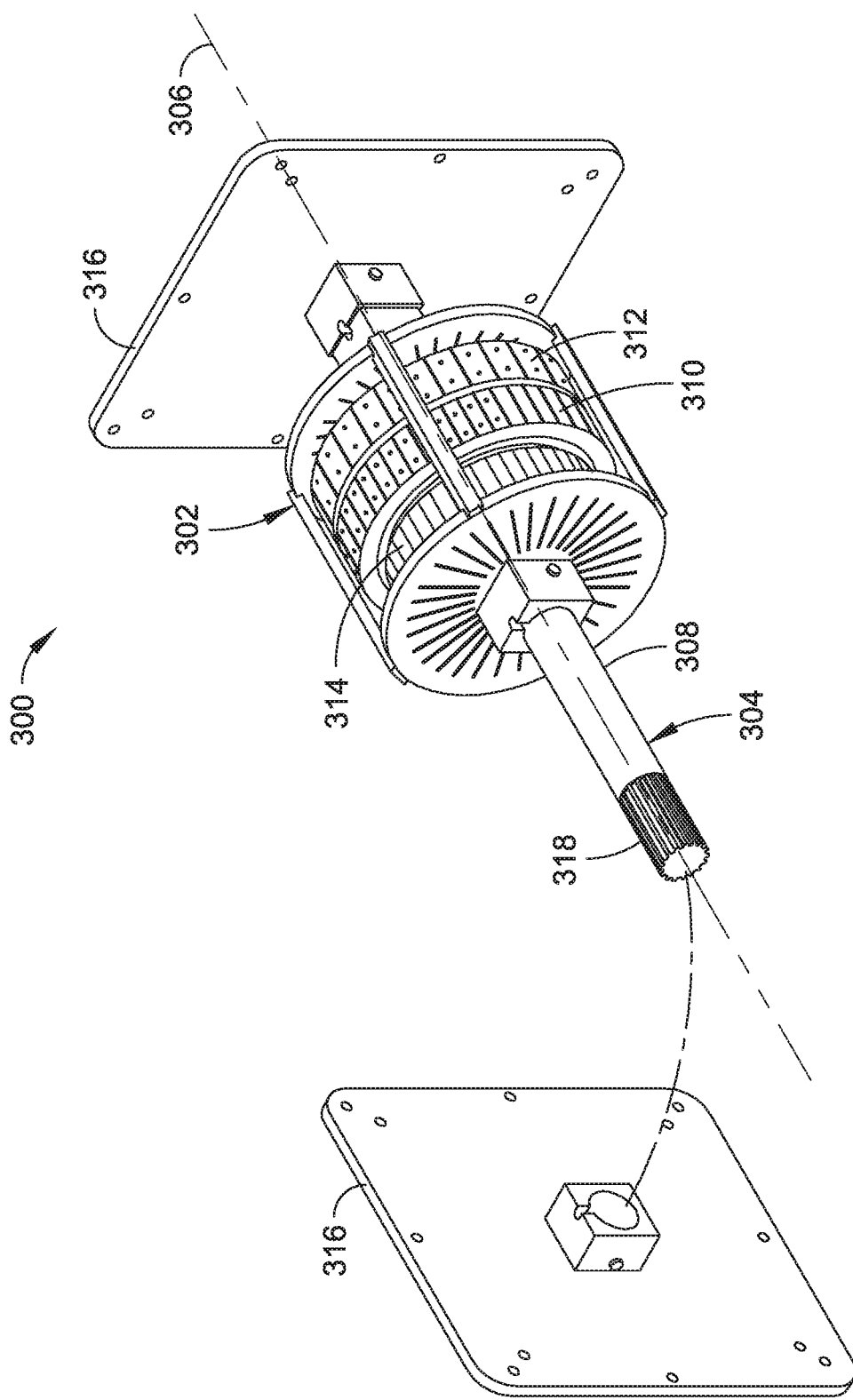
FIG. 3 is a partial exploded perspective view of a MGT unit, such as the MGT unit illustrated in FIG. 1, in accordance with an example embodiment of the present disclosure.
Figure 4:
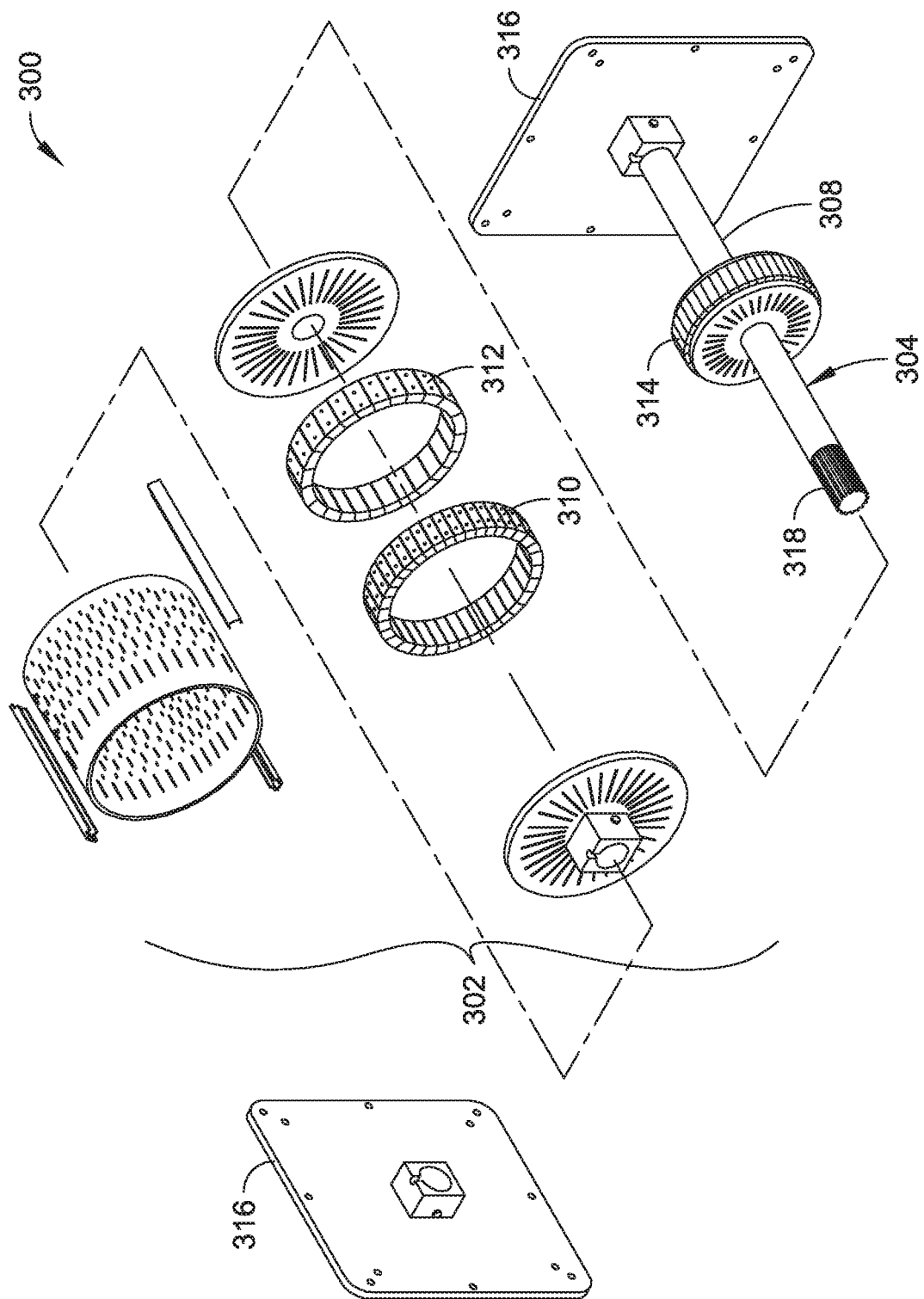
FIG. 4 is a partial exploded perspective view of a MGT unit, such as the MGT unit illustrated in FIG. 1, in accordance with an example embodiment of the present disclosure.
Figure 5:
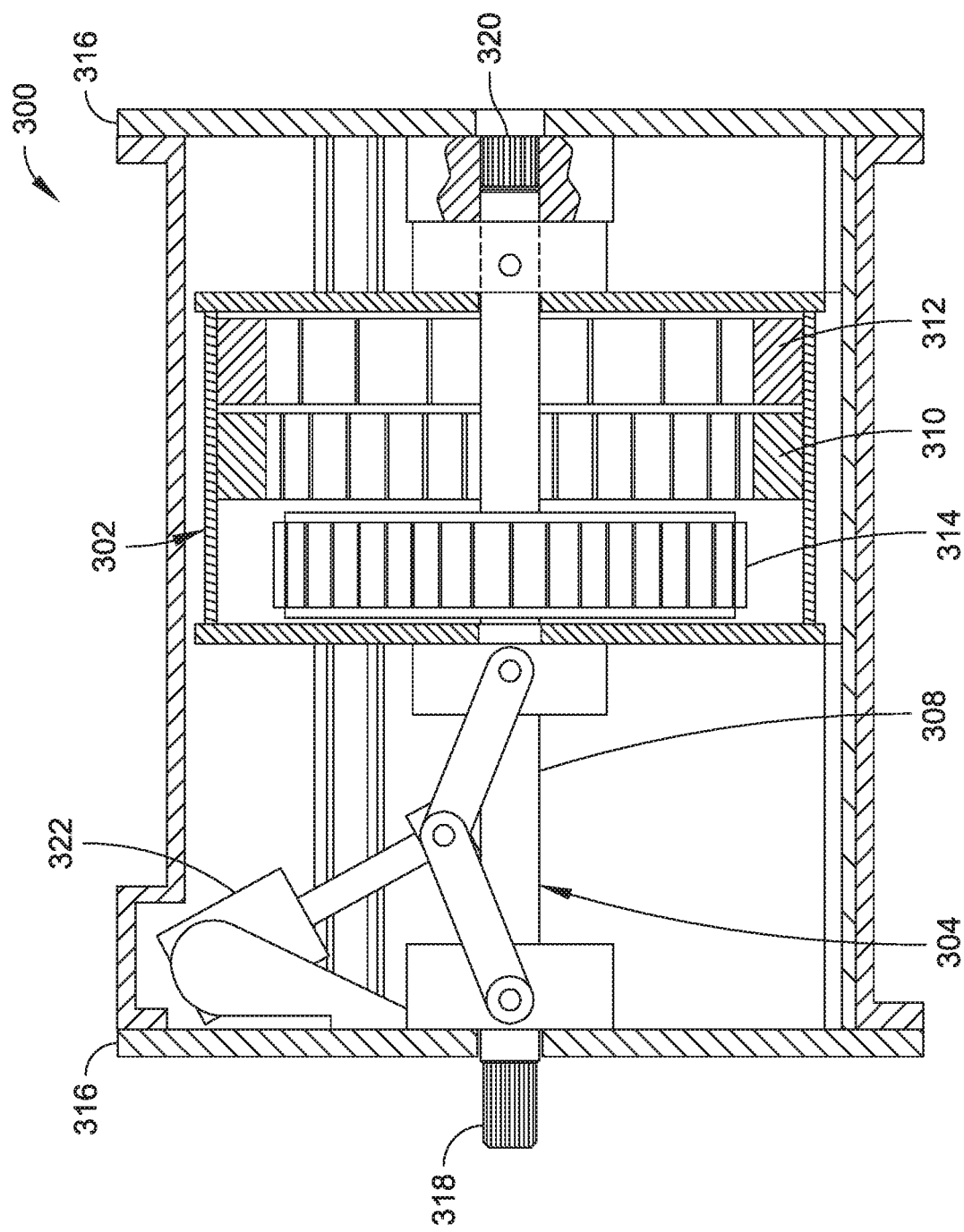
FIG. 5 is a cross-sectional side elevation view of a MGT unit, such as the MGT unit illustrated in FIG. 1, in accordance with an example embodiment of the present disclosure, where a rotor includes a set of magnets, shown in a neutral position.
Figure 6:
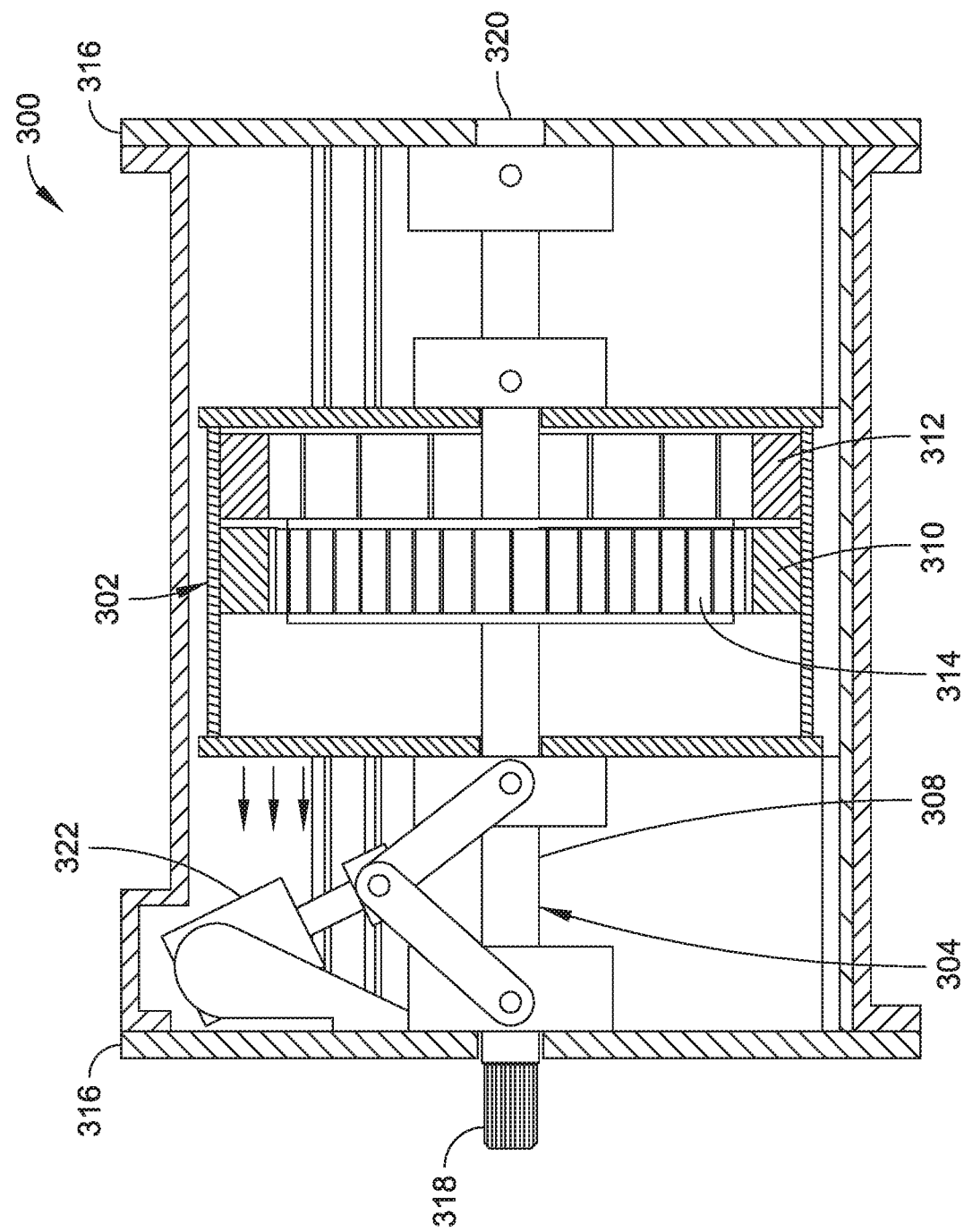
FIG. 6 is cross-sectional side elevation view of the MGT unit illustrated in FIG. 5, where the set of magnets is moved from the neutral position to engage the first stator with the rotor.

The state of the art in permanent magnet electric motors and generators is that the magnetic field of the rotor is not adjustable, but is instead fixed. As a result most motors and generators are designed for a specific speed and torque with a very narrow range of optimum efficiency. High torque requirements in a motor or generator require more powerful permanent magnets which in turn create a large back EMF that is in turn overcome with high voltage and amperage. When motor speed and torque are constant, the motor or generator can be designed for optimum efficiency at its design speed and torque. Many times this efficiency is above 90%. Thus in the manufacture of these motors the stator core, core windings and permanent magnets are all selected to act together in the most efficient manner possible to produce the selected design torque, rpm and volt, amp ratios at an optimum or threshold efficiency. Once these key components are selected and placed in the motor or generator they, under the present state of the art, cannot be changed. Only the power and speed of the driving force in a generator and the volts and amperage of the electricity into the motor can be changed. But when this same motor or generator is put in service where the speed and torque vary widely such as in land vehicles and/or wind or water powered generators, the back EMF of the fixed magnets must still be overcome when the speed and torque requirements are less than the maximum designed for and the stator wiring sufficient and appropriately sized when the speed and torque are greater than the maximum designed for. When they are not, the overall efficiency of the motor or generator dramatically drops in many cases to as low as 20% for say rapid transit vehicles, automobiles, or wind/water powered generators, and the like.

The present disclosure is directed to an electric generator and/or motor transmission system that is capable of operating with high efficiency wide volt and amperage operating range and extremely variable torque and RPM conditions. This disclosure utilizes the variability of renewable resources such as inconsistent wind speed, untimely ocean wave movement or braking energy in a hybrid vehicle and more efficiently increases the generating potential that conventional generators cannot do. On the motor side, the disclosure produces a variable range of torque/RPM possibility to more efficiently meet the requirements of hybrid vehicles. The system can dynamically change the output "size" of the motor/generator, e.g., by varying the magnetic field induced in the stator by switching multiple non-twisted parallel coil wires in the stator between being connected in all series, all parallel or combinations thereof and correspondingly varying, adjusting or focusing the magnetic field of the permanent magnets acting on the stator and modularly engaging and disengaging rotor/stator sets as power demands increase or decrease. And as torque/RPM or amperage/voltage requirements change, the system can activate one stator or another (in multiple MGT units connected to a common computer processor) within the rotor/stator sets and change from parallel to series winding or the reverse through sets of 2, 4, 6 or more parallel, three phase, non-twisted coil windings to meet the torque/RPM or amperage/voltage requirements to improve (e.g., optimize or nearly optimize) efficiency.

As previously discussed herein, the state of the art in permanent magnet electric motors and generators is that the magnetic field of a rotor is not adjustable but fixed. While it is true that the magnetic field of a permanent magnet is fixed, it is the alternating flow of magnetic flux between the permanent magnets of the rotor and the cores of the stator and the alternating flow of electricity in the wires of the stator core that determine how a permanent magnet motor or generator will operate. Where there is a small amount of magnetic flux flowing between the rotor magnets and the stator core, it is as if the rotor of the motor/generator was fitted with small or lower strength permanent magnets. If the amount of flux flowing between the rotor magnets and the stator core is large, the reverse is true. When small permanent magnets are used in the rotor of a motor, the wires in the stator core coils are appropriately sized with the requisite number of turns to produce a magnetic field in the stator teeth (or cores) that will efficiently react with the magnetic field of the rotor magnets to produce the optimum (or nearly optimum) flux flow or interaction between them and optimum (or nearly optimum) torque or rpm. In the case of a generator, the wires are sized with the requisite number of turns to efficiently accommodate the electricity generated by the alternating flux induced in the stator cores by the permanent magnets on the rotating rotor and will in many cases be different from the wires of the motor even when the permanent magnets are the same size. When large permanent magnets are used in the rotor, the same is true in that the wires of the stator core in both the motor and generator are appropriately sized with the requisite number of turns. The wires and number of amp turns, however, in the large permanent magnet motor is different from the wires and number of turns in the small permanent magnet motor/generator, and the output size of the two motor/generators is dynamically different.

A motor/generator/transmission (MGT) system is disclosed that has an output that can be dynamically changed with more efficient performance over a predefined range than previously possible under the current state of the art. The alternating flux of the permanent magnets flowing from the rotor magnets to the stator cores or interacting with the stator cores can be varied or adjusted with several different techniques, for example: (1) by varying the alignment of the rotor magnets with the stator cores where the radial flux from the rotor magnets is partially, in varying degrees, engaged with the stator cores; (2) utilizing two rotors, one on either side of the center plane of the stator, where the alternating north and south magnetic poles circumscribing the rotors are in the same radial position relative to one another, the distance from the center plane of the stator to the center planes of the rotors can be varied, the polar magnetic fields from the magnets on the two rotors oppose one another, where the combined polar magnetic field between the two rotors is deflected, twisted or focused in the radial direction creating a greater flux field or flow in the radial direction into the stator cores than would be available from the sum of the fields of the two rotors and their respective magnets acting alone—this field is adjusted by moving the rotors closer to each other and to the center plane of the stator, or by moving the rotors further away; and (3) a combination of techniques (1) and (2) acting together on the same stator. Utilizing any of these techniques to adjust the flow of the magnetic flux between the stator and the rotor has a same or similar effect to being able to change the size of the permanent magnets of the MGT system at any time during its operation.

Changing the wiring and number of turns to modify the flux of a stator core and the electricity flowing in a core coil wires is not as easy to adjust or vary as the flux flowing from the rotor permanent magnets. However, this disclosure provides a number of methods and configurations to achieve distinctly different volt/amp characteristics in the stator core coils, where each stator core can be configured for an optimized (or nearly optimized) flux flow between the rotor(s) and the stator by adjusting the polar magnetic flux from the rotor acting on the stator to improve efficiency. This can be accomplished by separating the multi-phase stator wiring at a center tap and providing multiple non-twisted parallel wires in the core windings for each phase leg (and in some cases with wires of different size) with the ability to switch and connect the multiple wires in all series, all parallel, and combinations of parallel and series configurations. In some implementations, one or more wires may be disconnected to provide additional configurations (e.g., dropping from a six wire system to a four wire system, or the like). In some implementations, the phase windings are also switchable from a star or wye (Y) configuration to a delta (e.g., triangle) configuration. In some implementations, the system can provide two separate multi-phase wiring configurations with separate controllers on the same stator, and in some implementations separating the coils in each phase leg (including the multiple wires therein) so that any of the stator phases in either separate multi-phase configuration can be switched (e.g., using electronic switches) to be connected in series, in parallel, or in combinations thereof, in either the star (Y) or Delta configuration.

In embodiments, the MGT system can also be adjusted by joining together multiple modular MGT units (e.g., each having respective stator(s) and rotor(s)) to vary the overall system output. For example, the MGT units can be joined together under common control from a central processor where they may operate together for increased power or at least one can operate while another is in neutral. The MGT units may also be configured to shift back and forth between the different series, parallel, or combination (i.e., series and parallel) wiring and switching combinations to provide smooth transitions between the various combinations. The MGT units can also be shifted back and forth between Delta or Star phase configurations with series/parallel switching of the multiple wires in each phase.

In embodiments of this disclosure, any single MGT unit may have any or all of the combinations of multiple wiring and switching described herein, including switching between Delta and WYE configurations, multiple wire windings in series or parallel or in sets of two or more wires in parallel connected to each other in series, and where the MGT unit/system is multi-pole, the individual coils of a phase winding may be connected in series or parallel or in sets of two or more coils in parallel connected to each other in series, providing a wide range of volt/amp and torque speed ratios in a single motor/generator that is electronically reconfigurable to meet widely varying conditions. This feature coupled with mechanical shifting of the rotor magnetic field between the first stator, the second stator or more stators in one or more MGT units (e.g., being able to control no engagement of any stator and/or the partial engagement of one or any combination of two stators) and the ability to focus the magnetic field of the rotor or rotors on the stator cores provides an ability through a computer system processor to select and quickly change the winding configuration of the stator to meet widely variable speed and torque requirements that may be placed on the MGT unit/system at optimum (or near optimum or otherwise selected) energy efficiency. The ability to have the magnetic field of the rotor engaged with a first stator in a first wiring configuration, switching the second stator to a second wiring configuration and then transitioning the magnetic field of the rotor from the first stator to the second stator provides for a smooth transfer of power between the torque/speed of the first setting and the torque/speed of the second setting and further allows the computer system by fine tuning the degree of engagement between the rotor magnets and the stator coils to adjust, increase or diminish, the strength of the magnetic field between the rotor magnets and the stator to optimize the power efficiency of the MGT unit/system at most any desired speed and torque. The same smooth transition of power applies when both stators are engaged with the magnetic field of the rotor and the stators are switched from one wiring configuration to another by switching the first stator and then the second stator and in the interval between the switching, the engagement of the magnetic field with one or both stators is adjusted to accommodate a smooth transition between the two wiring configurations and improve the power efficiency of the MGT unit/system.

This disclosure also provides systems and methods for adjusting the magnetic field of the permanent magnet rotor in an electric motor or generator. It does so by adjusting or focusing the magnetic field acting on the stator cores to meet the torque speed requirements of the motor or generator at any given time. By reducing or increasing the magnetic field acting on the stator core, the MGT system in turn reduces or increases the back EMF and requires lower or higher voltage and amperage (power) to run the motor, or varies torque (e.g., wind speed) needed to turn a generator, thereby allowing the motor/generator employing the MGT system to adjust the back EMF to meet varying conditions and operate the motor/generator at greater efficiency over much wider ranges than ever before possible. With these capabilities the MGT system can control the strength of the interaction of the magnetic fields of both the rotor(s) and the stator over a relatively uniform range of variable power requirements with high efficiency. The efficiency of any electric motor is dependent on the balance between the electromagnetic field of the stator and the electromagnetic field of the rotor interacting with the stator. The state of the art inverter/controller in the MGT unit can regulate the voltage coming from the batteries or other electrical source which in turn regulates the amperage in the stator coil wires within the capacity of the wires and voltage source. The MGT unit has the ability to switch between different wiring combinations with a different resistance in each creating a different range of amperage turns in each wiring combination as the inverter/controller through the computer processor increases the voltage in each wiring configuration from low to high. The different wiring configurations are then configured, combined, and coordinated with the voltage regulation so that the overall range of the amperage flowing in the stator coils can be uniformly regulated (increased or decreased) over a greatly extended range as the computer processor switches the wiring from one configuration to the next correspondingly changing the value of the amp turns in the stator coils and the resulting magnetic field strength. With the MGT units ability to focus or control the magnetic field of the rotor magnets interacting with the stator coils over a much larger range from low to high by the movement of the rotor or rotors with respect to the stator, the computer process may be configured make the position of the rotor with respect to the stator a function of the amp turns in the stator coils so that the rotor is positioned to provide the optimum efficiency or balance between the magnetic fields of the stator coils and the rotor permanent magnets.

Example Implementations—MGT Including Selectively Moveable Stator(s)

Referring generally to FIGS. 1 through 6, MGT units and systems are described in accordance with some embodiments of this disclosure. FIG. 1 shows an MGT unit 300, which in some embodiments can be connected to one or more additional MGT units 300 to form a larger MGT system. As shown in FIGS. 2 through 6, the MGT unit 300 includes a rotor 314 that is rotatably coupled to an axle 308. The rotor 314 and the axle 308 to which the rotor is fixed have an axis of rotation 306, where the axle 308 extends longitudinally in a first direction along the axis of rotation 306. The MGT unit 300 also includes stator cage 302 that also extends longitudinally in the first direction and includes one or more stator rings (e.g., a first stator ring 310, a second stator ring 312, and possibly a third stator ring, a fourth stator ring, and so on), where each of the stator rings includes a plurality of stator cores with their respective coils/windings disposed about a periphery of the stator ring. In embodiments of the disclosure, the stator rings are spaced apart from one another in the first direction. The rotor 304 includes at least one rotor ring 314 with permanent magnets disposed about the periphery of the rotor ring 314. The rotor ring 314 can be coupled with the axle 308.

In embodiments of the disclosure, the stator ring 310 and the stator ring 312 are actuatable between three or more positions. The stator ring 310 and the stator ring 312 can be contained within stator cage 302 or coupled to any other support structure that is moveable by an actuator. The stator ring 310 and the stator ring 312 may each have different cores and/or winding configurations so that operating characteristics of an MGT unit 300 can be changed when the stator ring 310 and the stator ring 312 translate between a first stator position where the stator ring 312 is engaged with the rotor ring 314; a second stator position where the stator ring 310 is engaged with the rotor ring 314; and a third position where neither the stator ring 310 nor the stator ring 312 is engaged with the rotor ring 314. It should be noted that the order of stator positions is provided by way of example and is not meant to limit the present disclosure. In other embodiments, a neutral stator position can be positioned between two stators. A neutral stator position can also be at a different end of the MGT unit 300. Further, an MGT unit 300 can include more than one neutral position and so forth. In embodiments of the disclosure, the magnets of the rotor ring 314 can be equally spaced on the periphery of the rotor ring 314, where the outer peripheral surface of the magnets is at a defined minimal distance (e.g., gap) from the inner peripheral surface of the stator ring 310/312 core surface, causing electricity to flow in the stator windings as the rotor ring 314 rotates if acting as a generator, or causing the rotor ring 314 to rotate if electric current is supplied to the stator windings from an external source.

The stator rings 310 and 312 and be identical, reconfigurable, and/or differently structured. For example, the stator rings 310 and 312 can employ different stator windings or selectively reconfigurable stator windings (e.g., as described herein) to provide different power, torque, amperage, and/or voltage capacities and efficiencies. In some embodiments, a computer system can be used to send commands to the actuators of the stator rings to move them in and out of stator positions to achieve enhanced efficiency under widely varying input and output conditions, such as wind powered generators, motors for city busses, and so forth. In embodiments, an actuator 322 (e.g., a stepper motor, linear actuator, or the like) can be directly or indirectly coupled with the stator ring 310 and the stator ring 312. In some embodiments, the actuator 322 can include an arm configured to drive the stator cage 302 containing the stator ring 310 and the stator ring 312, thereby causing stator ring 310 and the stator ring 312 to move relative to the rotor ring 314 to a desired position.

In embodiments of the disclosure, multiple MGT units 300 can be connected together (e.g., end-to-end as described with reference to FIG. 1). For example, the axle 308 can be configured as a modular shaft, and multiple modular shafts can be connected together to form, for instance, a common axle. In some embodiments, each MGT unit 300 can include one or more endplates 316, which can include bearings (e.g., rotary bearings). In some embodiments, the axles 308 of two or more MGT units 300 can be connected together to allow additional MGT units 300 to be added inline (e.g., under a common control system to form larger and more powerful units with variable torque and/or power capabilities). The axle 308 of a first MGT units 300 can include a male end 318 configured to extend into a receiving cavity of an endplate 316 of an adjacently positioned second MGT units 300, whereby the male end 318 can connect to a female end 320 of an axle 308 of a second MGT unit 300.

Example Implementations—MGT Including Selectively Moveable Rotor(s)

Referring generally to FIGS. 16 through 24, MGT units 400 and systems are described in accordance with additional embodiments of this disclosure. FIGS. 16 through 24 shows an embodiment of an MGT unit 400/system that employs variable torque magnetic focusing. For example, an MGT unit 400 can be configured to focus and regulate the interaction of the magnetic flux between rotor rings 444 and at least one stator ring 439. To do this, the MGT unit 400 employs at least two rotors, one located on either side of a center plane of the stator ring 439, such that they can each be translated towards the center plane of the stator or away from it. As the rotor rings 444 are translated from their furthest point from the center plane of the stator, towards the center plane of the stator the interaction of the magnetic flux between the rotor rings 444 and the stator ring 439 increases, thereby allowing the magnetic flux to be focused (e.g., adjusted) so that the magnetic interaction between the rotor rings 444 and the stator ring 439 can be controlled to optimize or improve system efficiency.

Figure 22:
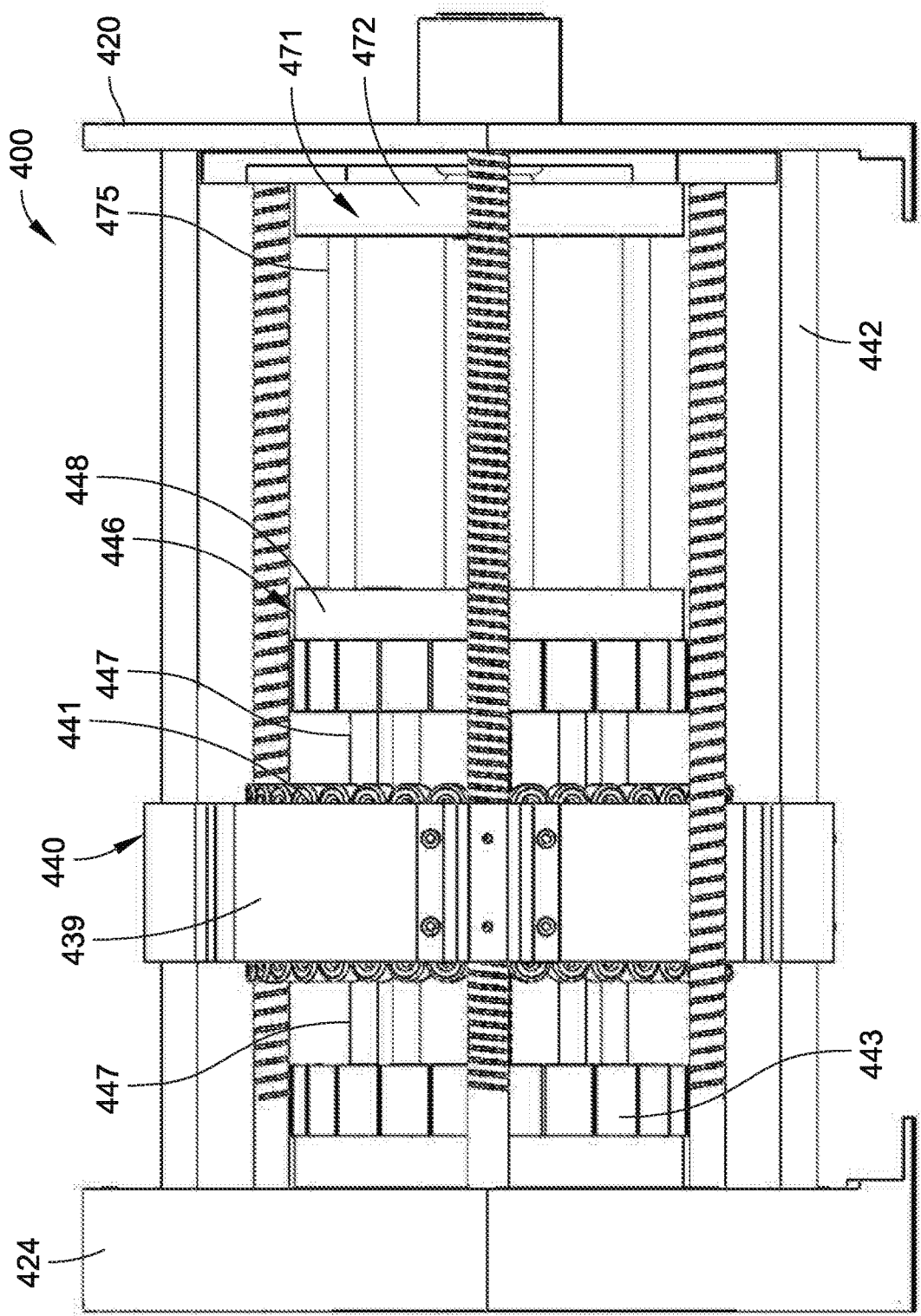
FIG. 22 is a side elevation view of the MGT unit illustrated in FIG. 16 with a portion of its housing removed, in accordance with an example embodiment of the present disclosure, where two rotors are shown apart from one another, in positions that are a distance from a stator of the MGT unit (Position 1).
Figure 23:
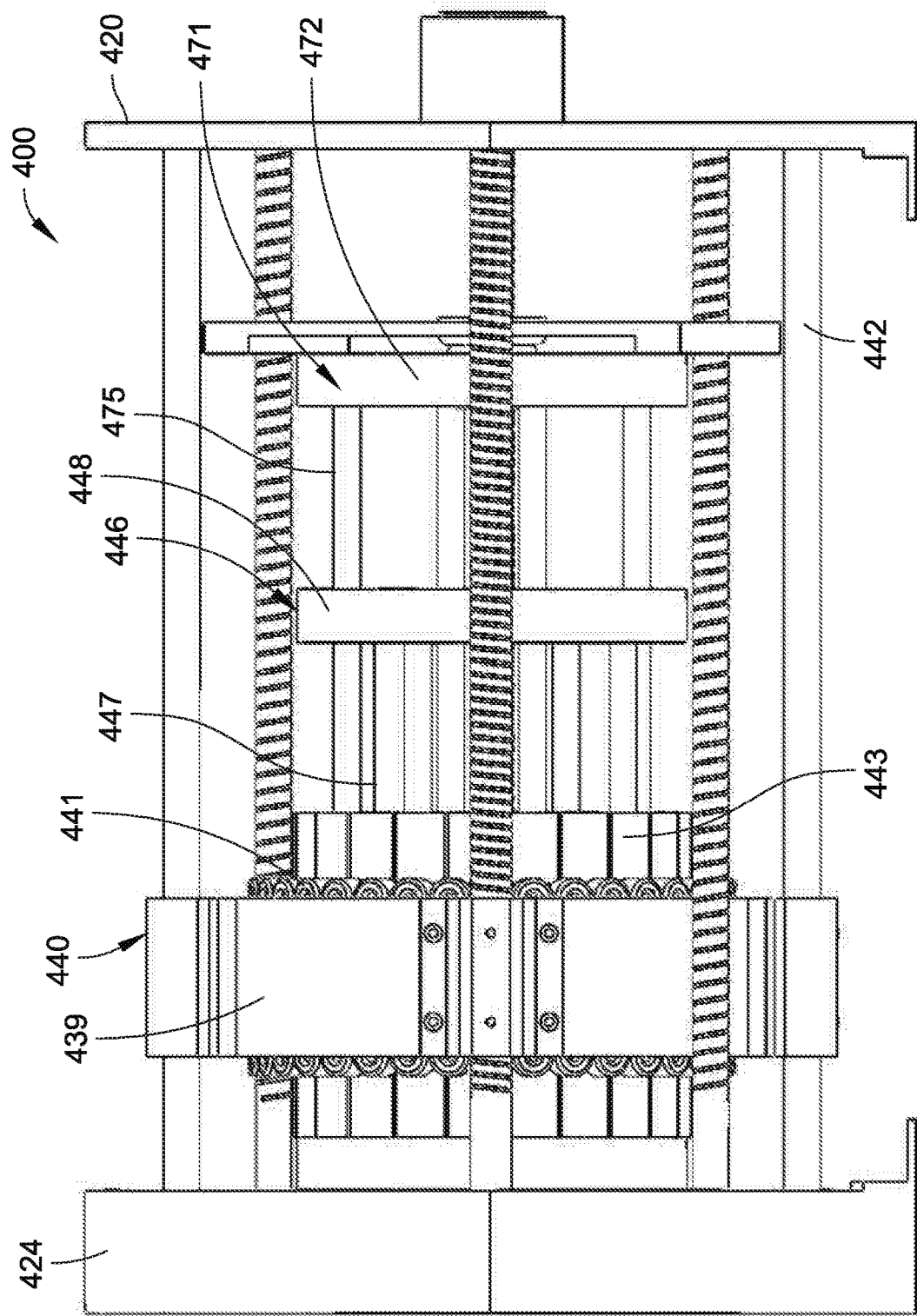
FIG. 23 is a side elevation view of the MGT unit illustrated in FIG. 16 with a portion of its housing removed, in accordance with an example embodiment of the present disclosure, where two rotors are shown apart from one another and an inner edge of each rotor is coplanar with an outer edge of the stator (Position 2).
Figure 24:
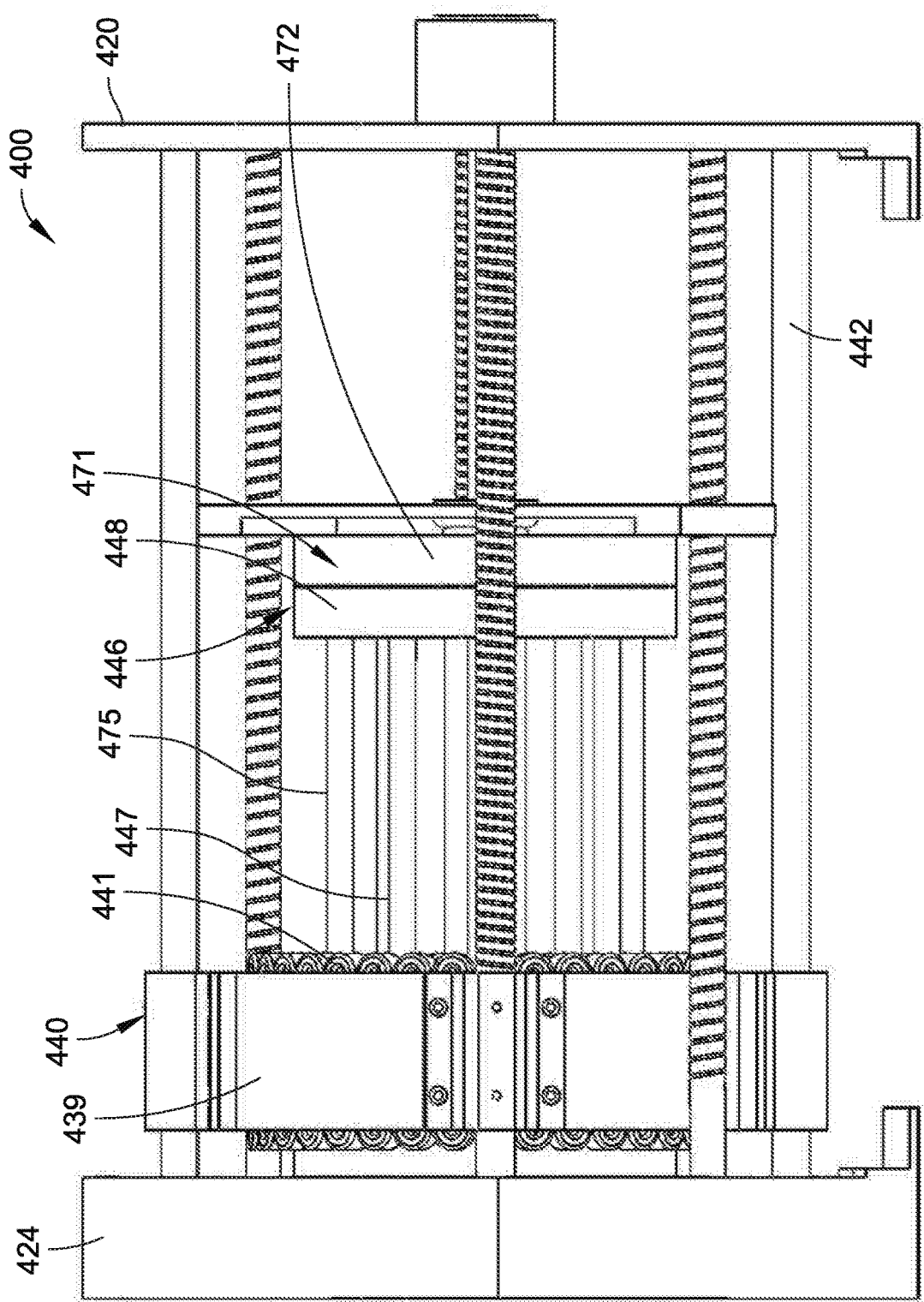
FIG. 24 is a side elevation view of the MGT unit illustrated in FIG. 16 with a portion of its housing removed, in accordance with an example embodiment of the present disclosure, where two rotors are brought together an inner edges of the two rotors are coplanar with a central plane of the stator (Position 3).

In an example implementation, the rotor rings 444 can be translated between at least the following positions: (1) a first position where the inside edges of the rotor rings 444 are approximately one rotor length or more (length of the permanent magnets 443 in the axial direction) from the outside edge of the stator ring 439 (e.g., as shown in FIG. 22); (2) a second position where the inside edges of the rotor rings 444 are in line with the outside edges of the stator ring 439 (e.g., as shown in FIG. 23); and a third position where the inside edges of the rotor rings 444 are in line with the center plane of the stator ring 439 (e.g., as shown in FIG. 24). In the first position (1), there is minimal or no interaction of the magnetic flux between the rotor rings 444 and stator ring 439 and no or minimal flow of electricity in the stator wires when the rotor is turned by outside forces. This can be considered as a neutral position for the MGT unit 400. As the rotor rings 444 are translated from the first position (1) to the second position (2), the polar magnetic fields of the permanent magnets 443 on the rotor rings 444 begin to oppose one another and deflect or focus in the radial direction towards the stator cores creating a greater interaction or magnetic flux flow between the rotor magnets 443 and the stator cores than the sum of the two rotors and their respective magnets 443 would produce from the same position alone and, where the interaction of the magnetic field from the rotor rings 444 to the stator ring 439 increase exponentially as the rotor rings 444 are moved from the first position (1) to second position (2) but is of low value but sufficient as a generator to provide low or trickle power to recharge the batteries over time in a hybrid vehicle operating under combustion power with no or minimal additional drag on or additional power required from a combustion engine. As the rotor rings 444 are translated from the second position (2) to the third position (3) the interaction of the magnetic field or flux flow from the rotor rings 444 to the stator ring 439 increases linearly to the maximum interaction or flux flow between the rotor magnets 443 and the stator cores as does the power generated when acting as either a generator or motor.

Figure 19:
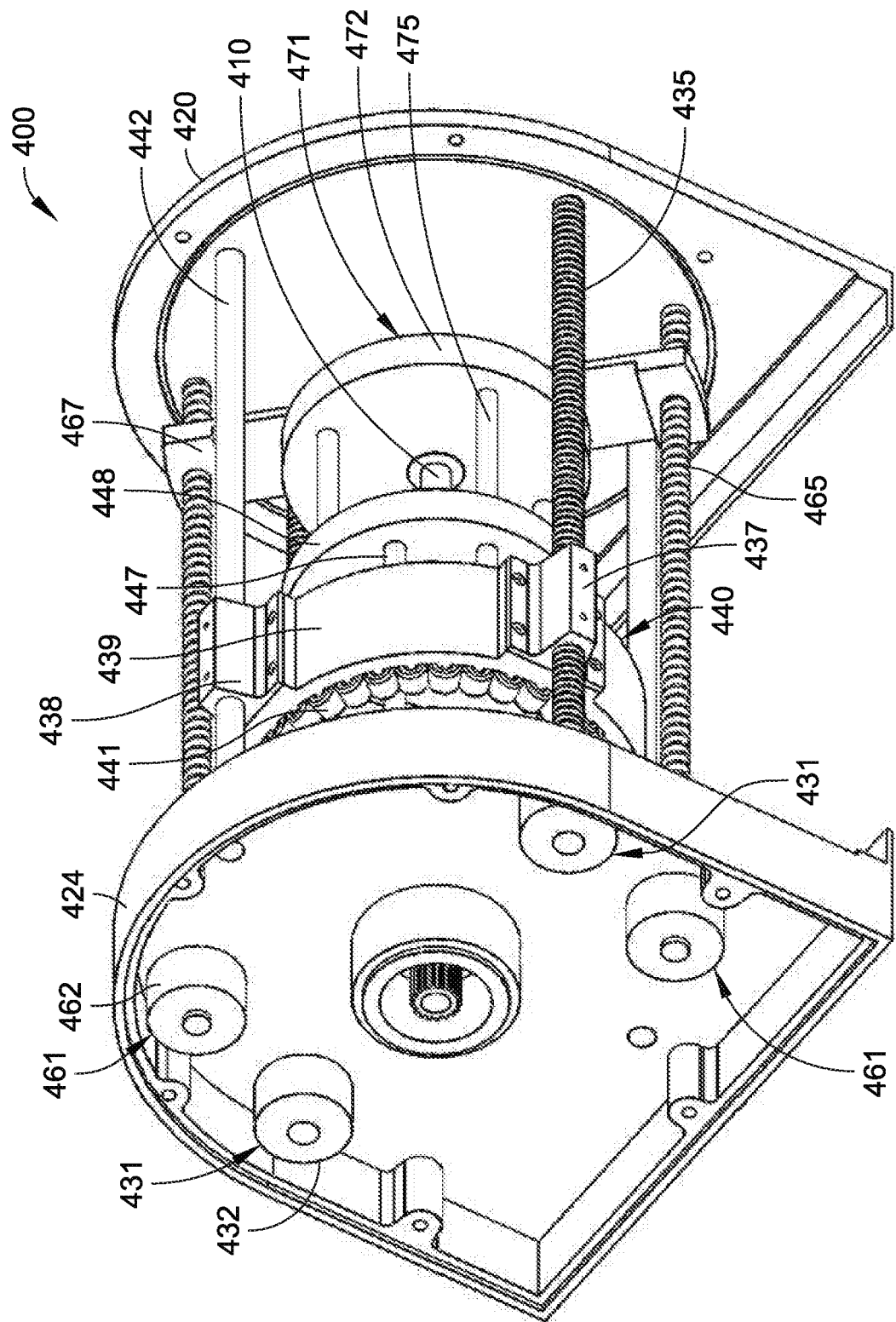
FIG. 19 is another perspective view of the MGT unit illustrated in FIG. 16 with a portion of its housing removed, in accordance with an example embodiment of the present disclosure.
Figure 20:
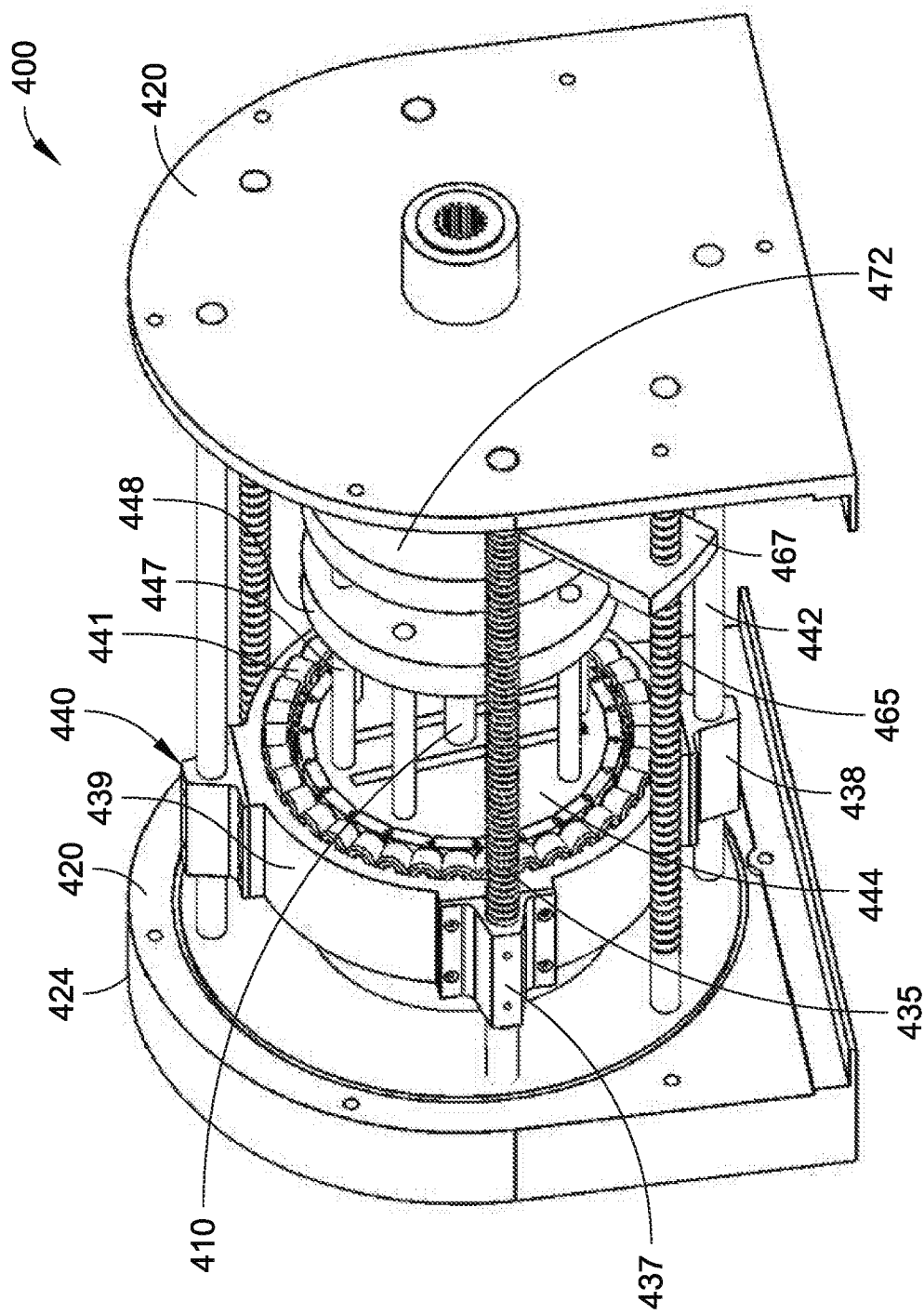
FIG. 20 is another perspective view of the MGT unit illustrated in FIG. 16 with a portion of its housing removed, in accordance with an example embodiment of the present disclosure.
Figure 21:
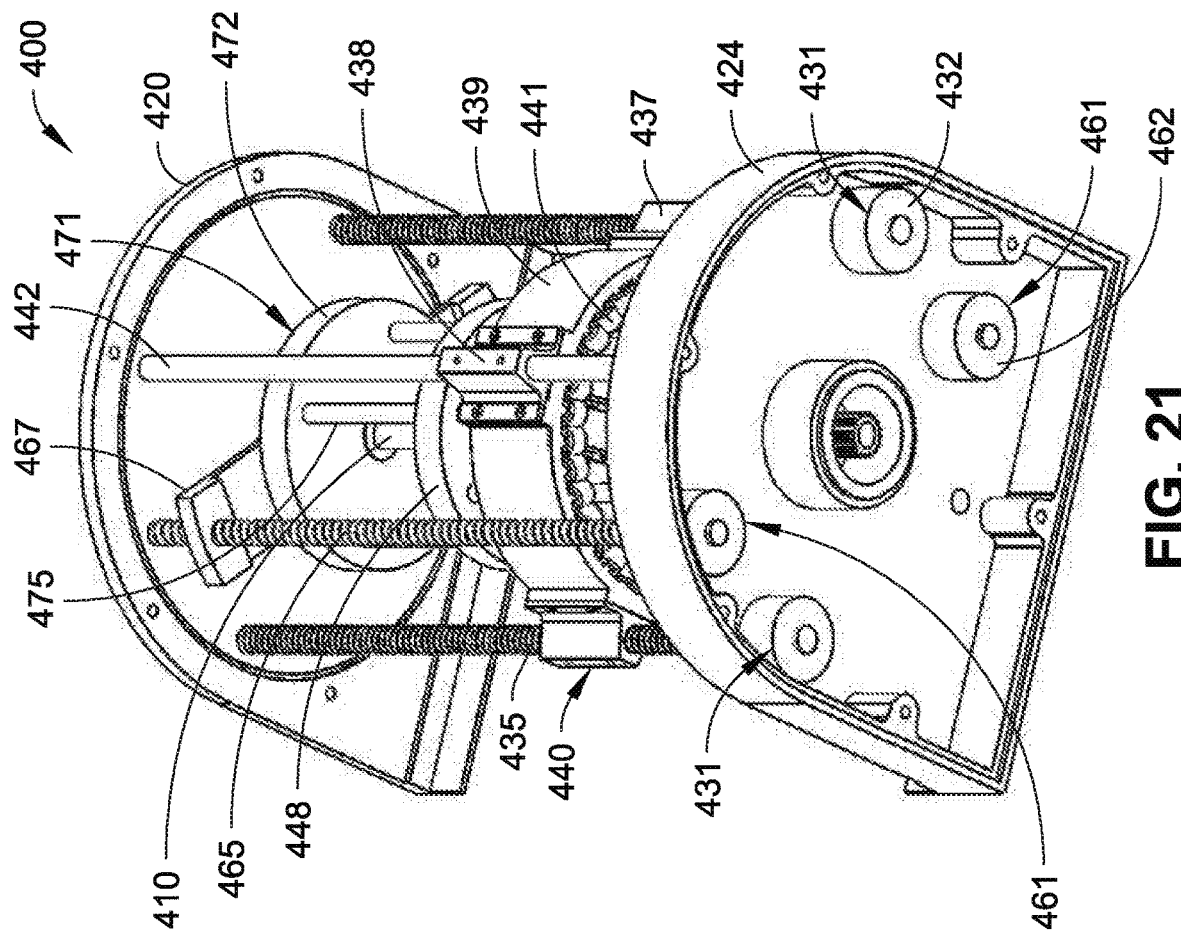
FIG. 21 is another perspective view of the MGT unit illustrated in FIG. 16 with a portion of its housing removed, in accordance with an example embodiment of the present disclosure.

Referring generally to FIGS. 16 through 24, the MGT unit 400 may have a housing including a cover 430, a front end plate 420, a rear end plate 420, and an end plate cover 422. As shown in FIG. 19, the front end plate 420 and the end plate cover 422 provide an enclosure for a motor control box 424 that can include linear actuator stepper motors 432 and 462 and wiring connections (not shown). The MGT unit 400 can include an axle 410 with a fluted male connecting end and a fluted female connecting end and bolting connections for joining the MGT unit 400 with other MGT units 400. The connecting end may be of any style that allows two or more MGT units 400 to be physically mated whereby their axles 410 are joined and turn as one common axle. An end plate 420 may also accept an adaptor plate in compliance with industry standards for joining other manufactured equipment including automotive engines and transmissions. The front and rear end plates 420 of two or more MGT units 400 may be bolted together to ensure the physical continuity of any number of modules.

The rear end plate 420 may be of any style that allows another MGT unit 400 to be mated to it, whereby their axles 410 are joined and turn as one common axle. The rear end plate 420 provides a housing for a fluted female end of the axle 410 and bolting connections for joining it to other MGT units 400. The rear end plate may also accept an adaptor plate in compliance with industry standards for joining other manufactured equipment including automotive engines and transmissions. The front and rear end plates of two or more MGT units may be bolted together to ensure the physical continuity of any number of modules.

The rotor rings 444 can be slidably coupled to a rotor support structure 446 that is coupled to the axle 410. The rotor support structure 446 can include two end disks 448 spaced apart and affixed perpendicular to the axle 410 through their center points, a plurality of (e.g., three or more) linear slide rods 447 parallel to the axle 410, radially outward of the axle 410 and equally spaced around the axle 410, affixed on each end to an end disk 448. The rotor support structure 446 rotates with the axle 410. In one implementation, the forward end disk 448 is affixed to the axle 410 near the end plate 420, and the rear end disk 448 includes three or more holes through the rear disk in the axial direction outward from the axle 410 and equally spaced around the axle 410 with bushings or linear bearings (not shown) to allow the passage and free movement of the rotor push rods in the axial direction through the rear end disk 448 but maintain their radial position relative to the axle 410.

A rotor pusher/puller 471 can include a pushing disk 472 spaced apart and rearward of the rear rotor ring 444 and rear rotor support end disk 448. The pushing disk 472 is slidably affixed to the axle 410 through its center point by means of a bushing or linear bearing (not shown) to allow translation of the pushing disk 472 in the axial direction. The rotor pusher/puller 471 also includes a plurality of (e.g., three or more) linear slide rods 475 spaced and outward from the axle 410, equally spaced around the axle 410 passing through the bushings or linear bearings in the rotor support rear end disk 448 and affixed to the rear rotor.

A translator bar 467 can comprise a flat bar with a hole in the center of the bar perpendicular to the flat face of the bar. The translator bar 467 extends in both directions away from the center hole (a hole slightly larger in diameter than the MGT axle 410 diameter, where the axle 410 may pass through the hole in the translator bar 467 perpendicular to the bar and where the bar is affixed to the rear face of the pushing disk 472 by thrust bearings and is affixed on each end to the rotor linear actuator screw bars 465. The linear actuator screw bars 465 are mounted parallel to the axle 410 outward of the rotor rings 444, rotor support structure end plates 420 and the stator, and they extend through threaded holes in each end of the translator bar 467 so that as the rotor support structure 446 and the rotor pusher/puller 471 rotate with the axle 410 the translator bar 467 does not necessarily but may move or translate in the axial direction when the linear actuator screw bars 465 are turned clockwise or counter clockwise. Thus, as the translator bar 467 is moved in the axial direction the rotor pusher/puller 471 is moved in the same direction as is the rear rotor ring 444.

The MGT unit 400 also includes rotor linear actuators 461 that receive commands from the computer system to activate and turn the two or more threaded rotor linear actuator screw bars 465 which extend through the threaded holes in the translator bar 467 causing the translator bar 467 to move back and forth in the axial direction as the screw bars 465 are turned. The threaded rotor linear actuator screw bars 465 are parallel to the axle 410 and outward of the rotor rings 444, stator ring 439, rotor pusher/puller 471, and rotor support structure 446 and are rotationally affixed to the MGT end plates 420 extending through the front end plate 420 where the stepper motors 462 are attached either as a direct drive with one stepper motor each or a single stepper motor and chain or belt drive to each. The connection between the translator bar 467 and the actuator screw bars 465 may be a conventional male threaded screw bar and female threaded holes in the translator bar 467 or a conventional ball screw arrangement.

A stator support structure 440 can include two or more linear slide bars 442 equally spaced around the axle 410, parallel to it, outward of the rotor, stator, rotor pusher/puller 471 and rotor support structure 446. The stator support structure 440 extends between the front and rear end plates 420. Linear bearing blocks 438 can be slidably affixed to the stator support structure 440 to translate in both directions between the end plates 420, where the linear bearing blocks 438 are in turn affixed to the stator ring 439 holding the stator ring 439 in a position where its central axis is coaxial with the axis of the MGT axle 410, and the circumferential face of its stator cores is separated from the circumferential rotor magnet face by a small air gap.

The MGT unit 400 can also include stator linear actuators 431 (e.g., stepper motors 432) that receiving commands from the computer system to activate and turn the two or more threaded stator linear actuator screw bars 435. The threaded stator linear actuator screw bars 435 are parallel to the axle 410 and outward of the rotor rings 444, stator ring 439, rotor pusher/puller 471 and rotor support structure 446 and are rotationally affixed to the MGT end plates 420 extending through the front end plate 420, where the stepper motors 432 are attached either as a direct drive with one stepper motor each or a single stepper motor and chain or belt drive to each. Linear screw or ball screw bearing blocks 437 are affixed to each screw bar 435 to translate back and forth in the axial direction as the screw is turned by the stepper motor 432 which are in turn affixed to the stator ring 439 causing it to be positioned in a defined spot relative to the rotor rings 444 based on commands from the computer system.

In embodiments, the stator ring 439 can comprise laminated iron plate rings stacked together in the axial direction with slots through the plates forming teeth (cores) on the inner surface of the stator ring 439 such that when stacked together wires may be inserted in the slots that run the length of the stator in the axial direction parallel to the MGT axle 410 (e.g., in a manner consistent with normal industry practice for the state of the art of stators for electric motors). Wires are placed in the slots by winding the wire around one or more teeth (cores) to form a coil 441 and a successive series of coils 441 evenly spaced around the periphery of the stator ring 439, e.g., in a manner consistent with normal industry practice for the state of the art for the wiring of multi-phase electric motor stators except that the wires of each coil 441 phase leg include two or more non-twisted wires parallel to each other and separated at the center tap in a switching system that can place the multiple wires all in series, all in parallel, or a combination of series and parallel to achieve a number of different wiring configurations that depends on the number of wires. The switching system can also be configured to place the phase wiring in the star/wye ("Y") or Delta wiring configurations where the voltage amperage and frequency of the power to the coils 441 is controlled according to commands by the computer system. Example implementations of various stator winding configurations are further discussed herein. Any of the stator winding and switching system implementations can be applied to any embodiment of an MGT unit 400 described herein.

The rotor rings 444 include permanent magnets 443, which may be evenly spaced around the periphery of an iron disk or disks. The rotor rings 444 are affixed to the linear slide rods 447 of the rotor support structure 446 and at least one of the rotor rings 444 is slidably affixed to the linear slide rods 447 running through bushings or linear bearings in the rotor disk securing the rotor rings 444 so that their axis of rotation is collinear with the axle 410 axis of rotation. When the rotor rings 444 are positioned beneath the stator ring 439, the outer surfaces of the rotor rings 444 are separated from the inner surface of the stator ring 439 by a small air gap. The slidably affixed rotor rings 444 may be moved in the axial direction based on commands from the computer system to the rotor linear actuator 461 to be positioned in a defined spot relative to the stator ring 439.

As previously discussed herein, FIGS. 22 through 24 show example positioning of the rotor rings 444 relative to the stator ring 439. For example, FIG. 22 shows the rotor rings 444 positioned by the linear actuators on either side of the stator ring 439 (approximately one rotor length in the axial direction apart from the edge of the stator ring 439) where the interaction of the flux between the rotor magnets 443 and the stator windings is a very low (e.g., negligible or nonexistent) and the MGT unit 400 is effectively in a neutral position.

FIG. 23 shows the rotor rings 444 positioned on either side of the stator ring 439 where the outer edges of the stator ring 439 and the inner edges of the rotor rings 444 are in near alignment. In this positioning, the interaction of the flux between the rotor magnets 443 and the stator windings is low, as is the force to turn the rotor rings 444. If the MGT unit 400 is employed in a generator, this makes it feasible, e.g., in hybrid vehicles, to generate recharge power to the batteries while the vehicle is being operated under combustion power and to do so with no or minimal additional power from the combustion engine, operating essentially on waste inertial power from the moving vehicle. As the rotor rings 444 are moved from the neutral position to the edge of stator alignment, the voltage generated when operating as a generator at constant RPM increases exponentially from zero or near zero to the low value achieved when the inner edges of the rotor rings 444 are aligned with the outer edges of the stator ring 439.

FIG. 24 shows the rotor rings 444 brought together within or substantially within coverage of the stator ring 439, e.g., with their inner edges centered on the center plane of the stator ring 439. In this positioning, the interaction of the flux between the rotor magnets 443 and the stator windings may be at its maximum and the voltage generated when operating as a generator can also be at its maximum. At any point between where the inner edges of the rotor rings 444 are at the outer edges of the stator ring 439 and where the inner edges of the rotor rings 444 is at the center plane of the stator ring 439, the voltage generated is proportional to the distance of the inner rotor ring edges from the outer stator ring edges to the center plane of the stator ring 439, which may be the maximum value.

It is noted that while three distinct positions for the rotor rings 444 relative to the stator ring 439 are described herein, the rotor rings 444 and optionally the stator ring 439 can be repositioned at any number of positions allowed by the components (e.g., slide bars, translator bar, actuators, etc.) of the MGT unit 400. In this regard, the MGT unit 400 can be magnetically focused with a high degree of precision to optimize overall system efficiency, whether employed as a motor or a generator.

FIGS. 25 through 36 show another embodiment of an MGT unit 500/system that employs variable torque magnetic focusing. The difference between the embodiment shown in FIGS. 25 through 36 and the embodiment shown in FIGS. 16 through 24 lies in the method and manner of translating the rotor rings 544 and possibly the stator ring 539 to reconfigure the components to positions 1, 2 and 3 (described above) and any positions in between. It is further contemplated that additional methods of repositioning the rotor rings 544 and possibly the stator ring 539 can be employed without departing from the scope of this disclosure.

Figure 25:
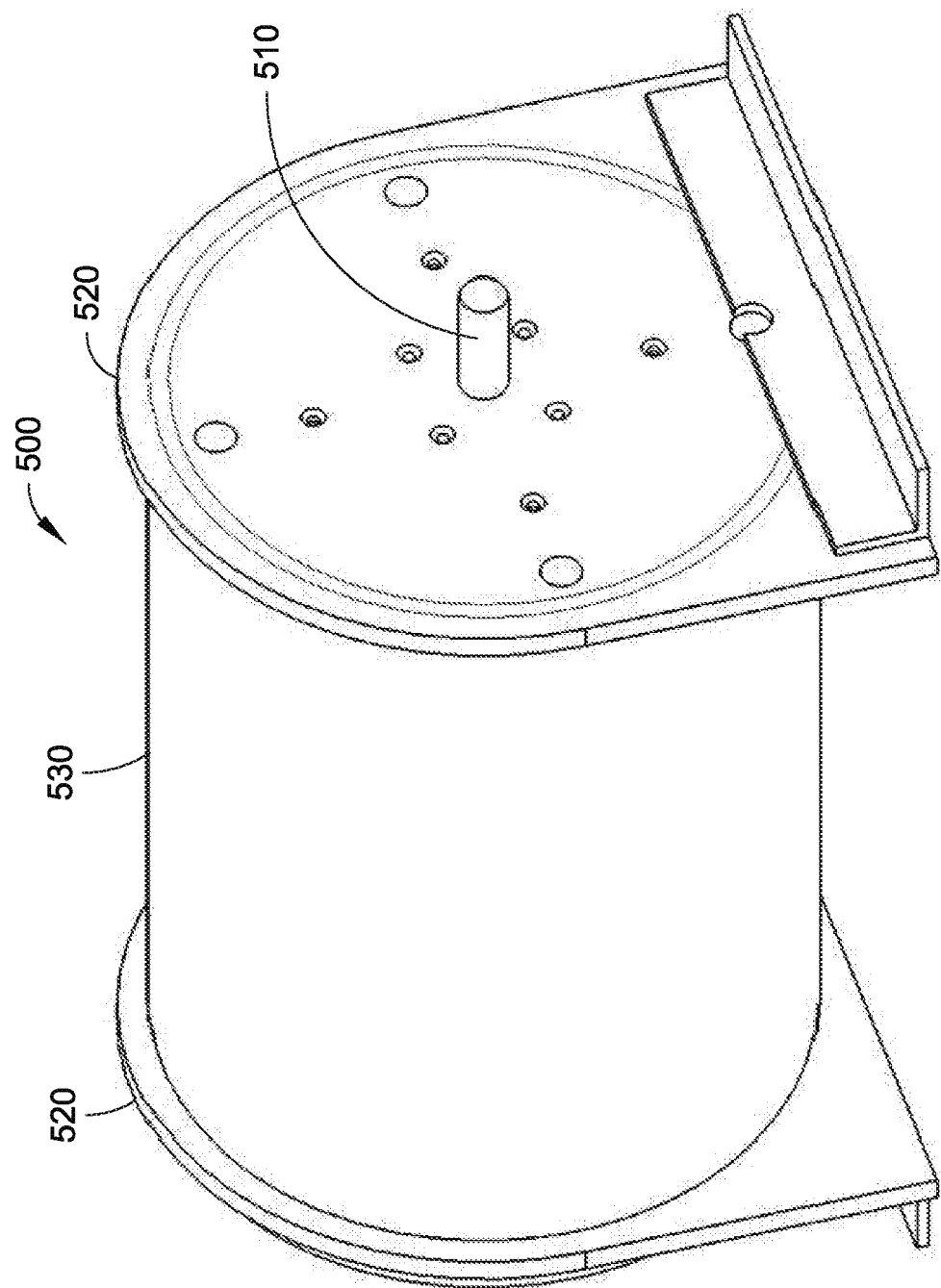
FIG. 25 is a perspective view illustrating MGT unit, in accordance with an example embodiment of the present disclosure.

FIG. 25 shows an embodiment of the MGT unit 500 having a housing including a cover 530 and end plates 520

Figure 26:
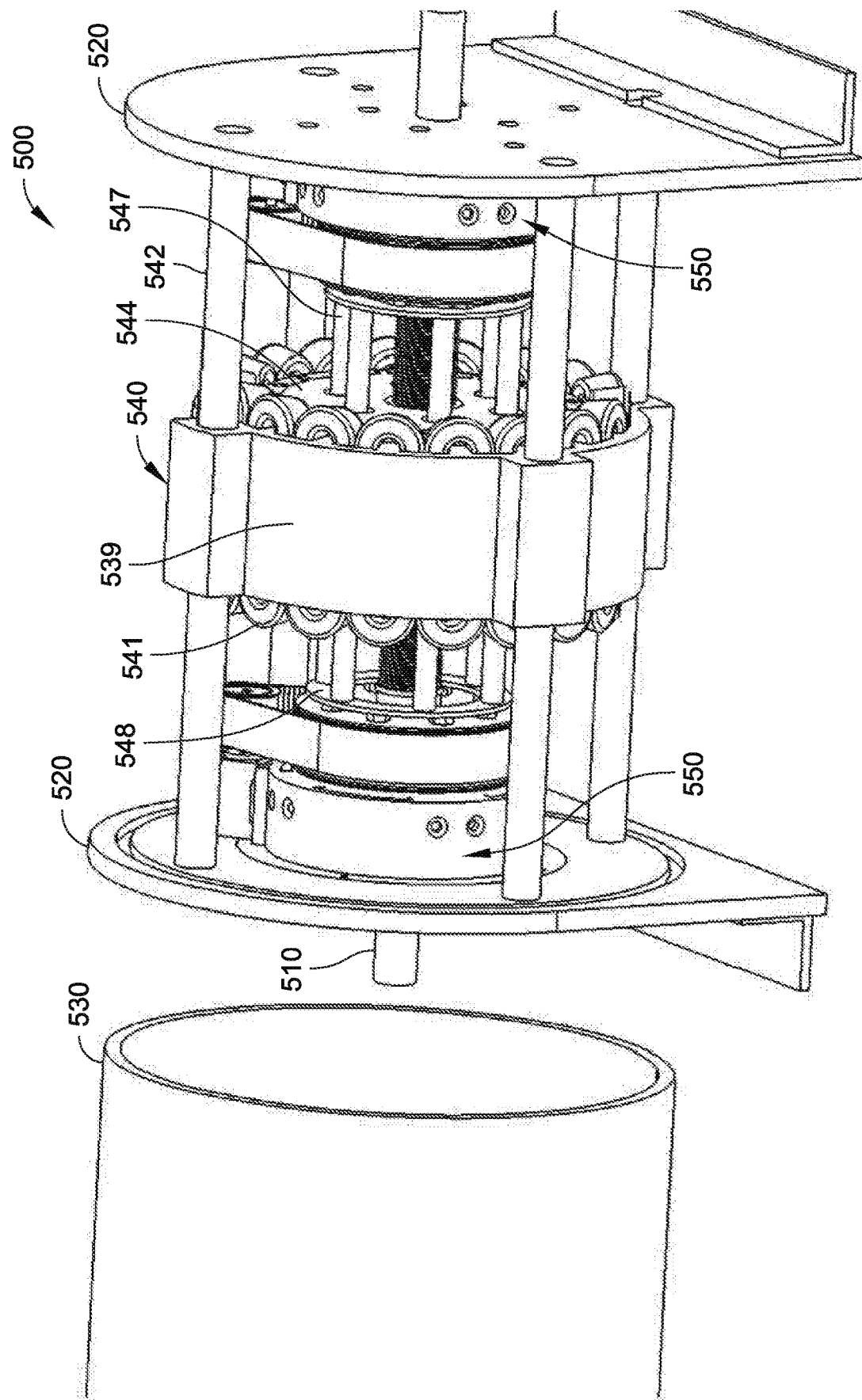
FIG. 26 is another perspective view of the MGT unit illustrated in FIG. 25 with a portion of its housing removed, in accordance with an example embodiment of the present disclosure.
Figure 27:
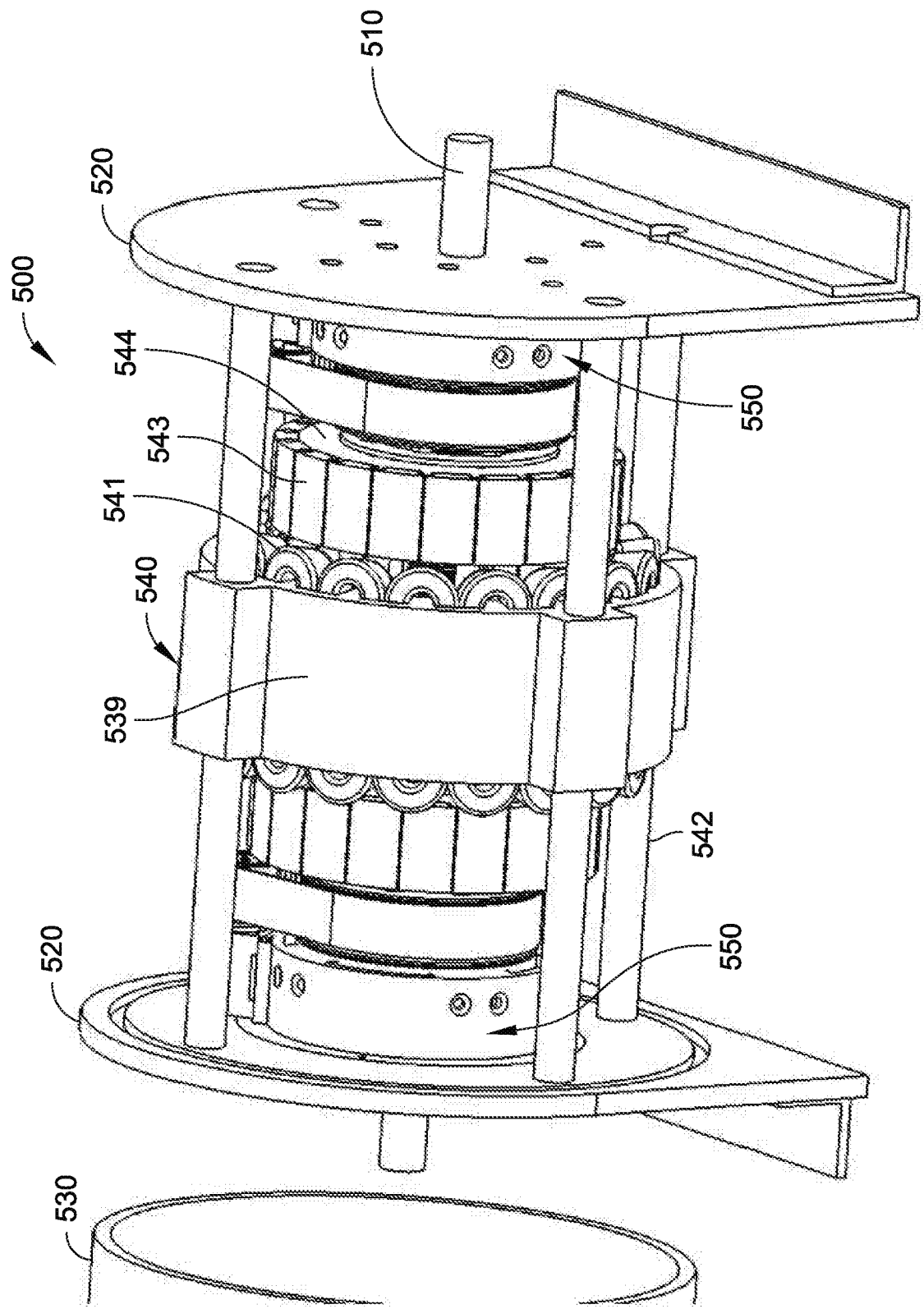
FIG. 27 is another perspective view of the MGT unit illustrated in FIG. 25 with a portion of its housing removed, in accordance with an example embodiment of the present disclosure.
Figure 28:
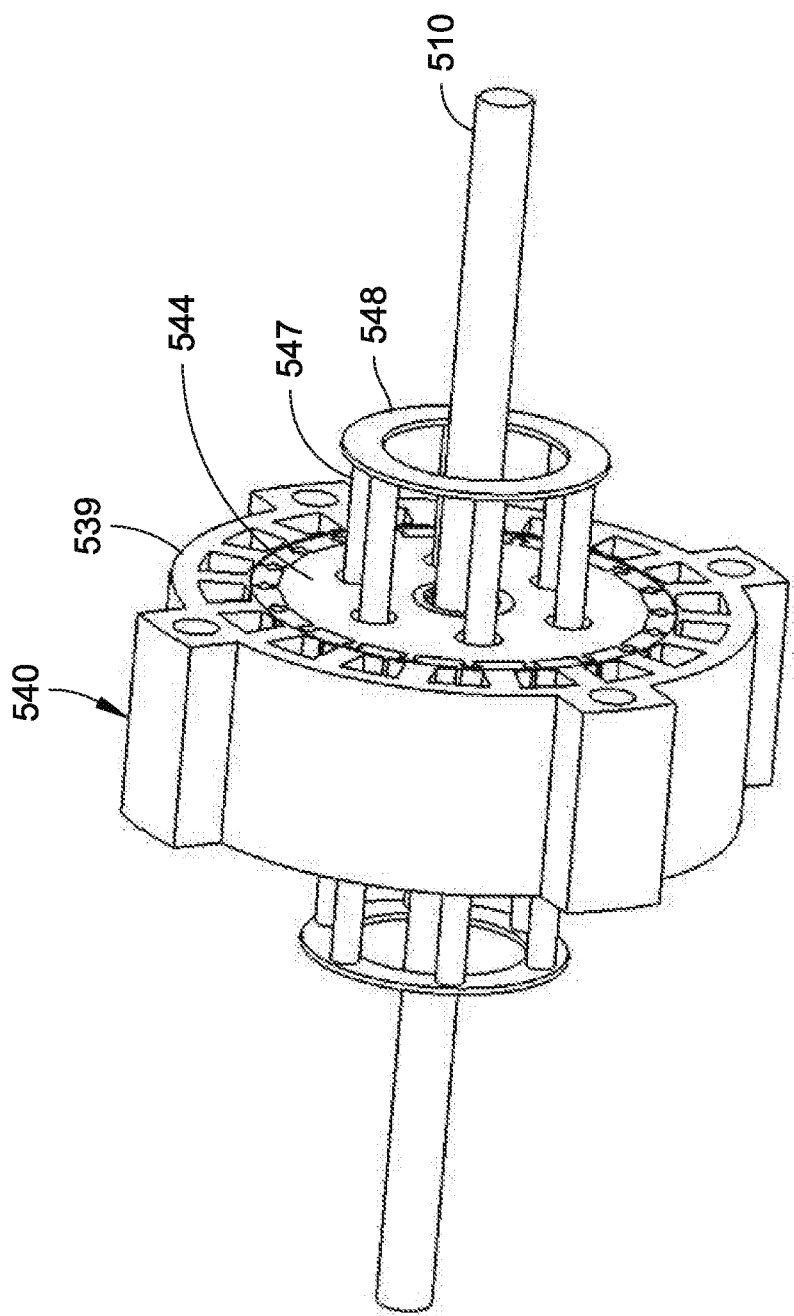
FIG. 28 is a perspective view of a rotor assembly at least partially surrounded by a stator ring of the MGT unit illustrated in FIG. 25, in accordance with an example embodiment of the present disclosure.
Figure 29:
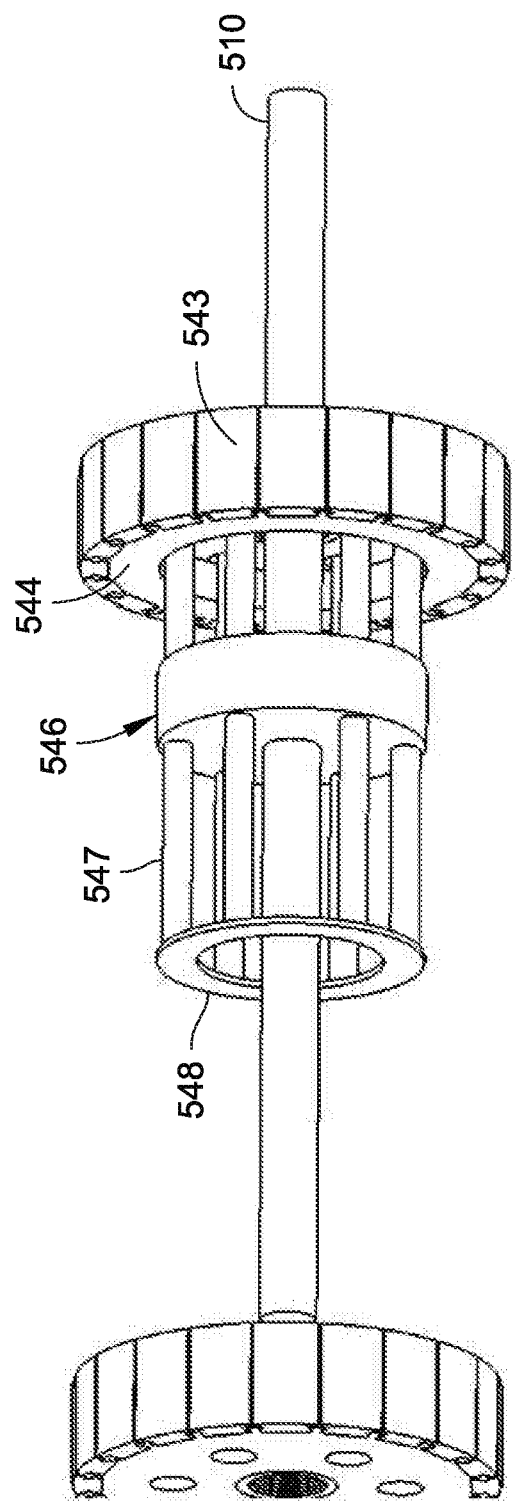
FIG. 29 is a perspective view of a rotor assembly of the MGT unit illustrated in FIG. 25, in accordance with an example embodiment of the present disclosure.
Figure 30:
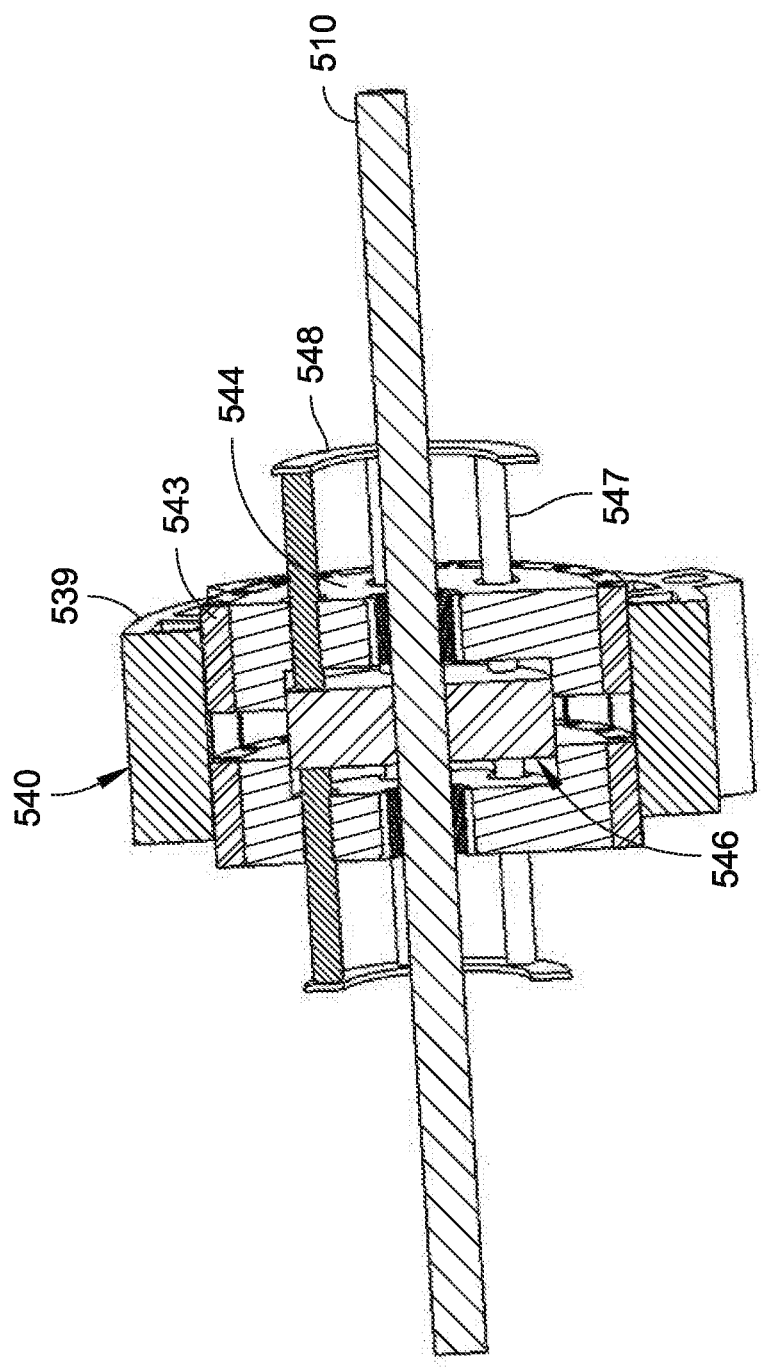
FIG. 30 is a cross-sectional side view of a rotor assembly at least partially surrounded by a stator ring of the MGT unit illustrated in FIG. 25, in accordance with an example embodiment of the present disclosure.
Figure 31:
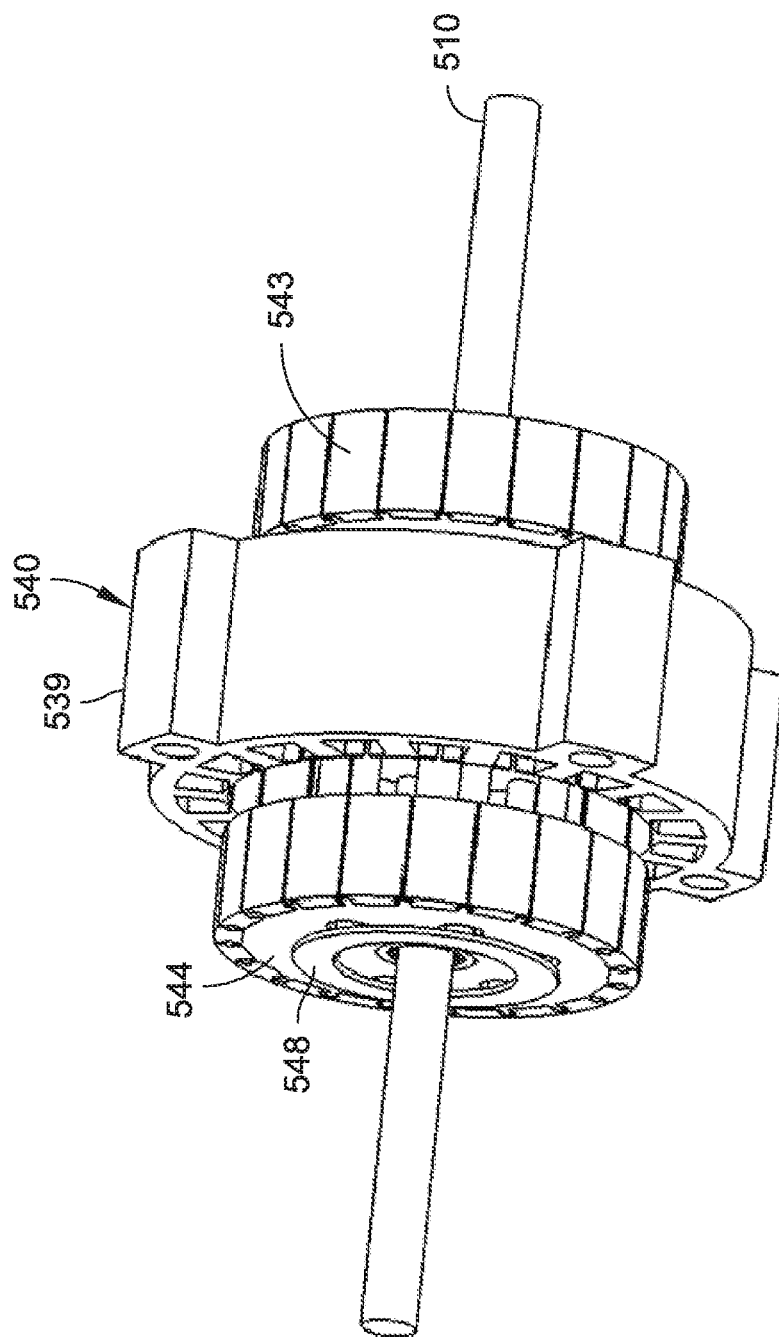
FIG. 31 is another perspective view of a rotor assembly at least partially surrounded by a stator ring of the MGT unit illustrated in FIG. 25, in accordance with an example embodiment of the present disclosure.
Figure 32:
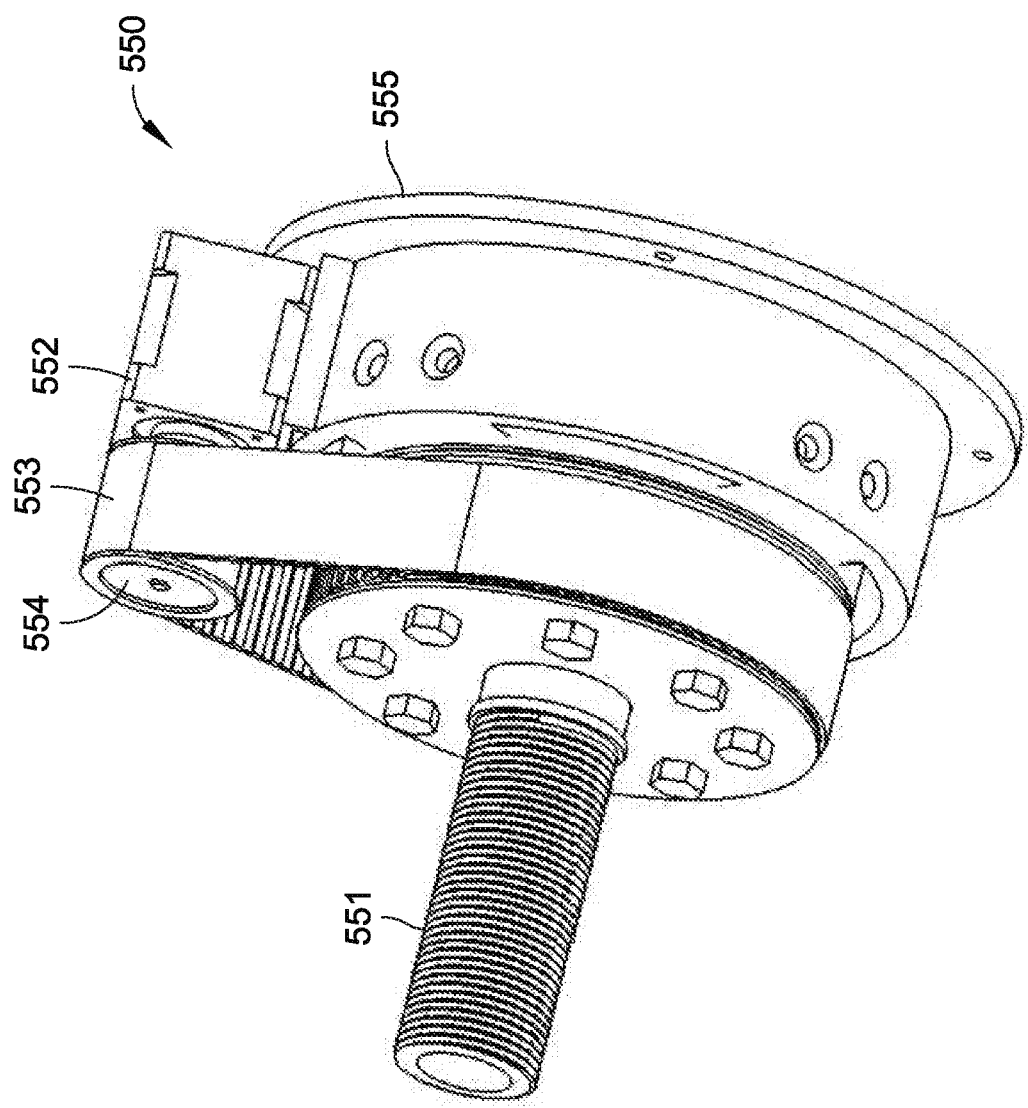
FIG. 32 is a perspective view of a rotor actuator of the MGT unit illustrated in FIG. 25, in accordance with an example embodiment of the present disclosure.
Figure 33:
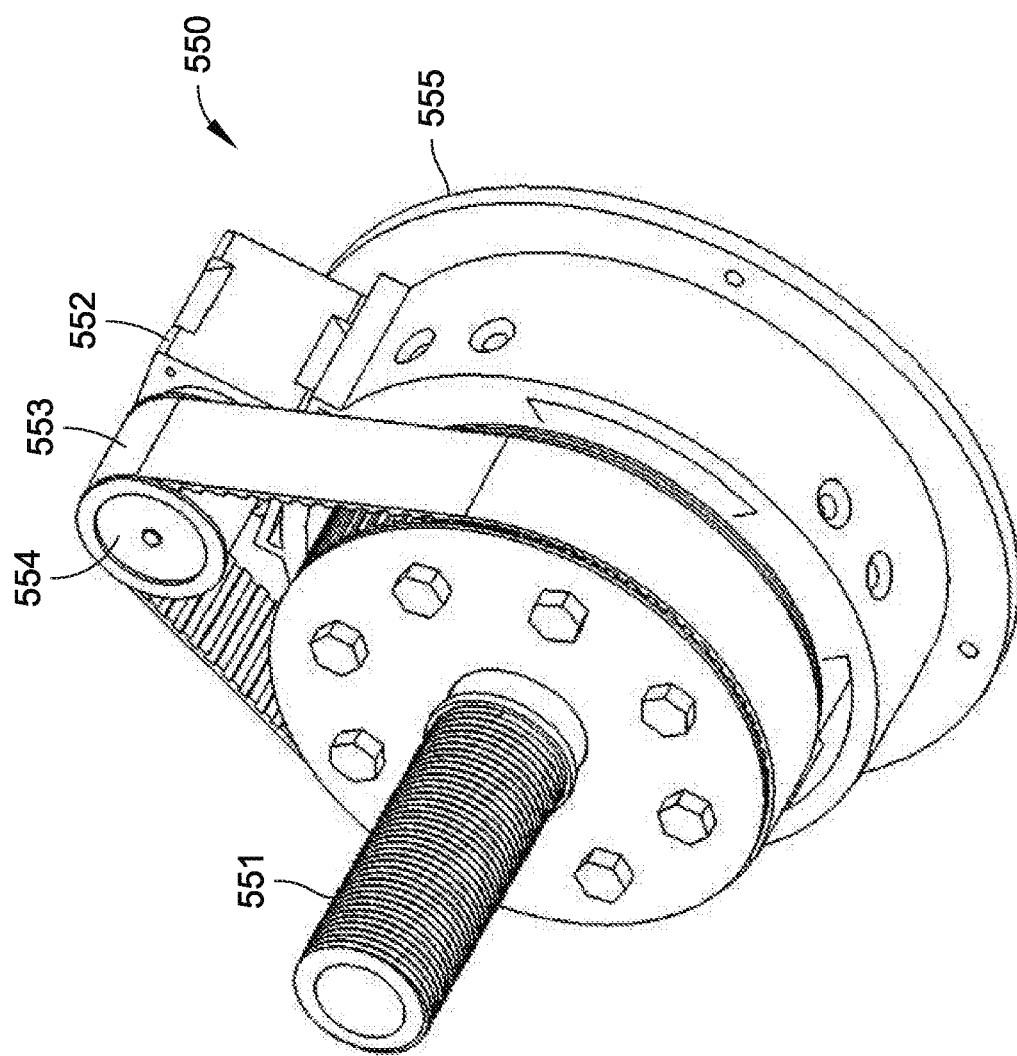
FIG. 33 is another perspective view of the rotor actuator of the MGT unit illustrated in FIG. 25, in accordance with an example embodiment of the present disclosure.
Figure 34:
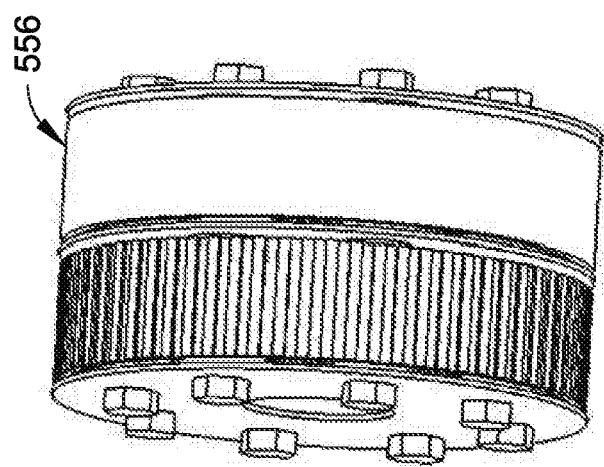
FIG. 34 is a side elevation view of a first set of gears for the rotor actuator of the MGT unit illustrated in FIG. 25, in accordance with an example embodiment of the present disclosure.
Figure 35:
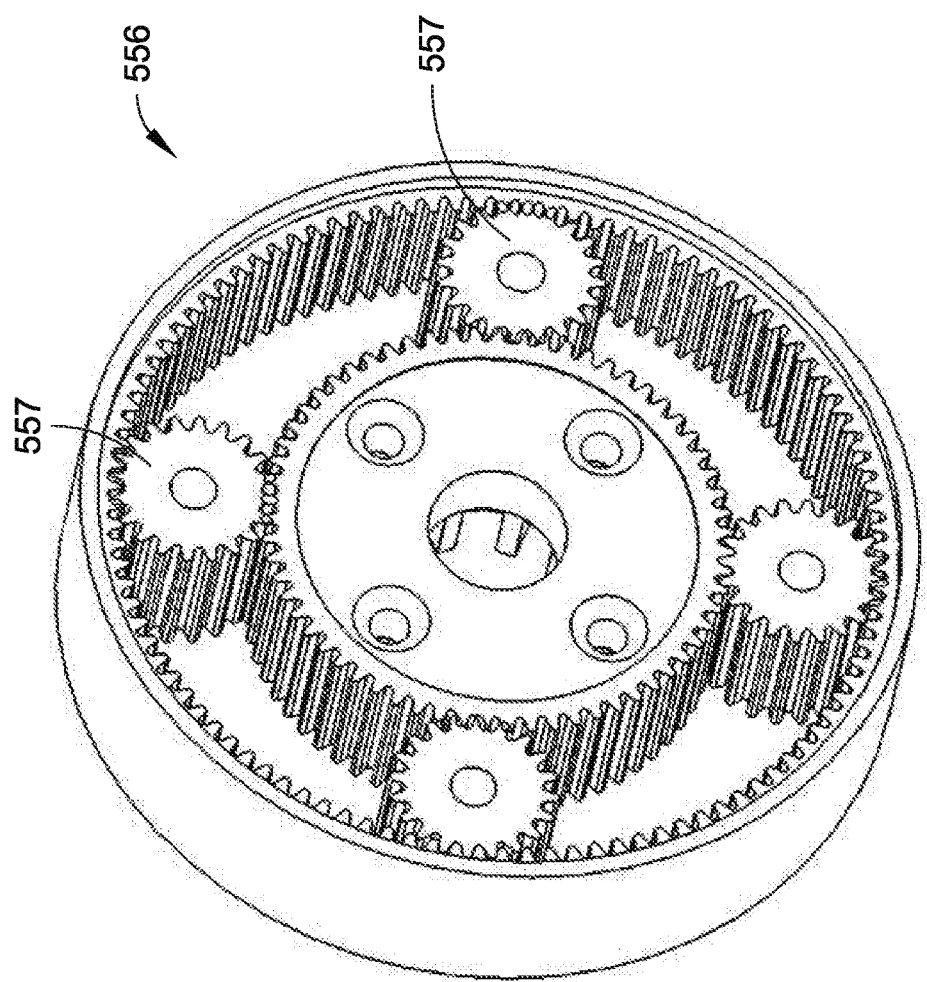
FIG. 35 is a perspective view of a planetary gear, in accordance with an example embodiment of the present disclosure.
Figure 36:
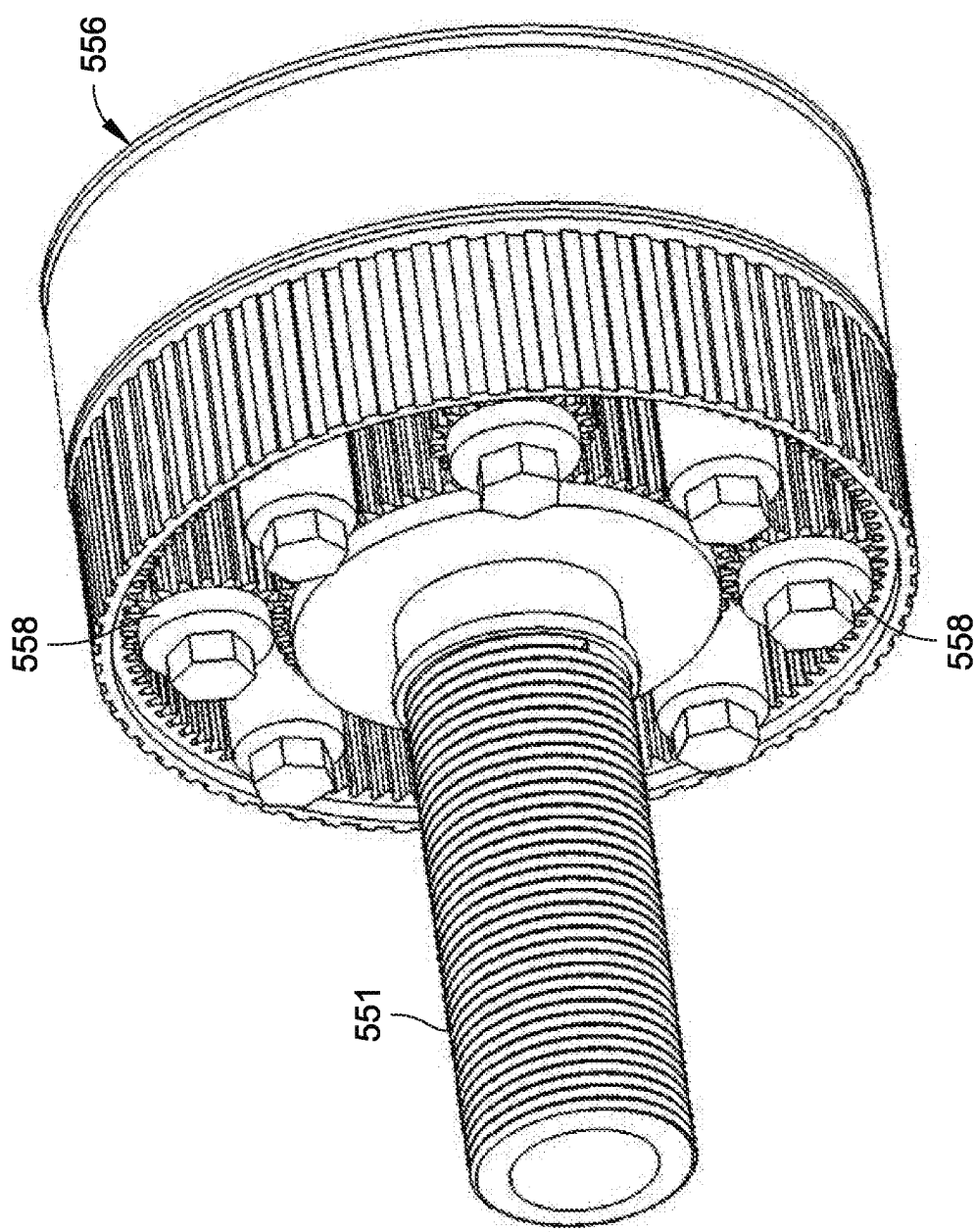
FIG. 36 is a side elevation view of a second set of gears for the rotor actuator of the MGT unit illustrated in FIG. 25, including the planetary gear of FIG. 35, in accordance with an example embodiment of the present disclosure.

(e.g., similar to those of the MGT unit 400 of FIGS. 16 through 24). FIGS. 26 and 27 show the MGT unit 500 with the cover 530 removed and the stator ring 539 with its respective stator windings (coils 541) wrapped around its stator cores. The stator ring 539 can be supported by a stator support structure 540 comprising plurality of (e.g., three or more) stator support bars 542 that can be evenly spaced around the periphery of the stator ring 539 extending between the two end plates 520, affixed to the end plates 520 and the stator ring 539 to hold the stator in a fixed position, which may be near the center of MGT unit 500 with its center plane perpendicular to the axis of the axle 510, coincident with the center plane of the rotor support structure 546 with its central axis collinear with the central axis of the axle 510.

FIGS. 28 through 31 show various views of the sliding rotor support structure 546 with the rotor support structure 546 affixed to the axle 510 with a plurality of (e.g., three or more linear slide rods 547) that can be evenly spaced around the periphery of the rotor support structure 546 running through the inside edge of the rotor support structure 546 parallel to the axle 510, rigidly affixed to the rotor support structure 546 at equal distance from the central axis of the axle 510 with slide rod end plate rings 548 affixed to the ends of the linear slide rods 547. The two rotor rings 544 are slidably affixed to the linear slide rods 547 by bushings or linear bearings (not shown) in the rotor rings 544 allowing movement of the rotor rings 544 in the axial direction towards or away from each other between the center plane of the rotor support structure 546 and the slide rod end plates 520. Permanent magnets 543 are mounted around the periphery of each rotor ring 544, evenly spaced with alternating north and south poles facing radially outward. The outer circumferential face of the rotor magnets 543 can be a constant distance from the central axis of the axle 510, providing a small air gap between the circumferential face of the rotor magnets 543 and the inner circumferential face of the stator ring 539 when the center plane of the stator (perpendicular to the rotor axle 510) and the inside edges of the rotor rings 544 are coplanar. The north and south poles of the rotor magnets 543 on each rotor are affixed in the same radial position around the periphery of each rotor ring 544 such that when the rotor rings 544 are translated together the north pole magnets 543 on the first rotor ring 544 are in the same radial position as the north pole magnets 543 on the second rotor ring 544, directly opposing one another.

FIGS. 32 through 36 show an embodiment of the rotor linear actuator 550. In this embodiment there is one rotor linear actuator 550 for each rotor ring 544. In other embodiments there may be only one rotor linear actuator for both rotor rings 544 or there may be at least one linear actuator for the rotor rings 544 and at least one for the stator ring 539. The rotor linear actuator 550 can include a stepper motor 552, a drive belt 553, a drive gear 554, two sets of planetary gears 556, a screw actuator 551, and a planetary gear housing 555. The screw actuator 551 is a hollow pipe threaded on its exterior surface for most of its length. The screw actuator 551 fits around the axle 510 which runs through it, extending outwardly from the rotor support structure 546. The screw actuator 551 is rotationally affixed to the axle 510 by bushings or rotary bearings (not shown) on each end. The screw actuator 551 threads mate on the end facing the rotor support structure 546 with matching threads in a hole in the center of the rotor ring 544 such that as the screw actuator 551 is turned relative to the axle 510 the rotor ring 544 will translate in the axial direction in either direction depending on whether the screw actuator 551 is turned clockwise or counter clock wise. The screw actuator 551 is affixed on the end away from the rotor support structure 546 to the sun gear of the inner set of planetary gears 558 closest to the rotor support structure 546. The screw actuator 551 and the first sun gear generally rotate with the axle 510 turning the planetary gears which have common axles 510 with the planetary gears on the outer set of planetary gears 557 whose sun gear is affixed to the rotor shaft and whose ring gear is affixed to the planetary gear housing which in turn is affixed to the end plate 520. When the stepper motor 552 is activated by command from the computer system, the drive belt 553 turns the ring gear on planetary set 556 causing the screw actuator 551 to turn relative to the axis of the axle 510, causing the rotor ring 544 to translate between positions 1, 2, and 3 previously described herein (and any other positions) as selected by the computer system based on sensor information and/or commands received through a user interface.

Example Implementations Variable Stator Winding Configurations

Figure 7:
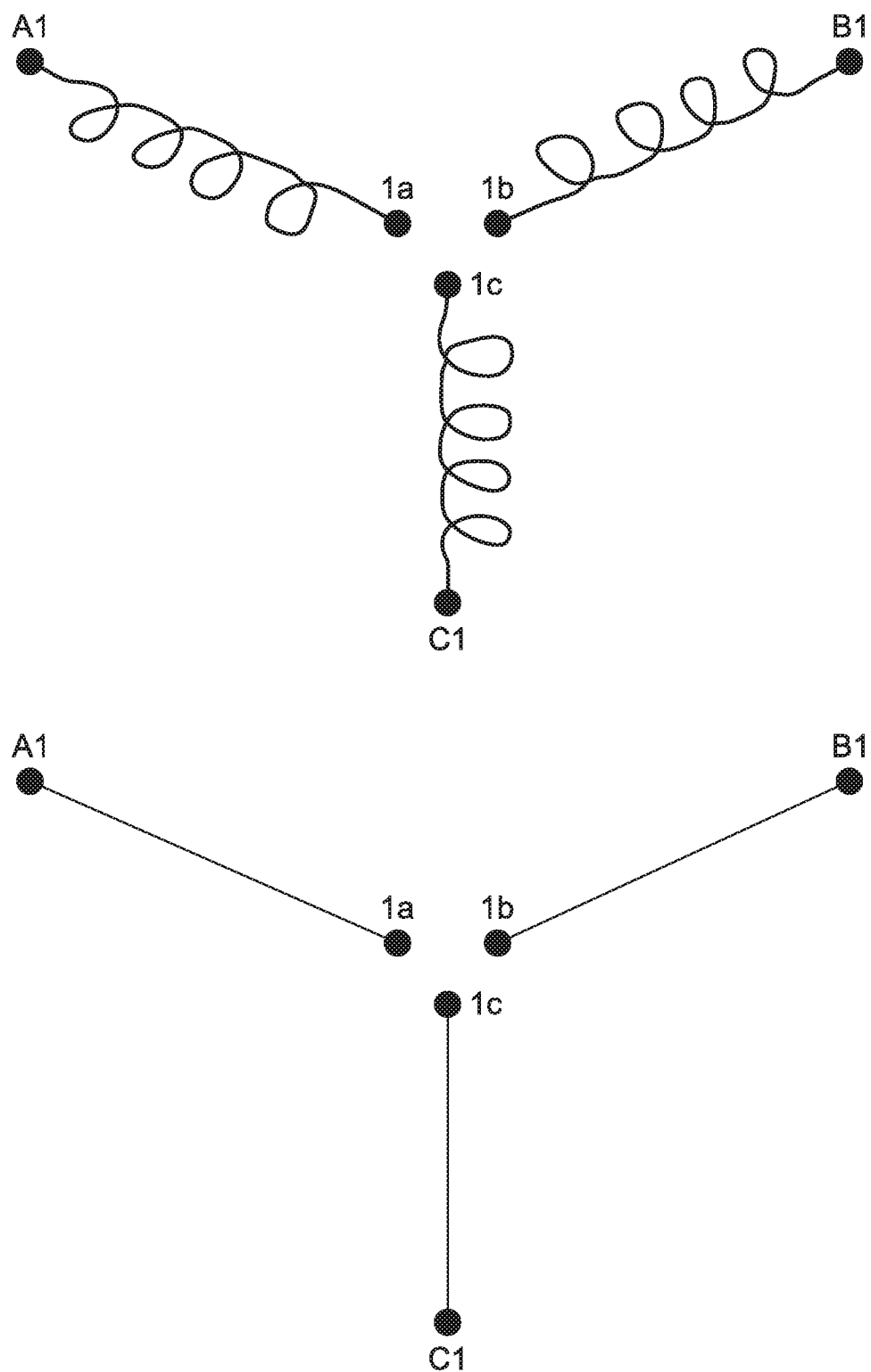
FIG. 7 is a diagrammatic illustration of separated center three-phase stator winding assemblies, in accordance with an example embodiment of the present disclosure.

Referring now to FIGS. 7 through 14, a stator configuration (e.g., for any of the stator rings described herein) can comprise a separated center 3-phase wiring (e.g., as shown in FIG. 7). The 3-phase stator's center connections 1a, 1b, and 1c are configured to link three phases (e.g., phases 1, 2, and 3) to one point when coupled together. The live end of phase 1 is illustrated as A1, the live end of phase 2 is illustrated as B1, and the live end of phase 3 is illustrated as C1. As shown in FIG. 7, the phases can be separated such that the center connections 1a, 1b, and 1c are to be selectively connected (e.g., ends 1a, 1b, and 1c can be connected together or connected to other 3-phase windings).

Figure 8:
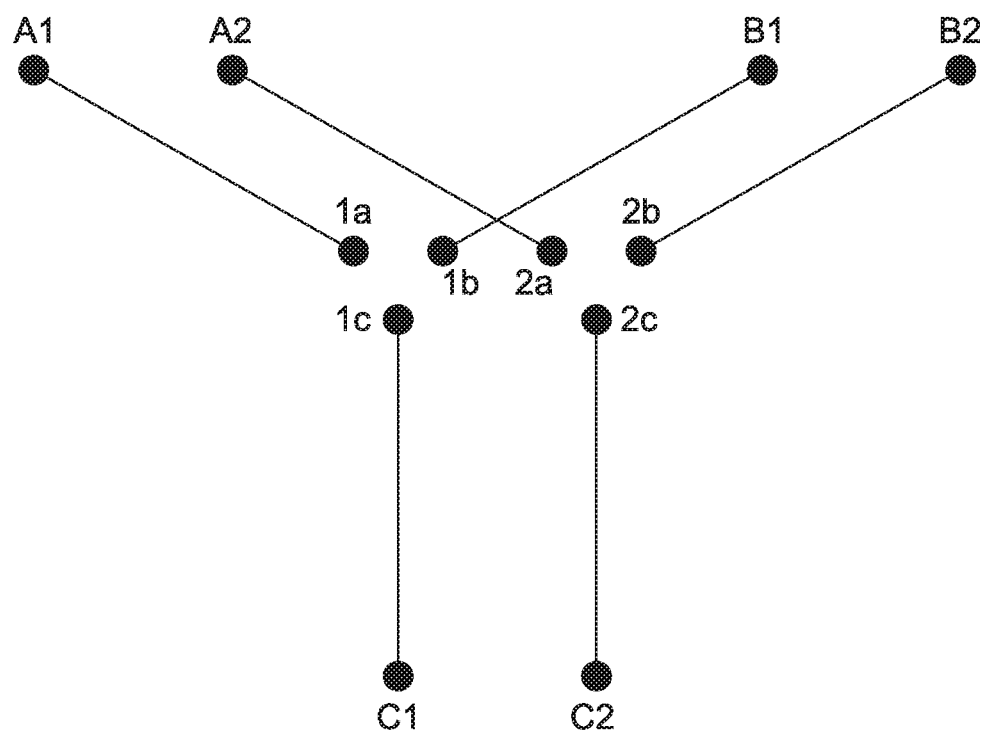
FIG. 8 is a diagrammatic illustration of a two-wire separated stator winding assembly, in accordance with an example embodiment of the present disclosure.

In some embodiments, a separated center 3-phase wiring including a 2-wire configuration (e.g., as shown in FIG. 8). Phase 1, phase 2 and phase 3 for each of the two windings have separated center connections (e.g., center connections 1a, 1b, and 1c for a first winding and center connections 2a, 2b and 2c for a second winding). The live end of phase 1 is illustrated as A1 and A2 for each of the first and second windings, respectively. The live end of phase 2 is illustrated as 131 and B2 for each of the first and second windings, respectively. The live end of phase 3 is illustrated as C1 and C2 for each of the first and second windings, respectively. In this 2-wire scenario the winding A1 and A2 are in parallel around the iron cores and end in the central connections 1a and 2a likewise are B1 with B2, central connection 1b with 2b likewise are C1 with C2, central connection 1c with 2c.

In the 2-wire configuration there are parallel (Gear #4) and series (Gear #1) modes available. The individual winding sections while operating in parallel mode (Gear #4) can include connecting A1 to A2, B1 to B2, C1 to C2, and the central connections 1a, 1b, 1c, 2a, 2b and 2c can be connected together. The individual winding sections while operating in series mode (Gear #1) can include connecting 1a to A2, 1b to B2, 1c to C2, and the central connections 2a, 2b and 2c can be connected together. In this configuration, each active winding section carries half the voltage of the parallel mode (Gear #4) and ¼ of the current found in the parallel mode configuration when serving as a generator under constant power.

Figure 9:
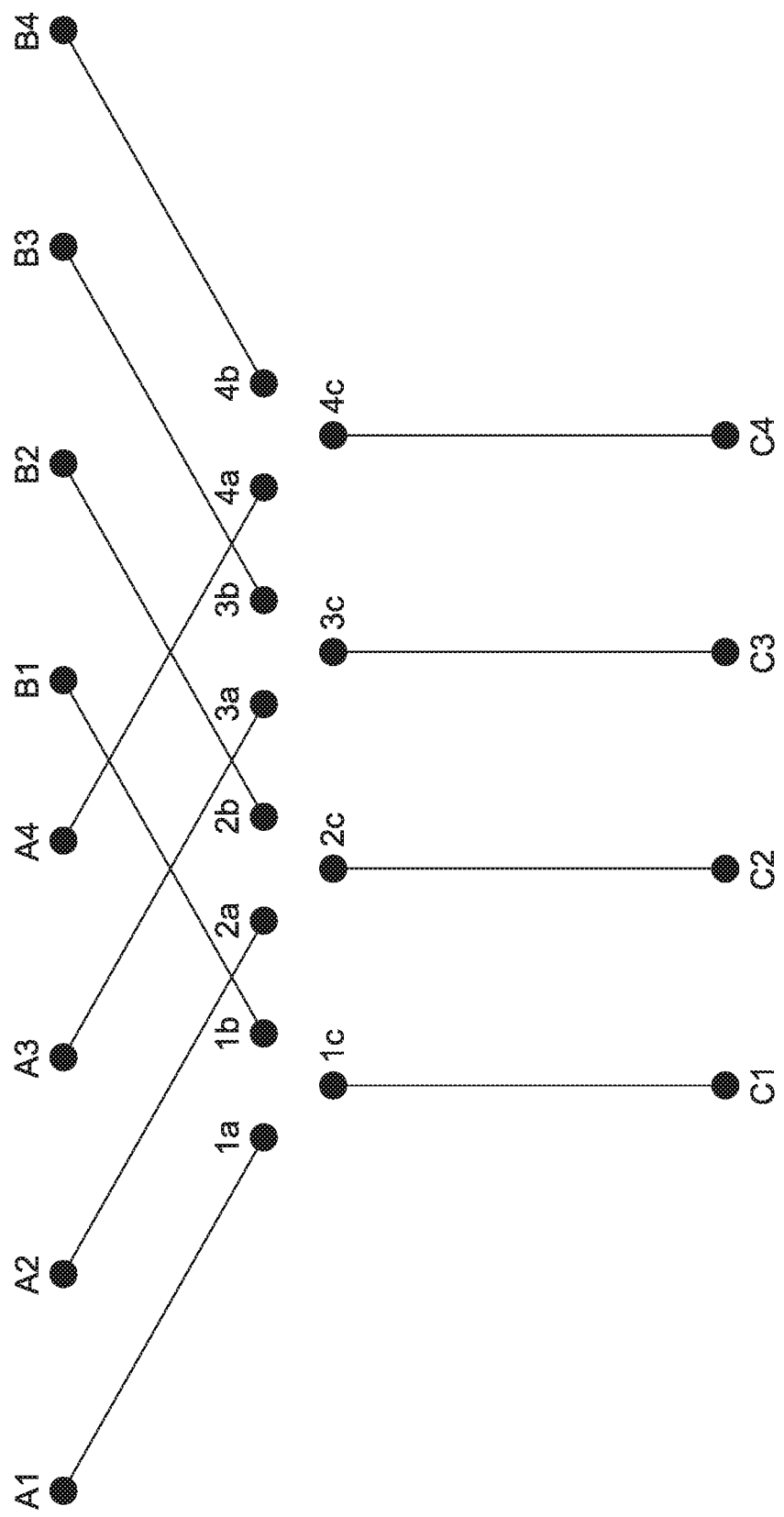
FIG. 9 is a diagrammatic illustration of a four-wire separated stator winding assembly, in accordance with an example embodiment of the present disclosure.

In another embodiment, a stator configuration can comprise a separated center 3-phase wiring including a 4-wire configuration (e.g., as shown in FIG. 9). Phase 1, phase 2 and phase 3 for each of the four windings can have separated center connections (e.g., center connections 1a, 1b, and 1c for a first winding, center connections 2a, 2b and 2c for a second winding, center connections 3a, 3b, and 3c for a third winding, and center connections 4a, 4b and 4c for a fourth winding). The live end of phase 1 is illustrated as A1, A2, A3 and A4 for each of the first, second, third, and fourth windings, respectively. The live end of phase 2 is illustrated as B1, B2, B3 and B4 for each of the first, second, third, and fourth windings, respectively. The live end of phase 3 is illustrated as C1, C2, C3 and C4 for each of the first, second, third, and fourth windings, respectively. In this 4-wire scenario the windings A1, A2, A3 and A4 are in parallel around the iron cores and end in the central connections 1a, 2a, 3a and 4a, likewise are B1, B2, B3 with B4 ending in central connections 1b, 2b, 3b with 4b, and likewise are C1, C2, C3 with C4 ending with central connection 1c, 2c, 3c with 4c.

In the 4-wire configuration there are parallel (Gear #4), parallel/series (Gear #2), and series (Gear #1) modes available. The individual winding sections while operating in parallel mode (Gear #4) can include connecting A1, A2 and A3 to A4; B1, B2 and B3 to B4; C1, C2 and C3 to C4, and the central connections 1a, 2a, 3a, 4a, 1b, 2b, 3b, 4b, 1c, 2c, 3c and 4c can be connected together. The individual winding sections while operating in series/parallel mode (Gear #2) can include connecting A1 to A2; 1a, 2a, A3 and A4; B1 to B2; 1b, 2b, B3 and B4; C1 to C2; 1c, 2c, C3 and C4; 3a, 4a, 3b, 4b, 3c and 4c. In this configuration (Gear #2), each active winding section carries half the voltage of the parallel mode (Gear #4) and $\frac{1}{4}^{th}$ of the current found in the parallel mode (Gear #4) configuration. The individual winding sections while operating in series mode (Gear #1) can include connecting 1a to A2, 2a to A3, 3a to A4, 1b to B2, 2b to B3, 3b to B4, 1c to C2, 2c to C3, 3c to C4, and 4a, 4b and 4c together. In this configuration (Gear #1), each active winding section carries one fourth the voltage of the parallel mode (Gear #4) and $\frac{1}{8}^{th}$ of the current found in the parallel mode configuration when serving as a generator under constant power.

In another embodiment, the stator configuration includes a separated center 3-phase wiring including a 6-wire configuration (e.g., as shown in FIG. 10). Phase 1, phase 2 and phase 3 for each of the six windings can have separated center connections (e.g., center connections 1a, 1b, and 1c for a first winding, center connections 2a, 2b and 2c for a second winding, center connections 3a, 3b, and 3c for a third winding, center connections 4a, 4b and 4c for a fourth winding, center connections 5a, 5b, and 5c for a fifth winding, and center connections 6a, 6b and 6c for a sixth winding). The live end of phase 1 is illustrated as A1, A2, A3, A4, A5 and A6 for each of the first, second, third, fourth, fifth, and sixth windings, respectively. The live end of phase 2 is illustrated as B1, B2, B3, B4, B5 and B6 for each of the first, second, third, fourth, fifth, and sixth windings, respectively. The live end of phase 3 is illustrated as C1, C2, C3, C4, C5 and C6 for each of the first, second, third, fourth, fifth, and sixth windings, respectively. In this 6-wire scenario the winding A1, A2, A3, A4, A5 and A6 are in parallel around the iron cores and end in the central connections 1a, 2a, 3a, 4a, 5a and 6a, likewise are B1, B2, B3, B4, B5 with B6 ending in central connections 1b, 2b, 3b, 4b, 5b with 6b, and likewise are C1, C2, C3, C4, C5 with C6 ending with central connection 1c, 2c, 3c, 4c, 5c with 6c.

In the 6-wire configuration there are parallel (Gear #4), first parallel/series (Gear #3), second parallel/series (Gear #2), and series (Gear #1) modes available. The individual winding sections while operating in parallel mode (Gear 44, illustrated in FIG. 11) can include connecting A1, A2, A3, A4, A5, and A6 together, B1, B2, B3, B4, B5, and B6 together, C1, C2, C3, C4, C5, and C6 together, and the central connections 1a, 1b, 1c, 2a, 2b, 2c, 3a, 3b, 3c, 4a, 4b, 4c, 5a, 5b, 5c, 6a, 6b and 6c can be connected together.

The individual winding sections while operating in series/parallel mode (Gear #3, illustrated in FIG. 12) can include connecting A1, A2 and A3 together, 1a, 2a, 3a, A4, A5 and A6 together, B1, B2 and B3 together, 1b, 2b, 3b, B4, B5 and B6 together, C1, C2 and C3 together, 1c, 2c, 3c, C4, C5 and C6 together, 4a, 5a, 6a, 4b, 5b, 6b, 4c, 5c and 6c together. In this configuration (Gear #3), each active winding section carries half the voltage of the parallel mode (Gear #4) and $\frac{1}{4}^{th}$ of the current found in the parallel mode (Gear #4) configuration when serving as a generator under constant power.

The individual winding sections while operating in another series/parallel mode (Gear #2, illustrated in FIG. 13) can include connecting: A1 to A2; 1a, 2a, A3 and A4 together; 3a, 4a, A5 and A6 together; B1 to B2; 1b, 2b, B3 and B4 together; 3b, 4b, B5 and B6 together; C1 to C2; 1c, 2c, C3 and C4 together; 3c, 4c, C5 and C6 together; and 5a, 6a, 5b, 6b, 5c and 6c together. In this configuration (Gear #2), each active winding section carries one third the voltage of the parallel mode (Gear #4) and $\frac{1}{16}^{th}$ of the current found in the parallel mode (Gear #4) configuration when serving as a generator under constant power.

The individual winding sections while operating in series mode (Gear #1, illustrated in FIG. 14) can include connecting: 1a to A2; 2a to A3; 3a to A4; 4a to A5; 5a to A6; 1b to B2; 2b to B3; 3b to B4; 4b to B5; 5b to B6; 1c to C2; 2c to C3; 3c to C4; 4c to C5; 5c to C6; and 6a, 6b and 6c together. In this configuration (Gear #1), each active winding section carries one sixth the voltage of the parallel mode (Gear #4) and $\frac{1}{12}^{th}$ of the current found in the parallel mode (Gear #4) configuration when serving as a generator under constant power.

Figure 11:
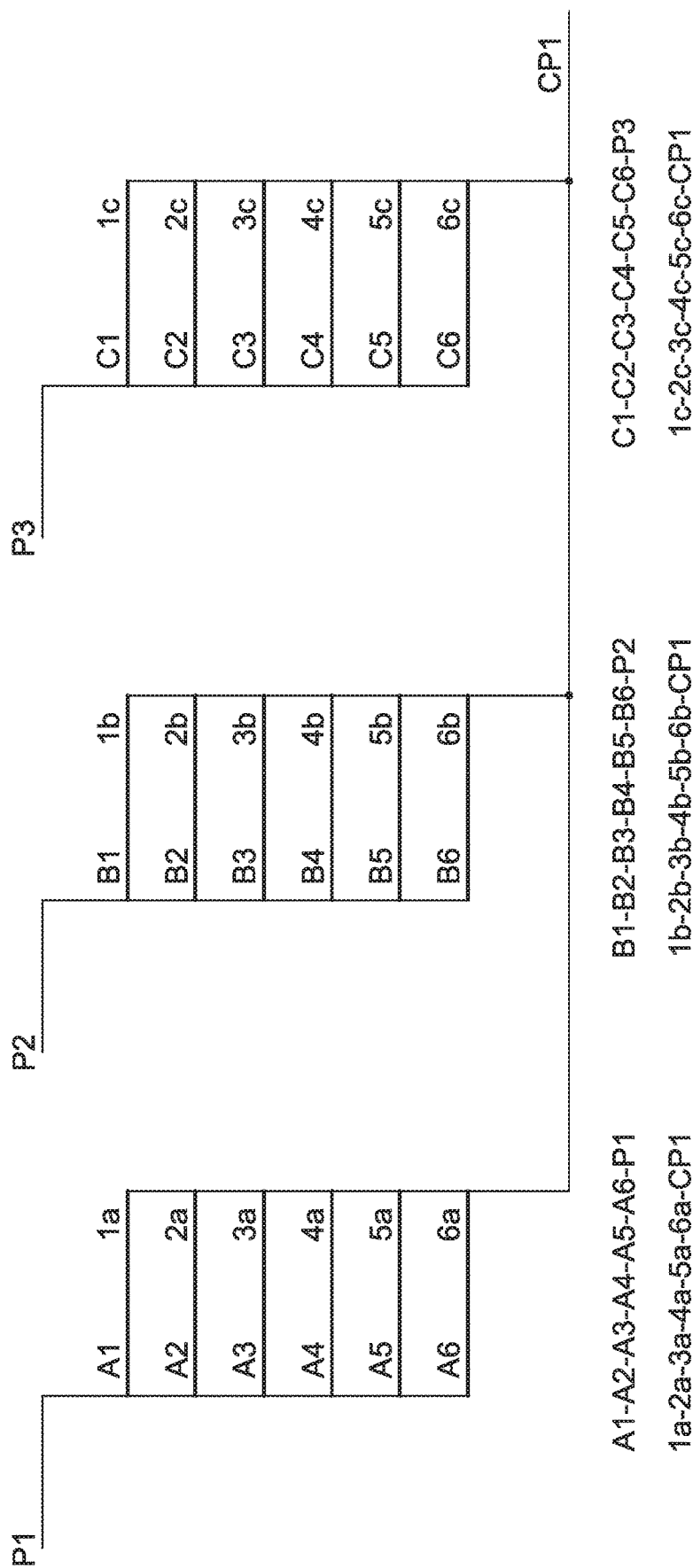
FIG. 11 is a diagrammatic illustration of stator winding sets in a parallel gear configuration, in accordance with an example embodiment of the present disclosure.
Figure 11B:
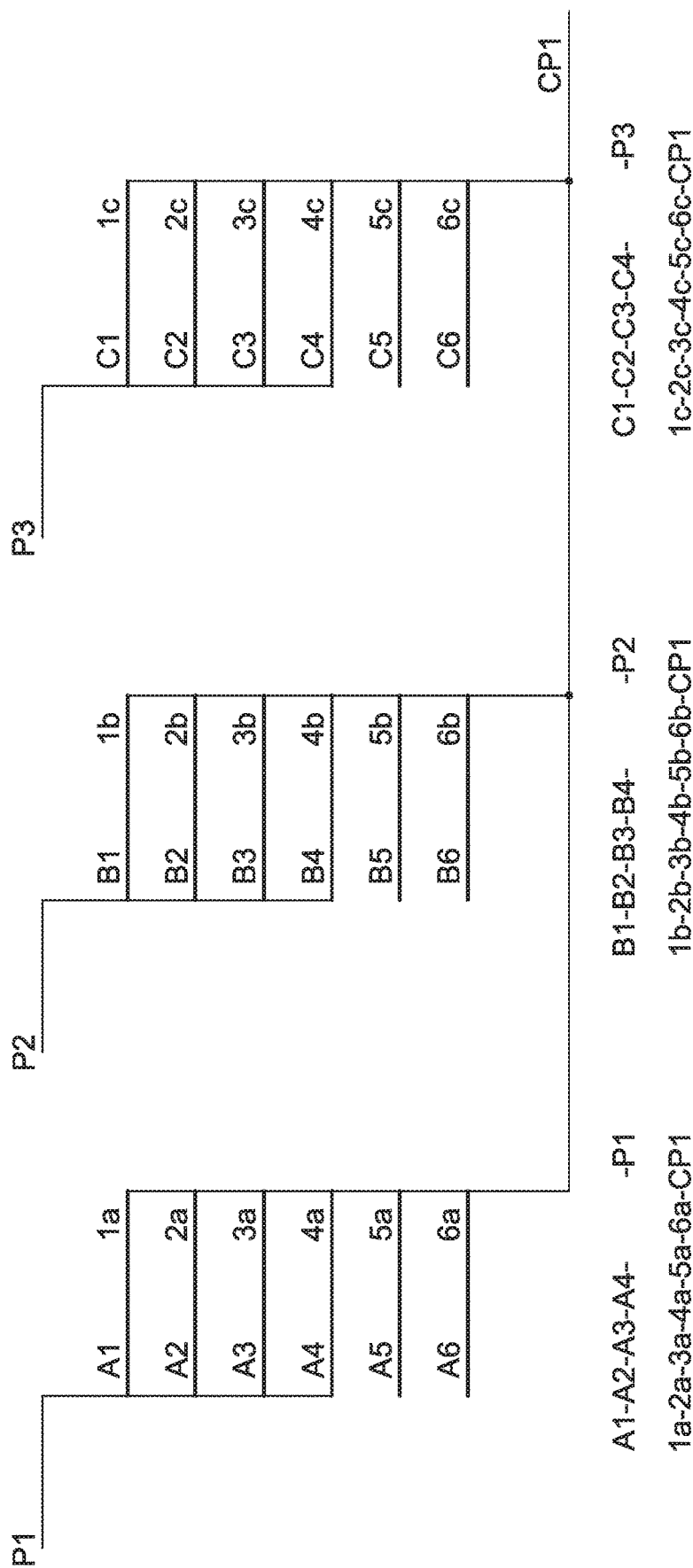
FIG. 11B is a diagrammatic illustration of stator winding sets in a parallel gear configuration, where a portion of multiple parallel non-twisted wires are connected in parallel and one or more wires are disconnected from the connected portion of the multiple parallel non-twisted wires, in accordance with an example embodiment of the present disclosure.
Figure 11C:
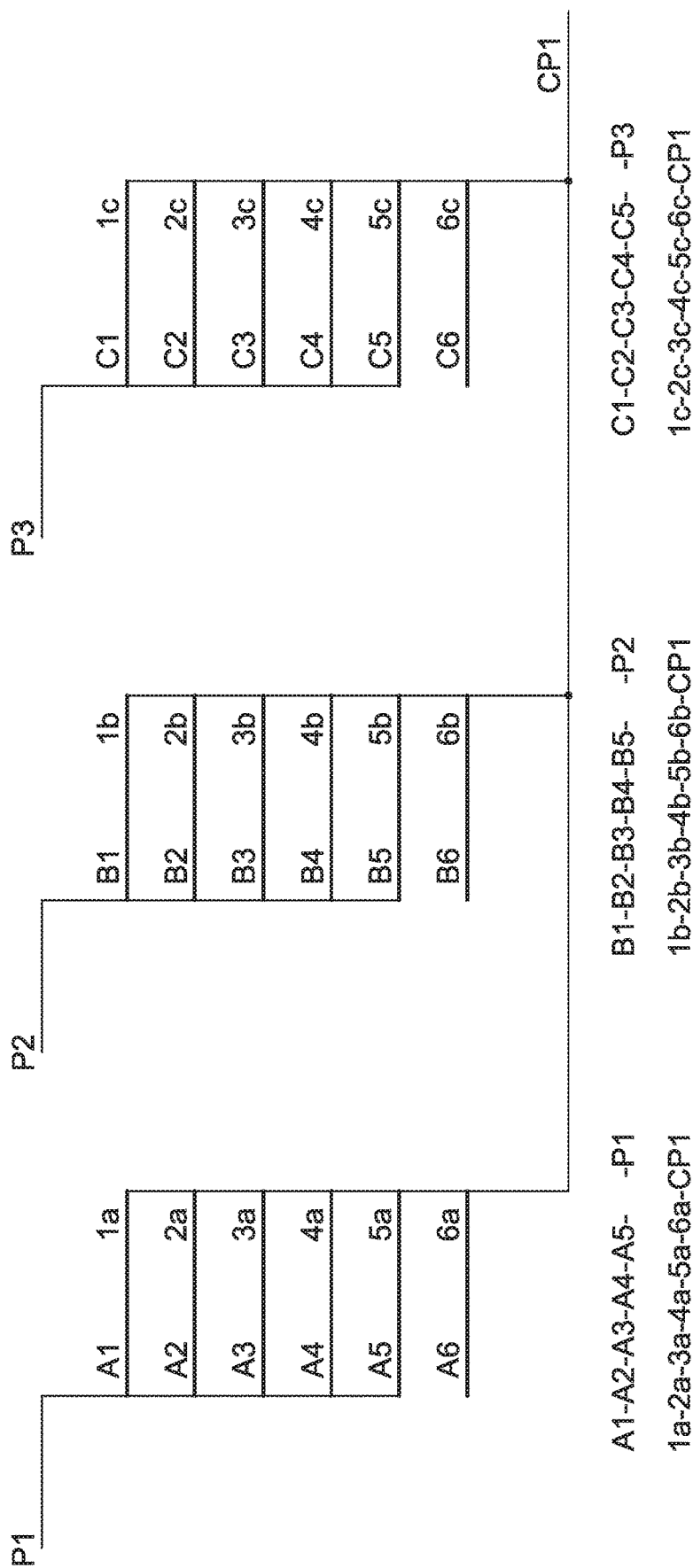
FIG. 11C is a diagrammatic illustration of stator winding sets in a parallel gear configuration, where a portion of multiple parallel non-twisted wires are connected in parallel and one or more wires are disconnected from the connected portion of the multiple parallel non-twisted wires, in accordance with an example embodiment of the present disclosure.
Figure 12:
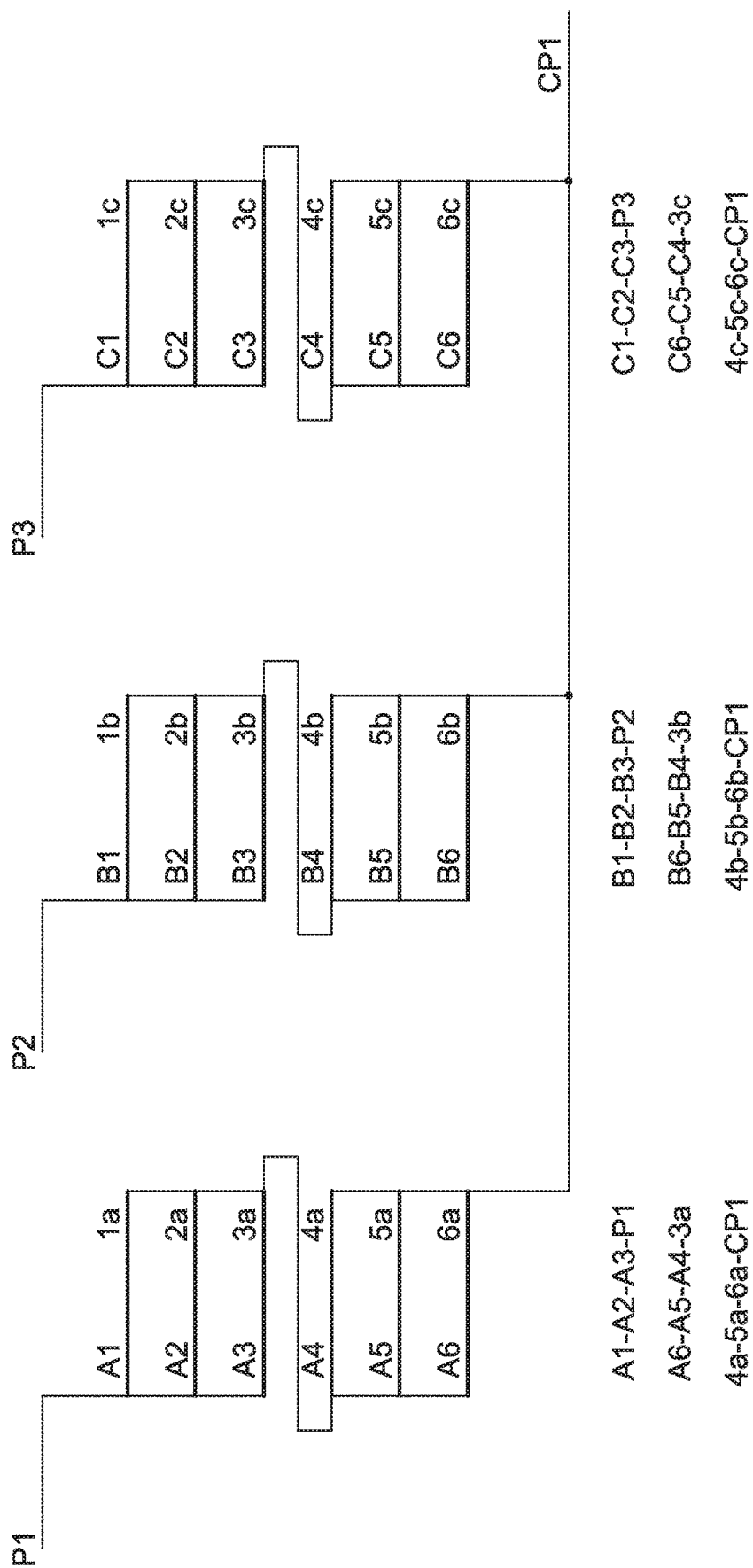
FIG. 12 is a diagrammatic illustration of stator winding sets in a partially parallel/partially series gear configuration, in accordance with an example embodiment of the present disclosure.
Figure 13:
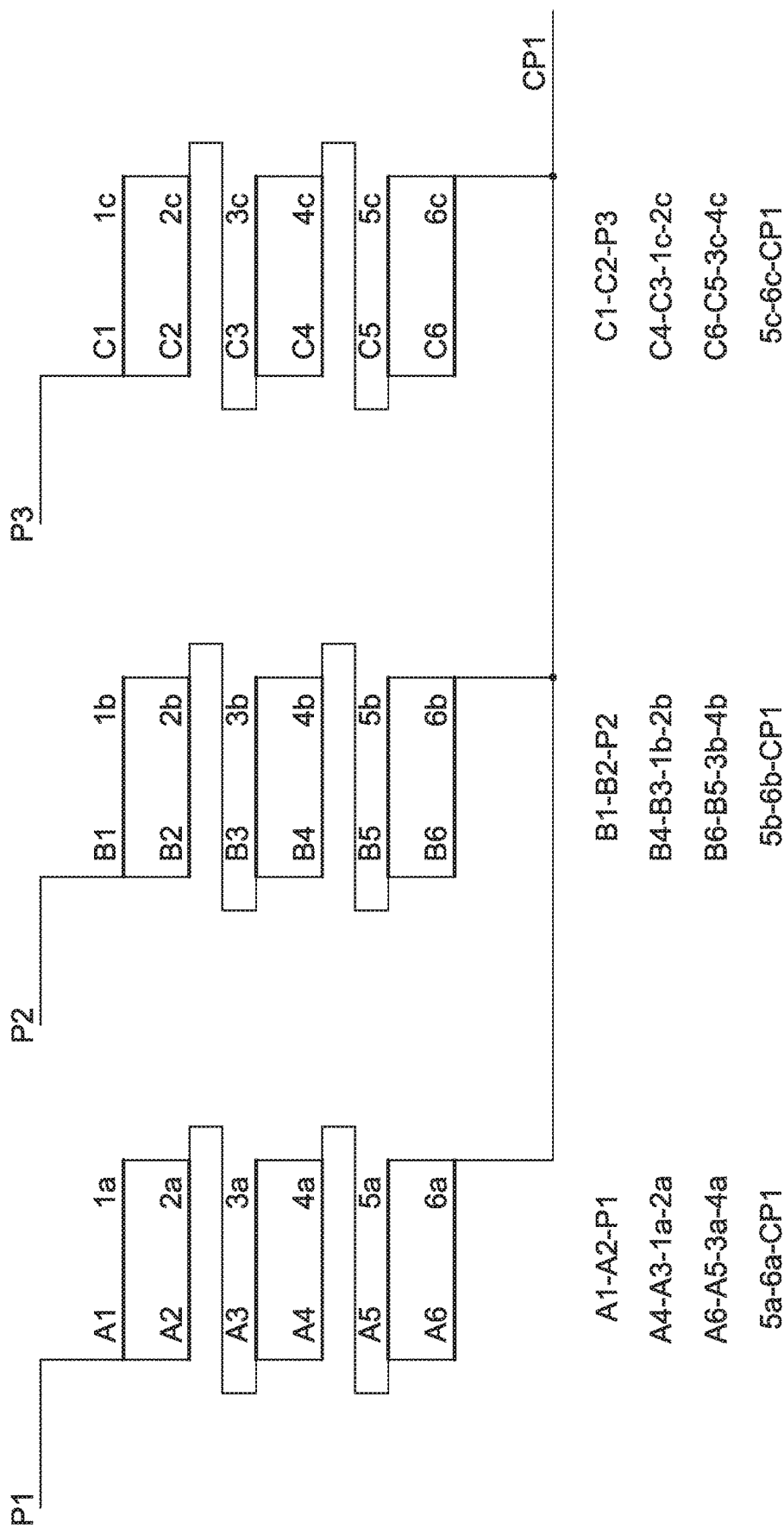
FIG. 13 is another diagrammatic illustration of stator winding sets in a partially parallel/partially series gear configuration, in accordance with an example embodiment of the present disclosure.
Figure 14:
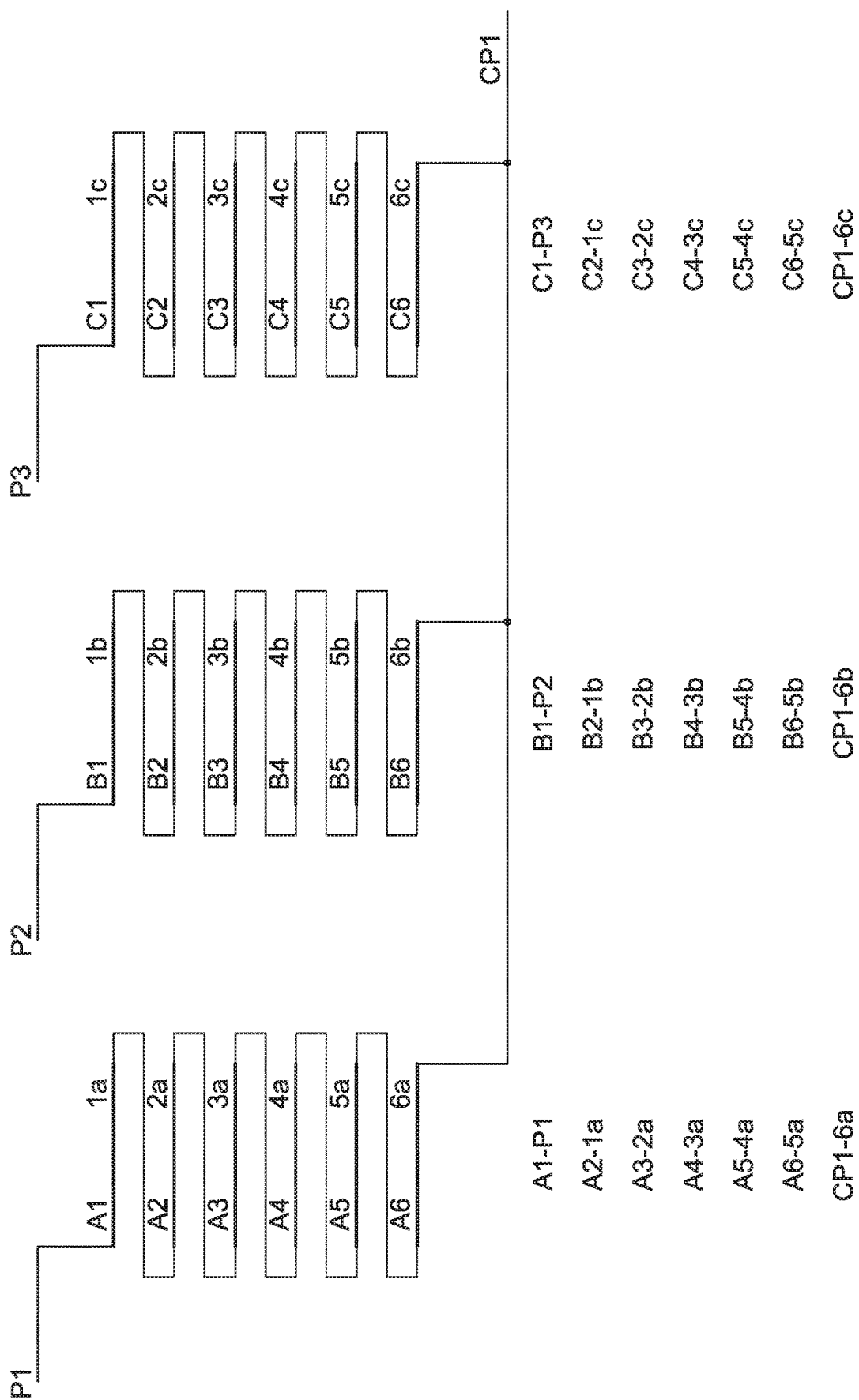
FIG. 14 is a diagrammatic illustration of stator winding sets in a series gear configuration, in accordance with an example embodiment of the present disclosure.

The amperages of six wire system of 20 ohm coils with a 100 volt potential would be 49.8 amp turns in first gear (all series); 199.8 amp turns in second gear; 451.2 amp turns in third gear and 1800 amp turns in fourth gear (all parallel). Subsequently the computer can cause a wires or wire sets in the all parallel mode to be disconnected creating additional gears between third and fourth. For example, four all parallel wires is 800 amp turns, and five all parallel wires is 1250 amp turns. The foregoing voltages are provided for illustrative purposes, and those skilled in the art will appreciate that different voltages and additional configurations can be provided to achieve any number of gears. Furthermore, one or more electronic switches, in addition to being configured to connect the wires in the arrangements described above, can also be configured to disconnect one or more of the wires/windings, e.g., to implement a 4-wire configuration in a 6-wire system, and so forth, e.g., as shown in FIGS. 11B and 11C for a six wire system putting two intermediary gears between third and fourth gears. When switching from the third gear (Gear #3) to the fourth gear (Gear #4—all parallel), there may arise a need to not only remove one or two wires in each leg of the phases to create addition two or more gears between third and fourth gear, but also using a pulse width modulation scheme on said wires to partially include them as a percentage to provide a variable (e.g., infinitely variable) gearing between third and fourth gear.

In some embodiments, for a three-phase motor/generator, six (or four or eight or more) parallel, non-twisted wires are wound around the stator cores of each stator ring, in the same manner as the stator cores would be wound with one wire. However, the six wires may have fewer wraps around each core before the available space is filled. In a three-phase motor, the wires (sometimes referred to a legs or branches) of each circuit phase normally come together at a common point. According to various embodiments of this disclosure, six wires are disconnected or separated at the common point and are run through a switching system (e.g., a plurality of logic controlled electronic switches) configured to cause the wires to be in series, parallel or a combination thereof but remain in three-phase configuration (as described above). The same or a similar switching system can also be applied to connections between the common stators in successive sets, in addition to the connections between the wires within the stators.

In some embodiments, a single MGT unit can have one or more rotor stator sets of two or more differently wound stators with one or two rotors per set and mechanical shifting to place the magnetic field of the rotor or rotors in contact with the electromagnetic field of one or the other stator. In some embodiments, an electronic shifting capability is provided within for each stator of any stator and rotor combination including both: a MGT unit having multiple stators with a rotor for each stator and no mechanical shifting; and an electric MGT unit with one or more rotor/stator sets as described herein. In both cases, with multiple stators or multiple stator sets, similarly wired stators may be wired together in parallel or series. When there are four stators, the stators may be configured as follows: all stators may be connected in parallel (Gear #4); two sets of stators may be connected in parallel and the sets connected in series (Gear #3); or all stators may be connected in series (Gear #1). When there are six stators, the stators may be configured as follows: all may be connected in parallel (Gear #4), there can be two sets of three stators wired in parallel and the sets connected in series (Gear #3); three sets of two stators wired in parallel and the sets connected in series (Gear #2); or all sets connected in series (Gear #1).

When the stators are electrically connected to each other on a common shaft or axle, the rotors may need to be identical and the stators may need to be identically wired and radially oriented or the voltages, torque and phase from each stator rotor combination can conflict. In some embodiments, for example, in a system with six commonly wired stators, all of the stators may need to be energized together. If one or more are electrically disconnected, the motor/generator may experience inefficiency from the induced drag when there is no neutral the MGT unit however may have a neutral and successive stators or units may be placed in neutral and electrically disconnected. There are four levels of torque/voltage when the connections between the stators are switched as above described.

In embodiments of six rotor/stator sets with two or more stators per set, the total power of the electric motor/generator can be increased or decreased by activating more or less rotor/stator sets within the units and further adjusted by shifting the rotor's magnetic field to the next stator of different wiring and even further adjusted by adjusting the number of rotor rings in the rotating magnetic field as described above. In cases where there are two or more rotor stator sets in operation, the active stator in each of the sets, the rotor magnets in each of the sets, and the stator wiring in each of the sets must be identically set and radially oriented, then additional adjustments in torque and voltage may be made by switching the parallel/series connections between the stators as above described.

In some embodiments, the mechanical shifting in the rotor/stator sets is implemented with the electronic shifting of the stator wiring, and when there are multiple stator sets, the sets are connected with the ability to switch the connections between them from series to parallel and the noted combinations thereof. For further clarification, when a second set of two or more stators is added to a first set of two or more stators, both sets must be in either series or parallel for the same voltage to run through both of them and generate the same torque for the common shaft. As stated above, stators can run all in series or all in parallel or equal sets of two or three stators in parallel where the sets are connected in series. When shifting between series and parallel the stators should all be shifted together, unless multiple controllers are used with separate (independently controlled) stator sets.

Moreover, when additional sets of stators are added to the motor/generator, the power capacity of the generator is increased and the motor/generator will also have a different torque. This can be done by having multiple rotor/stator sets that each have a neutral or idle position, where the magnetic field of the rotor is not engaged with the electro-magnetic field of any of the stators in the multi-set motor/generator, and then as the power available or required increases, the stators in the sets are brought on line as needed. The power capacity of the motor/generator can also be increased or decreased by shifting to differently wound stators within the sets and further fine-tuned by adjusting the number of rotor magnets engaged in the flux field at any one time. The ability to add or subtract active stators from the motor/generator and change between stator windings, and to add rotors and focus the magnetic field of the rotors interacting with the stators, and to add and subtract magnets from the rotors, and then further change the windings from series to parallel and combinations thereof, provides the motor/generator with an ability to dynamically adapt to widely varying sources of energy. This serves to optimize motor/generator configuration for improved electrical generation and to adapt to widely varying demands for motor power in hybrid vehicles, wind powered generators, and similar uses.

The MGT units as described herein can have modular electrical connections comprising standard electrical connectors that can be modified to be attached to the said modular end caps as to electrically connect multiple MGT units together as one unit. The MGT units as described herein can also have power switching transistors for the generator mode also comprising standard 3-phase motor control invertors for various motor modes (as described above) utilizing both variable frequency and pulse width modulation schemes for motor functions. In embodiments, power switching transistors are in a configuration where a 15-phase output in generator mode comprises separate output transistors for each of the 15 phases, where the output frequency can be selected from the 15 phases and adjusted independent of the rotor RPM to build the new frequency as minimum RPM can support a maximum frequency desired.

The MGT units as described herein can have electronic sensors such as Hall Effect, optical or other resolving sensors attached to the rotor that can calculate and report the RPM, direction and actual rotational position of the rotor or multiple rotor assemblies to the control unit. The motor/generators can have controls and a user interface comprising a computer whereby the RPM, direction, acceleration, torque, generator mode, coast mode, motor mode and stator multiple wire series/parallel configurations are calculated and adjusted according to the user preset parameters and other input devices such as wind speed indicators, brake devices, accelerator devices, failsafe devices, and other input devices.

In some embodiments, the stator ring(s) or rotor ring(s) for each set are radially offset from each other by the number of sets divided by 360 degrees and the opposing stator sets or rotors are radially aligned where each set of 3-phase windings produces a sine power curve that is offset from the adjacent power curve by the number of degrees that the stators or rotors are radially offset where the output frequency of the multiple phases can be selected from the multiple phases and adjusted independent of the rotor RPM to build a new frequency so long as the minimum RPM can be maintained.

In implementations, the electronically controlled switches are configured to connect the two or more non-twisted wires of each phase all in parallel, producing a first torque/speed when the motor/generator is in the star or Wye wired configuration and a second torque/speed when the motor/generator is in the Delta wired configuration.

In implementations, the electronically controlled switches are configured to connect the two or more non-twisted wires of each phase all in series, producing a third torque/speed when the motor/generator is in the start or Wye wired configuration and a fourth torque/speed when the motor/generator is in the Delta wired configuration.

In implementations, the two or more non-twisted wires include multiple sets of two wires, wherein the electronically controlled switches are configured to connect the two wires of each set in parallel and are configured to connect the multiple sets in series with one another, producing a fifth torque/speed when the motor/generator is in the start or Wye wired configuration and a sixth torque/speed when the motor/generator is in the Delta wired configuration, different from all parallel and all series configurations of the two or more non-twisted wires.

In implementations, the two or more non-twisted wires include multiple sets of three wires, wherein the electronically controlled switches are configured to connect the three wires of each set in parallel and are configured to connect the multiple sets in series with one another, producing a seventh torque/speed when the motor/generator is in the start or Wye wired configuration and an eighth torque/speed when the motor/generator is in the Delta wired configuration, different from all parallel and all series configurations of the two or more non-twisted wires.

In implementations, the two or more non-twisted wires include multiple sets of four wires, wherein the electronically controlled switches are configured to connect the four wires of each set in parallel and are configured to connect the multiple sets in series with one another, producing a ninth torque/speed when the motor/generator is in the start or Wye wired configuration and an tenth torque/speed when the motor/generator is in the Delta wired configuration, different from all parallel and all series configurations of the two or more non-twisted wires.

In implementations, the electronically controlled switches are configured to disconnect at least one wire of the two or more non-twisted wires from a series or parallel configuration without electric current flowing through the at least one disconnected wire but through the remaining wires connected in the series or parallel configuration, where each disconnected wire in a phase decreases the number of amp turns in each of the cores and produces a different torque/speed than if all wires were connected in the series or parallel configuration.

In implementations, a center plane of the stator cores and a rotational plane of the rotor magnets, may be offset from one another in an axial direction in varying controlled amounts, wherein increasing the distance between the two planes from a coplanar position decreases an amount of back electromotive force produced by the magnets on the cores, providing a means to balance the gauss created in the windings by the switching from parallel to series and/or Wye to Delta wired configuration with the gauss created by the permanent magnets to achieve energy efficiency at each setting electronically controlled switches.

In implementations, the stator core windings are multi-pole and the poles in each phase are equally spaced around the periphery of the stator, where each pole core winding is terminated on both ends by respective ones of the electronically controlled switches so that the poles in a phase winding can be connected in series or parallel, or in sets of two or more poles connected in parallel with the sets connected to each other in series.

In implementations, the one or more stators comprise at least a first stator ring and a second stator ring, wherein the respective stator windings of the first stator ring and the second stator ring are spaced apart in an axial direction and cored and/or wound differently to create two distinct ranges of performance in torque/speed and amps/volts, each of the two distinct ranges of performance corresponding to an alignment of the rotor with a selected one of the first and second stator rings.

In implementations, the translation of the stator ring(s) and/or the rotor ring(s) is controlled by commands from a computer system that can accept information from various torque, speed, volt, amp, heat, proximity and other input sensors and/or human activated control devices (e.g., a computer interface device). The computer system can be configured to perform one or more algorithms to control the movement of the stator ring(s) and/or rotor ting(s) from or to positions 1, 2, 3, and other positions in between to affect the magnetic interaction between the stator ring(s) and the rotor ring(s) to change the speed/torque and volt/amp ratios of the, MGT unit causing it to perform as a transmission.

In implementations, the stator ring and rotor ring may be at least one of, laminated iron plates, powdered iron and resin or any other material known in the art of electric motors or generators. The permanent magnets along the periphery of the rotor ring may be comprised of neodymium iron boron (NdFeB) or material of comparable or better magnetic strength and/or coercivity composition of magnets or magnet with increased magnetic strength and/or coercivity.

In implementations, any one or more of the two or more non-twisted parallel wires that are connected in series, in either WYE or Delta configurations, may be disconnected from the series with no electric current flowing through it or them but through the remaining wires connected in the series. Where each of the wires disconnected in the phase decreases the number of amp turns in each of the cores and produces a different torque/speed and volt/amp ratio for each of the wires disconnected than if all were included in the series winding. For example, FIGS. 11B and 11C show examples where a portion of the non-twisted parallel wires in each phase leg are connected in parallel, and one or more wires are disconnected from the connected portion of wires.

In implementations, the multiple wires in the core phase windings may be of different diameter having different amp carrying capacities and resistance enabling the implementation of different amp and amp/turn combinations in the core windings as the switching is conducted.

In implementations, the stator core windings are multi-pole, and the poles in each phase are spaced around the periphery of the stator where each pole core winding is terminated on both ends at electronically controlled switches so that the poles in a phase winding can be connected in series or parallel or in sets of two or more poles connected in parallel and the sets connected to each other in series and so that the coils may be independently energized.

Figure 37A:
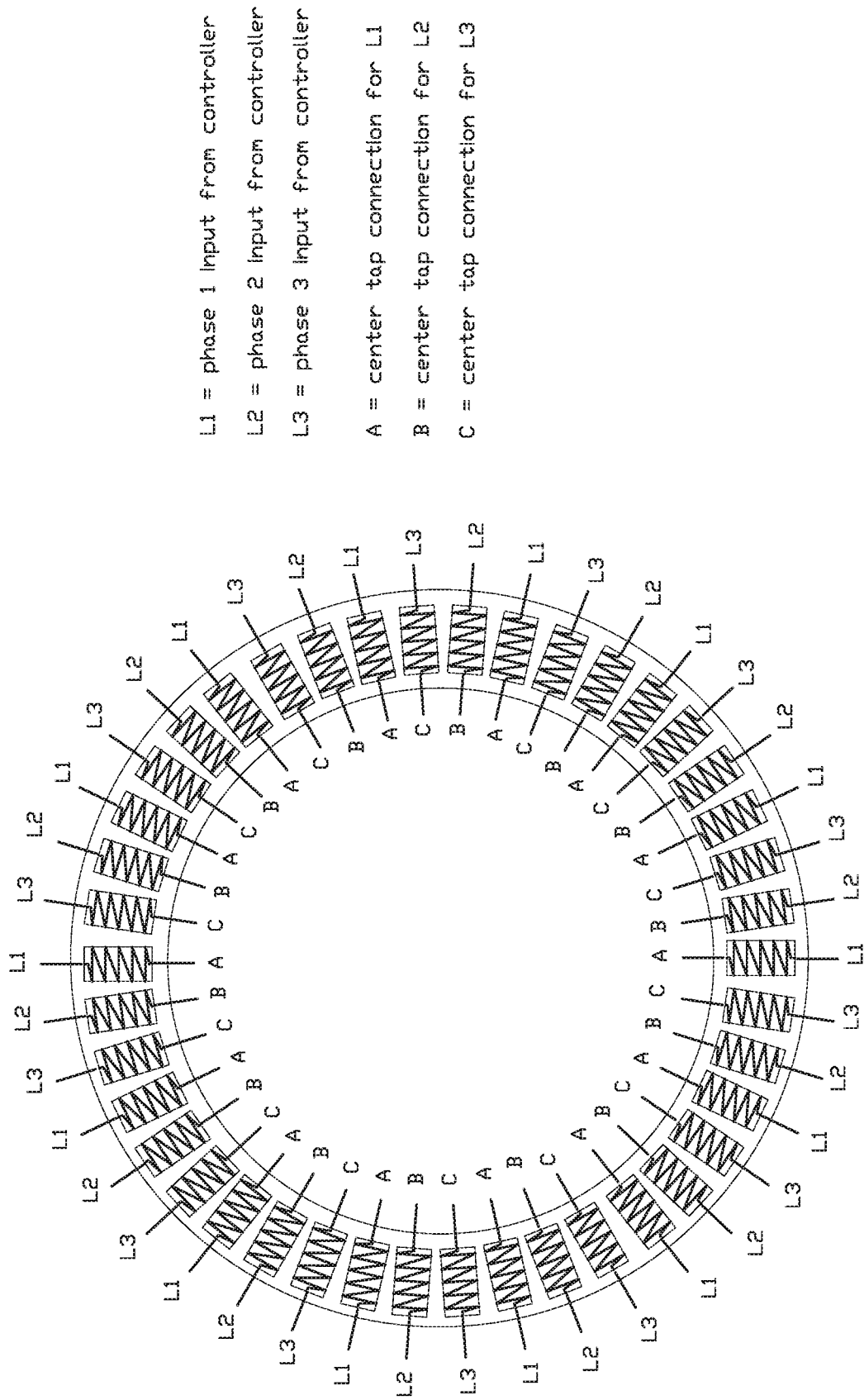
FIG. 37A is a schematic of a stator winding configuration of a 3-phase stator, in accordance with an example embodiment of the present disclosure.
Figure 37B:
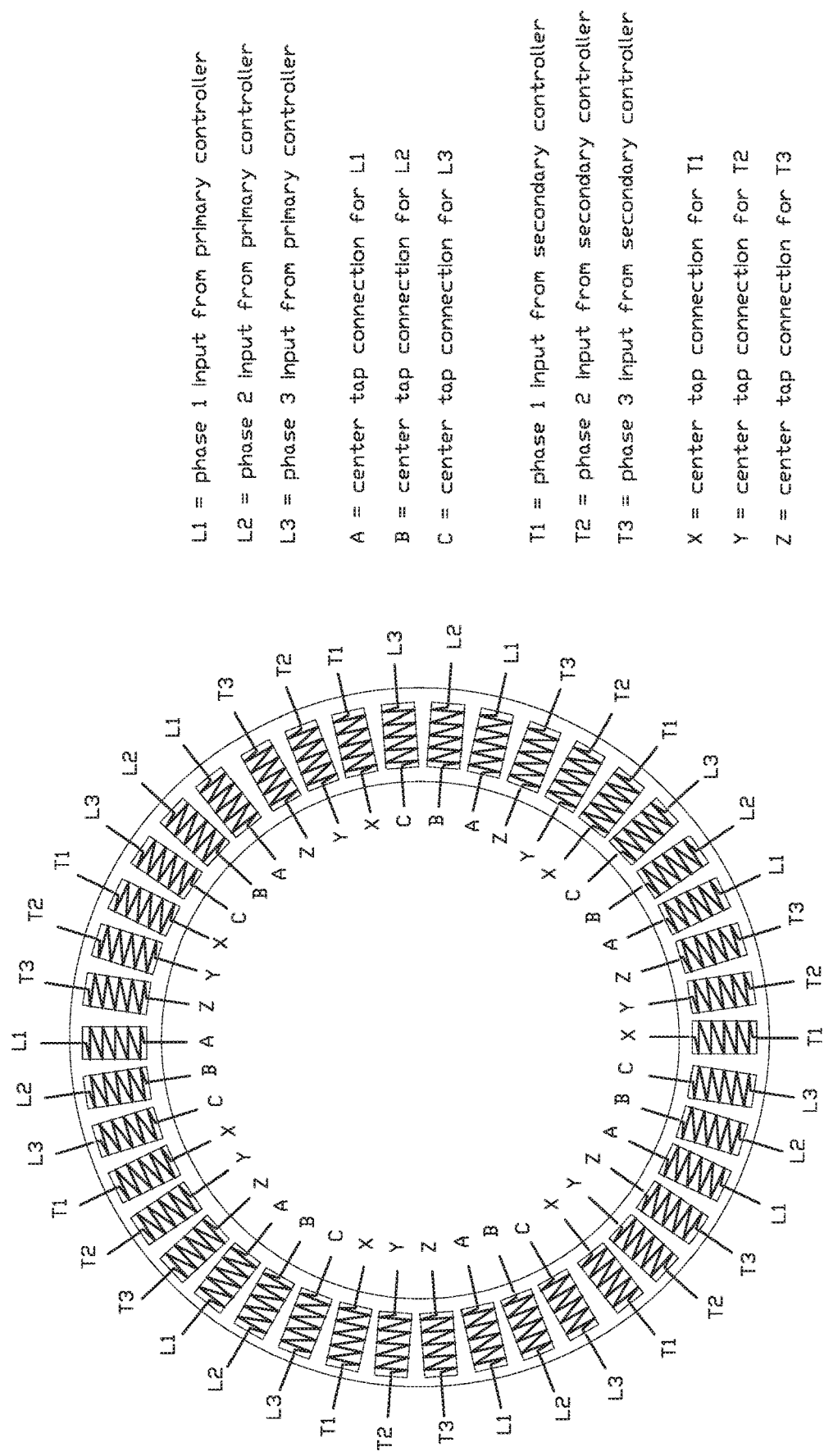
FIG. 37B is a schematic of a dual wound stator configuration implementing multiple separately controlled split-pole 3-phase stators in a common stator assembly, in accordance with an example embodiment of the present disclosure.

In some embodiments, the stator rings are dual wound. For example, FIG. 37A illustrates a split stator that is single wound, and FIG. 37B illustrates a split stator that is dual wound. Referring to FIG. 37A, this figure shows connections for a three phase stator in normal mode as one single stator. The stator ring shown in FIG. 37A has 42 separate coils (14 three phase sets). The center tap of each phase namely A, B and C are connected to corresponding phase where all the A connections are together, all the B connections are together and all the C connections are together. The A center tap connections are for the Phase 1 or L1 inputs from the controller. The B center tap connections are for the Phase 2 or L2 inputs from the controller. The C center tap connections are for the Phase 3 or L3 inputs from the controller. Referring now to FIG. 37B, this figure shows the connections for a three phase stator in split mode as a double stator. For example, the stator ring in FIG. 37B is configured with a first set of stator coils in half as many coil spaces as are available in the stator ring, alternately spaced around the ring. The first set of stator coils is served by a first controller. The stator ring is further configured with a second set of stator coils in a remaining half of the coil spaces of the stator ring. The second set of stator coils is served by a second controller. A common computer processor is configured to control the first controller and the first set of stator coils and the second controller and the second set of stator coils independent of one another. In an embodiment shown in FIG. 37B, the stator ring has 42 separate coils (two separate instances of 7 three phase sets). They are evenly spaced and balanced around the periphery of the stator frame. The center tap of each phase namely A, B and C are connected to corresponding phase where all the A connections are together, all the B connections are together and all the C connections are together. The center tap of each phase namely X, Y and Z are also connected to corresponding phase where all the X connections are together, all the Y connections are together and all the Z connections are together. The A center tap connections are for the Phase 1 or L1 inputs from the controller. The B center tap connections are for the Phase 2 or L2 inputs from the controller. The C center tap connections are for the Phase 3 or L3 inputs from the controller. The Y center tap connections are for the Phase 1 or T1 inputs from the controller. The Y center tap connections are for the Phase 2 or T2 inputs from the controller. The Z center tap connections are for the Phase 3 or T3 inputs from the controller. The configuration shown in FIG. 37B enables utilization of two controllers at the same time within a single stator frame, thereby allowing series/parallel internal switching while one controller (i.e., a controller connected to wires that are not being reconfigured) is still in operation.

The use of switched stator windings has been discussed, where the stator coils are wound with multiple wires that could be switched from being in all series, all parallel or a combination thereof in either the WYE or the Delta configuration. Some problems that have been encountered are the following. There may be a loss of torque during the time interval of the switching, causing a bump or jerk in the vehicle being propelled. There is no way to adjust or weaken the magnetic field or a permanent magnet motor. More than two wires while possible are not always practical.

The inventors have found that not only is there a loss of torque in the switching interval but the speed/torque ratio difference between all series and all parallel is quite severe as is switching between the Delta and WYE configuration. This large difference in torque and speed also causes a bump or sudden lurch. In some implementations of this disclosure FIGS. 1 through 6), the MGT unit has two or more multiple wire wound stator rings and one permanent magnet rotor ring. The stator rings and the rotor ring can be repositioned while the stator windings are electronically reconfigured to create a synergistic relationship, whereby the MGT unit can be electrically shifted from one gear to the next and also mechanically shifted to smooth the transition between gears. For example, the stator windings of the first stator ring can be configured in a first gear, and the stator windings of the second stator ring can be configured in a second gear. The rotor ring can be moved from a first position (engaging the first stator ring) to a second position (engaging the second stator ring) to provide a smooth shift from the first gear to the second gear. Similarly, the stator windings of the first stator ring can be switched into a third gear, and the rotor ring can be brought back into a position engaging the first stator ring to provide a smooth shift from the second gear to the third gear. This process can be repeated to smoothly transition from one gear to the next in either direction going up gears or going down).

In some embodiments, the switching of the wires and the stator poles is controlled by the computer system that can accept information from various torque, speed, volt, amp, heat, proximity and other input sensors and/or human activated control devices (e.g., a computer interface device). The computer system may be configured to process the information by performing one or more algorithms to change the speed/torque and volt/amp ratios of an MGT unit causing it to perform as a transmission.

In some embodiments, a rotor assembly includes two rotor rings having respective sets permanent magnets (e.g., as described herein and shown in FIGS. 16 through 24 or FIGS. 25 through 36), where both of the rotor rings are slidably coupled to their longitudinal rotor support structure, and where they are moved or translated closer together or further apart by a linear motion device (e.g., linear actuator), such as set screw powered by stepper motors located within cavities in the rotor rings, solenoids, hydraulic or pneumatic cylinders, or the like, under the control of the computer system. These units may also have two stators and three rotors two rotors engaged with any one stator at a time switching back and forth between stators to accomplish the smooth transition in switching between wiring configurations as above described.

In some attempted configurations to implement switching between all parallel, all series Delta and Y connections, the process has been frustrated by the generally unacceptable interruption of power, large power surges and jolts to the mechanical process during and immediately following the short time interval necessary to complete the switch from one wiring configuration to another and has been further limited to attempts to create multi-speed electric motors.

This disclosure eliminates the interruption, power surge and jolt problems and further concentrates on obtaining the most efficient energy consumption/production for each range of speed and torque under which the motor or generator will be used. Current electric motor art creates highly efficient motor/generators at the constant speeds and torque settings for which they were designed. This disclosure creates multiple highly efficient points over a much wider speed/torque spectrum and allows the motor/generator to adjust or fine tune the magnetic field between the stator coils and the rotor magnets to meet (or nearly meet) the optimum amp and torque requirements of a motor or generator employing the MGT unit and to optimize efficiency at any time under widely variable conditions such as a motor/generator on a bus or delivery truck or a generator on a wind mill under widely varying wind conditions, or any other motor/generator deployment with variable torque/speed requirements.

Example Implementations—MGT Unit and/or System Controls

Figure 15:
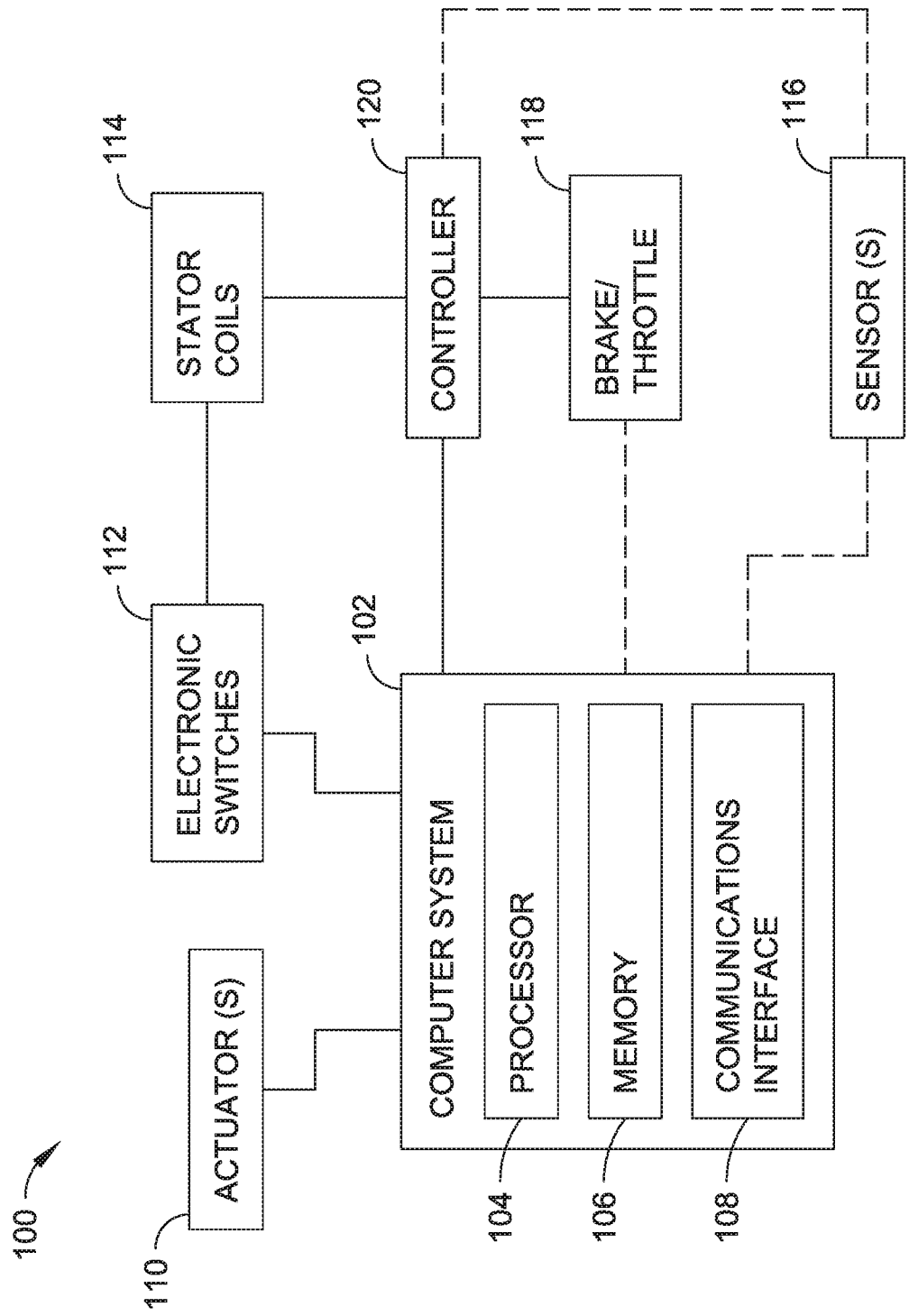
FIG. 15 is a block diagram illustrating control components for an MGT unit/system, in accordance with an example embodiment of the present disclosure.
Figure 16:
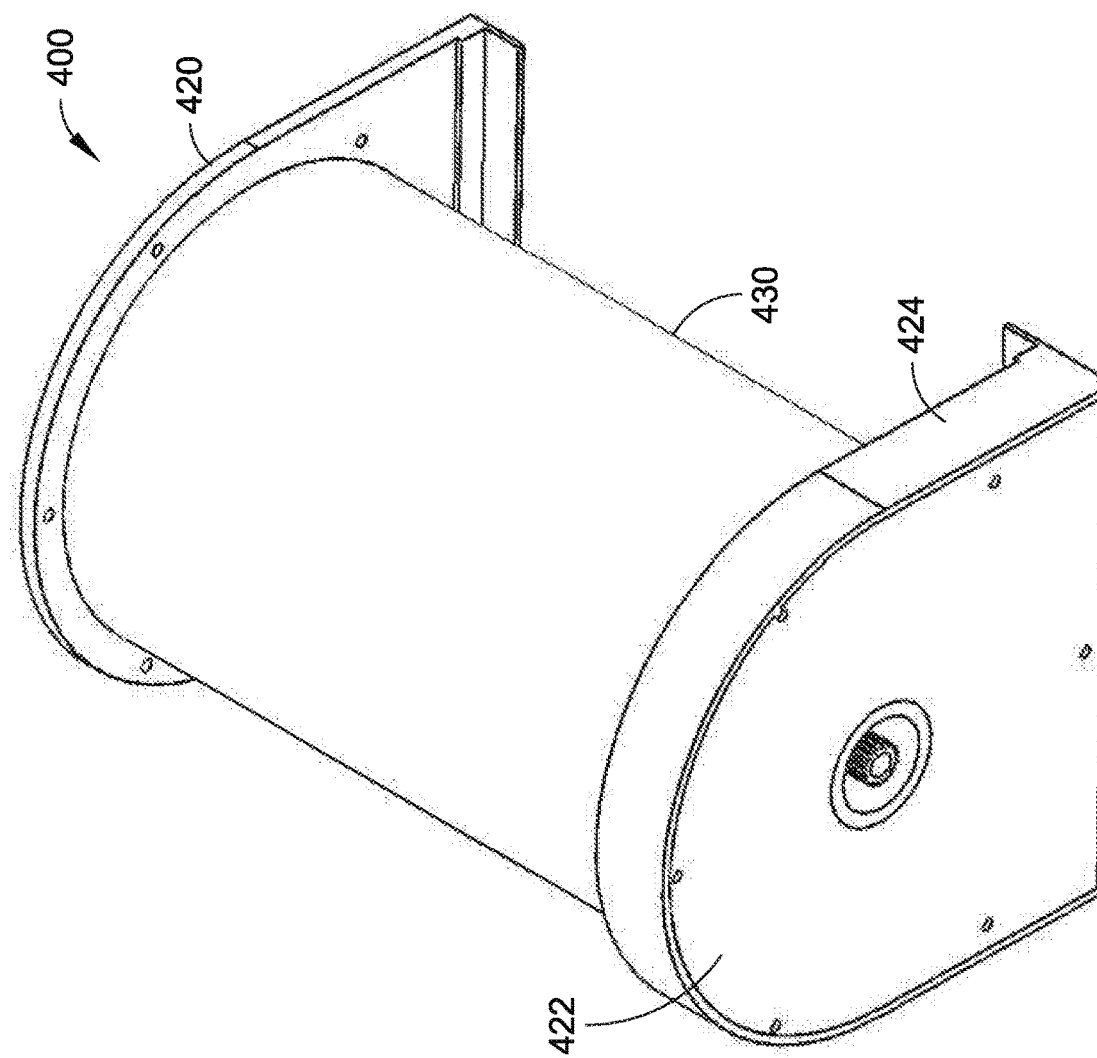
FIG. 16 is a perspective view illustrating MGT unit, in accordance with an example embodiment of the present disclosure.
Figure 17:
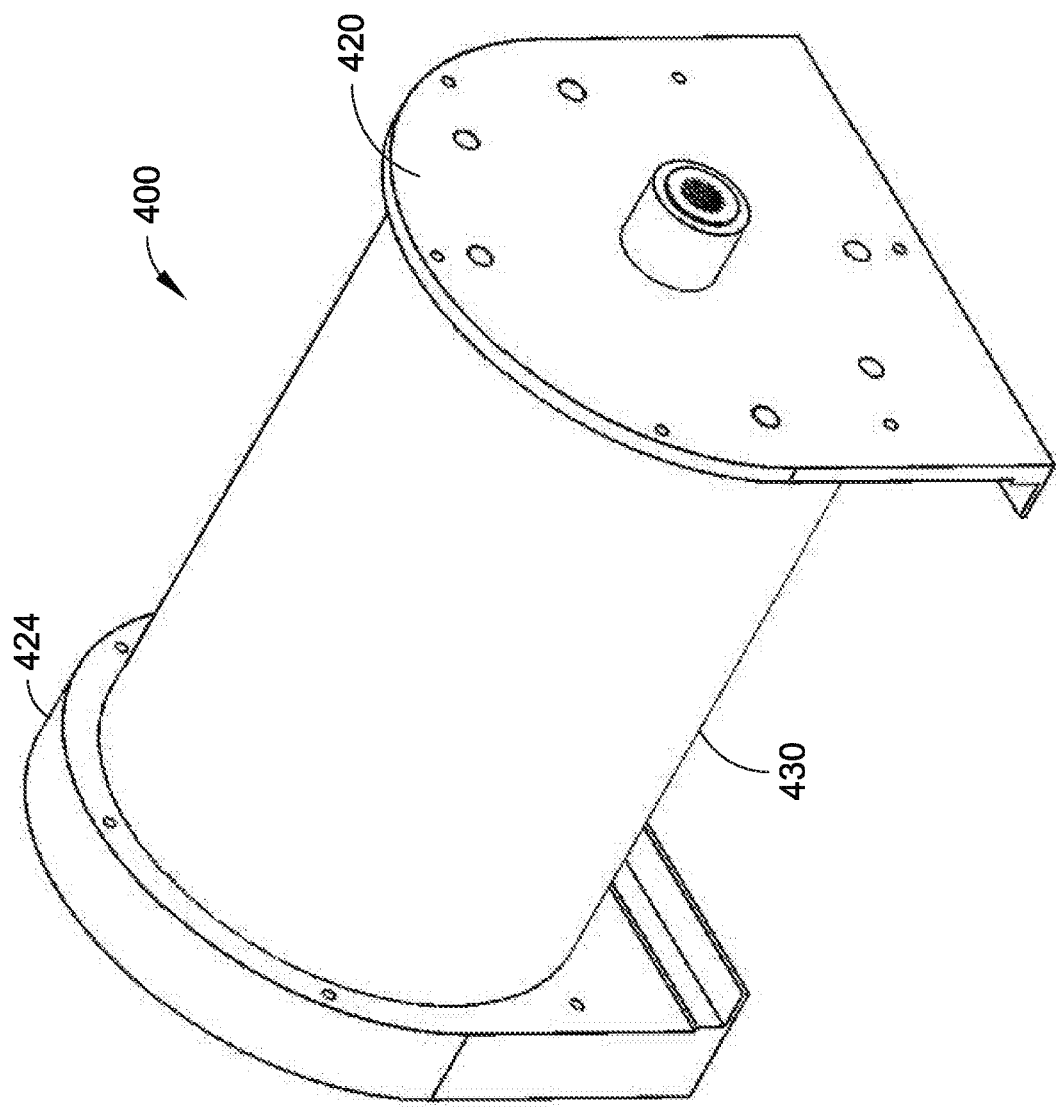
FIG. 17 is another perspective view of the MGT unit illustrated in FIG. 16, in accordance with an example embodiment of the present disclosure.
Figure 18:
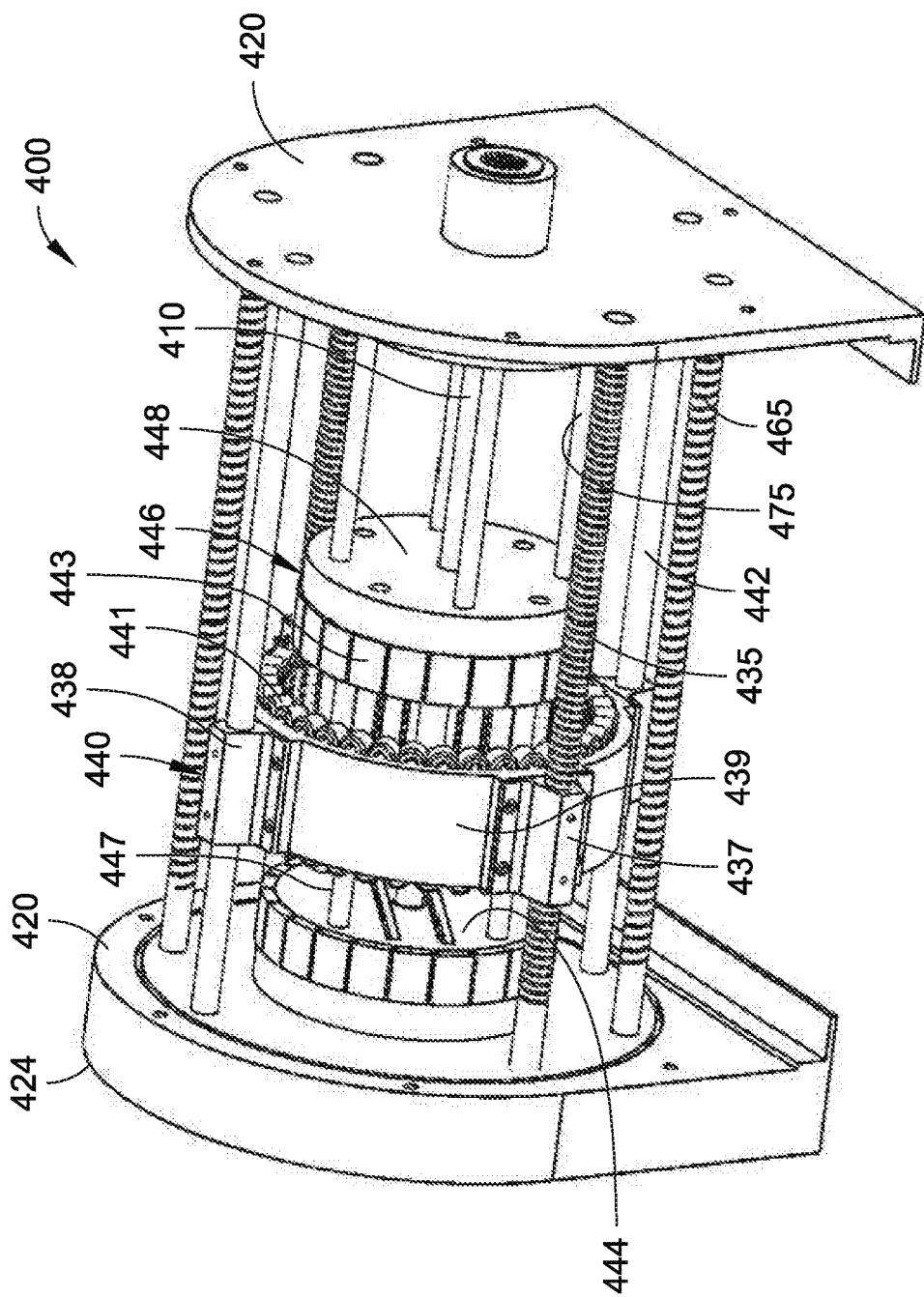
FIG. 18 is a perspective view of the MGT unit illustrated in FIG. 16 with a portion of its housing removed, in accordance with an example embodiment of the present disclosure.

An MGT unit, such as any of those described herein, including some or all of its components, can operate under computer control. For example, FIG. 15 shows a control system 100 for operating one or more MGT units. An MGT unit computer system 102 can be configured to interface with a controller 120 (e.g., H-bridge controller, inverter, and/or converter) for controlling voltage, frequency, and/or amperage supplied to or from the stator coils, the actuator(s) 110 (e.g., linear stator and/or rotor actuator(s)), electronic switches 112 for reconfiguring the stator windings into Star/WYE and. Delta configurations and parallel and series configurations and combinations as described herein, sensor(s) 116 (e.g., Hall effect or optical sensors to detect rotational frequency (RPM), voltage sensors, current sensors, frequency sensors, etc.), brake/throttle controls 118, and so forth. In some embodiments, the MGT unit includes the computer system 102. In other embodiments, the computer system 102 can be communicatively coupled to the MGT unit. A processor 104 can be included with or in the computer system 102 to control the components and functions of the MGT unit(s) described herein using software, firmware, hardware (e.g., fixed logic circuitry), manual processing, or a combination thereof. The terms "computer system," "functionality," "service," and "logic" as used herein generally represent software, firmware, hardware, or a combination of software, firmware, or hardware in conjunction with controlling the MGT unit. In the case of a software implementation, the module, functionality, or logic represents program code (e.g., algorithms embodied in a non-transitory computer readable medium) that performs specified tasks when executed on a processor (e.g., central processing unit (CPU) or CPUs). The program code can be stored in one or more non-transitory computer-readable memory devices or media (e.g., internal memory and/or one or more tangible media), and so on. For example, memory may include but is not limited to volatile memory, non-volatile memory, Flash memory, SRAM, DRAM, RAM and ROM. The structures, functions, approaches, and techniques described herein can be implemented on a variety of commercial computing platforms having a variety of processors.

The computer system 102 can include a processor 104, a memory 106, and a communications interface 108. The processor 104 provides processing functionality for at least the computer system 102 and can include any number of processors, micro-controllers, circuitry, field programmable gate array (FPGA) or other processing systems, and resident or external memory for storing data, executable code, and other information accessed or generated by the computer system 102. The processor 104 can execute one or more software programs embodied in a non-transitory computer readable medium that implement techniques described herein. The processor 104 is not limited by the materials from which it is formed or the processing mechanisms employed therein and, as such, can be implemented via semiconductor(s) and/or transistors using electronic integrated circuit (IC) components, and so forth.

The computer system 102 may include a memory 106 (e.g., Flash memory, RAM, SRAM, DRAM, ROM, etc.). The memory 106 can be an example of tangible, computer-readable storage medium that provides storage functionality to store various data and or program code associated with operation of the computer system 102, such as software programs and/or code segments, or other data to instruct the processor 104, and possibly other components of the MGT unit, to perform the functionality described herein. Thus, the memory 106 can store data, such as a program of instructions for operating the MGT unit (including its components), and so forth. It should be noted that while a single memory 106 is described, a wide variety of types and combinations of memory (e.g., tangible, non-transitory memory) can be employed. The memory 106 can be integral with the processor 104, can comprise stand-alone memory, or can be a combination of both.

Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the computer system 102 and/or the memory 106 can include removable integrated circuit card (ICC) memory, such as memory provided by a subscriber identity module (SIM) card, a universal subscriber identity module (USIM) card, a universal integrated circuit card (UICC), and so on.

The computer system 102 may include a communications interface 108. The communications interface 108 can be operatively configured to communicate with components of the MGT unit. For example, the communications interface 108 can be configured to transmit data for storage in the MGT unit, retrieve data from storage in the MGT unit, and so forth. The communications interface 108 can also be communicatively coupled with the processor 104 to facilitate data transfer between components of the MGT unit and the processor 104 (e.g., for communicating inputs to the processor 104 received from a device communicatively coupled with the MGT unit/computer system 102). It should be noted that while the communications interface 108 is described as a component of computer system 102, one or more components of the communications interface 108 can be implemented as external components communicatively coupled to the MGT unit via a wired and/or wireless connection. The MGT unit can also include and/or connect to one or more input/output (I/O) devices (e.g., via the communications interface 108), such as a display, a mouse, a touchpad, a touchscreen, a keyboard, a microphone (e.g., for voice commands) and so on.

The communications interface 108 and/or the processor 104 can be configured to communicate with a variety of different networks, such as a wide-area cellular telephone network, such as a cellular network, a 3G cellular network, a 4G cellular network, or a global system for mobile communications (GSM) network; a wireless computer communications network, such as a WiFi network (e.g., a wireless local area network (WLAN) operated using WEE 802.11 network standards); an ad-hoc wireless network, an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 108 can be configured to communicate with a single network or multiple networks across different access points. In a specific embodiment, a communications interface 108 can transmit information from the computer system 102 to an external device (e.g., a cell phone, a computer connected to a WiFi network, cloud storage, etc.). In another specific embodiment, a communications interface 108 can receive information from an external device (e.g., a cell phone, a computer connected to a WiFi network, cloud storage, etc.).

The controller 120 is configured to control the voltage, amperage, and/or frequency of signals supplied to (in the case of a motor) or from (in the case of a generator) stator coils 114 (e.g., signal through wires of stator coils in any of FIGS. 1 through 14 and 16 through 36). For example, the controller 120 may be configured to adjust the voltage, amperage, and/or frequency based on an input signal from the brake/throttle 118 and/or sensor(s) 116 (e.g., based on detected RPM or radial position of rotor rings). The computer system 102 is configured to monitor the controller 120 and possibly other data sources (e.g., sensor(s) 116 for RPM readings, brake/throttle 118 inputs, and so forth). Based on information received from these data sources, the computer system 102 can operate the actuators 110, electronic switches 112, and the controller 120. For example, when the controller 120 has reached a predetermined operating threshold (e.g., minimum/maximum voltage, amperage, frequency, etc.), the computer system 102 may be configured to cause the controller 120 to be placed in a neutral state while the computer system 102 causes the actuators 110 and/or electronic switches 112 to reconfigure the stator and/or rotor rings (as described with regard to any of FIGS. 1 through 14 and 16 through 36). The computer system 102 is configured to then cause the controller 120 to resume transmission to or from the stator coils at an amperage, voltage, and/or frequency that provides approximately the same number of amp-turns (At) as was provided prior to the mechanical and/or electrical reconfiguration of the rotor and/or stator rings. The controller 120 can then continue operation until another operating threshold is reached, where the computer system 102 can then repeat the same reconfiguration and reprogramming of the MGT unit components.

The computer system 102 can be configured to cause the electronic switches 112 to switch a wiring or phase configuration of the stator coils at least partially based upon the rotational frequency (e.g., RPM) of the first and second rotor rings. For example, the computer system 102 can control the electronic switches 112 and/or the actuators 110 to change electrical and/or mechanical configurations of the system based on the rotational frequency or other information indicative of the system power requirements. The computer system 102 can implement a plurality of gears (i.e., different mechanical and/or electrical configurations) to successively increase or decrease amp-turn capacities, thereby increasing or decreasing a corresponding strength of a magnetic field of the stator coils, as a demand for power on the MGT unit/system increases or decreases. The computer system can be configured to cause the electronic switches 112 to connect the multiple parallel non-twisted wires of the stator coils in all series, all parallel, or in a combination of series and parallel. The computer system 102 can also be configured to cause the electronic switches 112 to connect a portion of the multiple parallel non-twisted wires in all series, all parallel, or in a combination of series and parallel and configured to cause the electronic switches 112 to disconnect one or more wires from the portion of the multiple parallel non-twisted wires (e.g., see FIGS. 11B and 11C). The computer system 102 can be configured to cause the electronic switches 112 to switch the phase wiring between the star (Y) configuration and the Delta configuration and configured to connect the multiple parallel non-twisted wires in all series, all parallel, or in a combination of series and parallel. The computer system 102 can be configured to cause the electronic switches 112 to switch the phase wiring between the star (Y) configuration and the Delta configuration, configured to cause the electronic switches 112 to connect a portion of the multiple parallel non-twisted wires in all series, all parallel, or in a combination of series and parallel, and configured to cause the electronic switches 112 to disconnect one or more wires from the portion of the multiple parallel non-twisted wires. In an implementation such as shown in FIGS. 16 through 24 or FIGS. 25 through 36, the computer system 102 can be configured cause the actuator(s) to: place the first rotor ring and the second rotor ring in a first position on either side of the center plane of the stator ring where the distance from the center plane of the stator ring to the inner surface of each rotor ring; place the first rotor ring and the second rotor ring in a second position where the inner surfaces of the first and second rotor rings are coplanar with respective outer surfaces of the stator ring, on either end of the stator ring; place the first rotor ring and the second rotor ring in a third position where the inner surfaces of the first and second rotor rings are coplanar with the center plane of the stator; and place the first rotor ring and the second rotor ring at one or more positions other than the first, second, and third positions. These are some examples of the electrical and/or mechanical configurations that can be affected by the computer system 102 in order to change the magnetic field strengths and interactions in the MGT unit/system. Any combination of the foregoing operations can be implemented by the MGT control system 100 to improve/optimize efficiency of the overall system.

In embodiments, an MGT system can include another MGT system computer that can also include a processor, a memory, and a communications interface, such as those described herein. The MGT system computer can be in communication with the MGT unit including computer system 102 and possibly one or more additional MGT units and their respective computer systems to provide central processing for the MGT system. The MGT system computer can be configured to receive operator commands and parameters such as RPM, speed, torque parameters, and so forth, and the MGT system computer can control the MGT units based on the received information to control the stator and/or rotor positioning and stator winding and/or phase wiring configurations in order to achieve desired (e.g., optimal or near optimal) system requirements.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Various embodiments of MGT units have been described herein. Such MGT units can be implemented in a variety of power generation and power management applications. For example, the MGT units described herein can be implemented in generation devices (e.g., windmills, hydropower generators, and the like) and vehicles or motor-driven devices with multiple power sources, such as hybrid vehicles (e.g., cars, motorcycles, etc.), hybrid marine vessels, hybrid airplanes, and so forth. Some example applications are discussed below.

Example Implementations—Wind Power Generation System

In an example application where an MGT unit as described herein is implemented in a windmill or wind turbine, an operating scenario can start with no wind at the wind turbine and the stator ring(s) and rotor ring(s) in the inactive "stopped" condition. In this scenario, an actuator has moved the stator ring(s) and/or rotor ring(s) to a position where the stator windings are disengaged from the magnetic field of the rotor magnets. As the wind speed starts to increase, a sensor can measure the RPM and "shift" or move the stator ring(s) and/or rotor ring(s) from the neutral mode into a position where the magnetic field of the rotor magnets engages the least amount of stator windings and is 100% parallel requiring the least amount of torque, allowing rotation of the windmill to begin at very low wind speeds and generate electricity much sooner than conventional generators can "startup". The computer system can collect data from wind speed sensors and the rotational speed of the windmill. As the wind speed increases, the computer system can shift the MGT unit from Gear #1, 100% series to Gear #2, three sets of two parallel wires connected in series, and so on to Gears #3 and #4 and so forth (and possibly intermediate gears), increasing the torque required to turn the windmill blades until either a preset rotational speed is achieved or the resisting torque of the stator/rotor set is equal to the power of the wind and the wind mill blades are turning at a constant speed.

As the computer system monitors the wind speed and power available from the wind it can engage the actuators of 1, 2, 3 or more stator/rotor sets to match the power of the wind concurrently shifting each of the stator/rotor sets through their various gears and stators/rotors as above described until equilibrium in the rotational speed of the windmill blades is achieved and the power of the wind is matched with an optimum or nearly optimum generating capacity of the wind power generator and maintaining needed line voltage. As the wind speed increases and it is desired to bring additional stator sets online, say from three sets to four sets, the computer can determine what gear the four sets can be in and what stator activated, then momentarily electrically disconnect the three sets, place the four sets in the new configuration and electrically reconnect the four sets to be concurrently shifted with the same voltage emanating from each stator set. Final adjustments and fine tuning is achieved by fine adjustment of the alignment of the stators with the rotor in the sets. This also applies when minor adjustments are required to accommodate minor variations in the wind speed.

When the wind velocity subsides and the number of stator sets on line is to be decreased from four to three, the last stator to come on line is electrically disconnected, its stator repositioned to neutral and the three remaining stator sets adjusted to match the wind power then being generated by the windmill. In this manner systems and techniques in accordance with the present disclosure can accurately, swiftly and efficiently balance the power output of the motor generator with the available wind speed at levels of wind speed and produce generated electric power from the wind at high efficiency rate. Generally, the total number of stator/rotor sets in the motor/generator in full series setting acting together can correspond to the maximum structural and mechanical capabilities of the wind mill and its blades. At the point of maximum capacity as with some generators it can automatically shut down. But unlike generators that have a narrow band of wind speeds where they operate efficiently, techniques in accordance with the present disclosure can extract increased power from the wind at high efficiency throughout the entire range of wind speeds up to the structural capacity of the wind mill. When the wind speed starts to slow down and the output voltage drops, the unit can switch down to the next stator-wiring mode to increase the voltage/power collection. When the wind speed drops to a very slow condition, and although not much power is generated, the unit can still capture this and help with the annual wind turbine output for greater overall machine efficiency where conventional generators may have to shut down.

Another operational function can be described in a larger scaled up version as in megawatt sized wind turbines. This scenario can behave the same as in the small wind example but the configuration of the generator can be much larger, may have as many as 12 or more stator/rotor sets in a 3-phase configuration to enable a smooth transition in RPM changes do to highly variable wind. The stator engagement process can also be the same or similar, with the exception of extra user controls, sensors for power grid control and monitoring systems to sense the load and adjust to customer demand.

Another feature of this disclosure is the addition of larger stator/rotor sets and the ability to offset each of the stator/rotor sets rotationally by a few degrees as to make the number of stator and rotor section equal the evenly spaced out rotational offsets. This can help with generator "cogging" and enable a design of this disclosure whereby the multiple stator windings can be controlled to have an onboard insulated gate bipolar transistors (IGBTs) select the different high and low voltage points and using pulse width modulation (PWM) schemes, build and create a 3-phase sine wave at a set frequency of 60 hz. When sensing RPM changes and fluctuations, the controls can adjust the stator winding section to keep and maintain this frequency even when moderate RPM changes are noticed. This is a solution for a variable rotational power source and a constant frequency generated output for a local grid or emergency power source without conversion losses due to AC-to-DC and large inverter systems power consumption. To understand this process, an example of a large stator set of multiple pole 3-phase winding and 12 stator and rotor sets is provided. In this example, the stator sets are aligned with each other but the rotor sets are rotationally offset by $1/12^{th}$ of the multiple pole rotational angle. This can provide 12 separate 3-phase outputs equally spaced in oscillation offset. The computer system can then take the current RPM, acceleration, load, back EMF (electromagnetic force), output frequency and target frequency and use the PWM switching IGBT's to select upcoming power potentials from the multiple phases and produce the target frequency from the high and low points of the generated multiple phases, possibly regardless of the source RPM (e.g., as long as the RPM is sufficient to maintain the target voltage and power output). The same linear actuation of the stator sections can regulate the torque and changing wind speed rotor RPM's while producing efficient power for the conditions of gusts and very low wind speed plus conditions in between.

The disclosure's operational function in the application of other renewable energy sources such as tidal and wave generation machines can utilize this same variability in RPM to increase efficiency where the source is intermittent and unreliable, for example, where wave and possible tidal generation machines may also turn a generator one direction and then immediately change rotational direction and continue to generate power efficiently. This disclosure has the ability to add additional rotor/stator set to increase and/or decrease the power capacity and then fine-tune the output with the stator and/or rotor linear movement to coincide with the gradual oscillating output power source and direction changes and further adjust the volt/amp ratios to increase the efficiency of the unit to match the variable input at an instant of time, by switching between stators and parallel or series winding.

Example Implementations—Hybrid Vehicle Propulsion System

Figure 38:
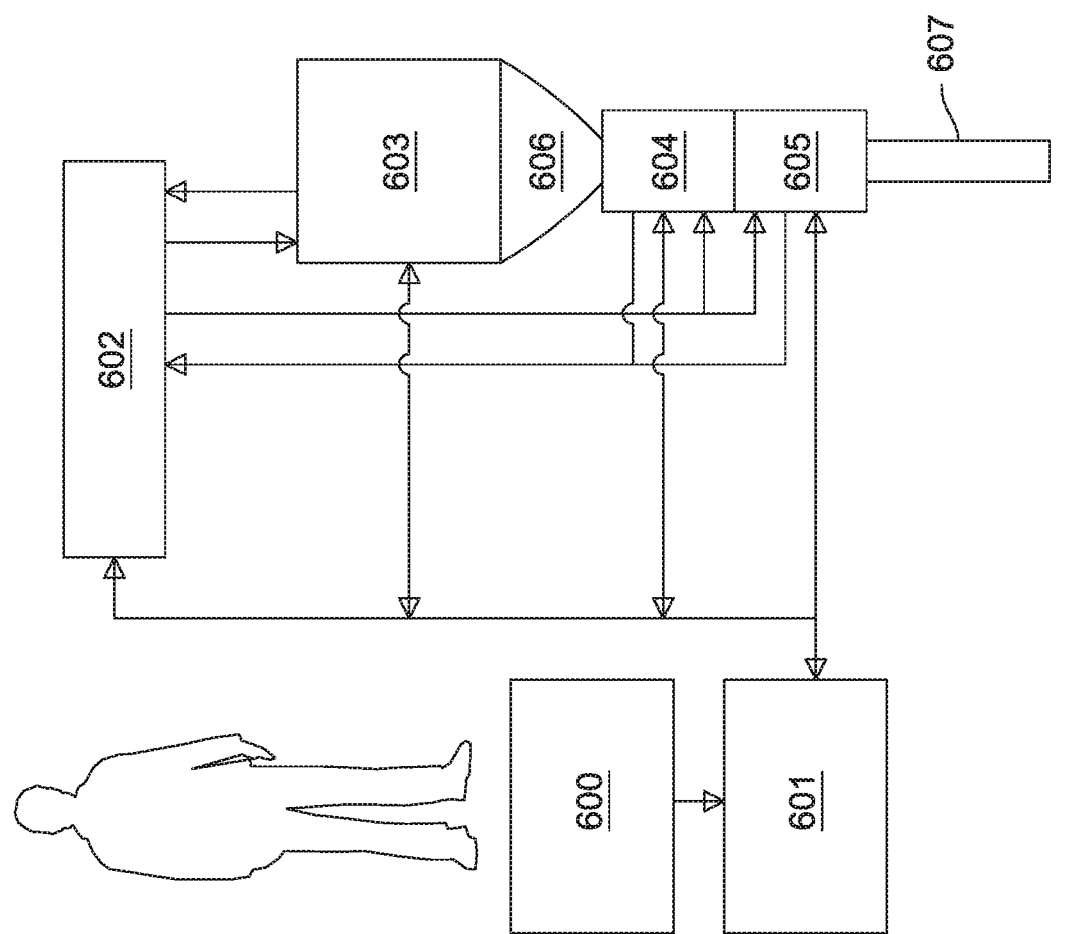
FIG. 38 is a block diagram illustrating a hybrid vehicle that employs an MGT unit, such as any of the MGT units illustrated by FIGS. 1 through 37B, in accordance with an example embodiment of the present disclosure.

FIG. 38 shows an implementation of the MGT unit in a hybrid vehicle (e.g., automobile, boat, or other transportation vehicle) where operator input 600 is supplied to the computer system 601 by a conventional vehicle component, such as a throttle, brake pedal, ignition switch, forward and reverse lever, or the like. An advantage of the MGT unit is that it has a neutral and many combinations of speed and power between neutral and full power and does not require a clutch interconnection 606 between it and the combustion engine 603 and is its own transmission. Also multiple MGT units may be joined together to greatly increase the available power as is shown in FIG. 38 (e.g., MGT units 604 and 605).

When the vehicle is operating under combustion power only, both MGT units 604 and 605 can be placed in neutral and the vehicle driven as any other vehicle on the road today except that either or both MGT units 604 and/or 605 may have their rotors moved from position 1 (neutral) to position 2 (e.g., as shown in FIG. 23) where trickle power is generated for recharging the batteries over long highway road trips and negligible power is taken from the combustion engine 603. If a full charge is needed more quickly, the rotor rings in MGT units 604 and/or MGT unit 605 may be advanced towards position 3 (e.g., as shown in FIG. 24) based on one or more commands from a computer system 601 (e.g., such as the MGT unit computer system 102 and/or MGT system computer described herein), where the need for battery reserves are balanced against the expense and availability of increased combustion fuel consumption and operator requirements/input. Also when under combustion power as the operator applies pressure to the brake pedal, the rotor rings in one or both MGT units 604 and 605 advance quickly towards position 3 generating electricity to recharge the batteries while applying braking force to the drive shaft commensurate with the amount of pressure applied to the brake pedal by the operator to stop the vehicle. This feature of the MGT surpasses any similar application in a hybrid electric vehicle by virtue of the fact that the permanent magnets in the MGT rotors may be larger than would be used in a conventional electric motor since the interaction of the magnetic field between the rotors and the stator may be varied between 0 and maximum value utilizing lower values when operated as a motor and higher in some cases when operated as a brake generating electricity. Also when the brakes are applied at high speed a significant amount of electricity could be generated in a short period of time and exceed the amperage capacity of the stator coil wires. When this occurs in the MGT units 604 and 605 their stator coils are switched to all parallel or a combination of series and parallel that will accommodate the sudden amperage increase. This is not possible in any conventional electric motor/generator.

In some applications, such as rapid transit, it may be desirable to have the combustion engine 603 providing power to the first MGT unit 604 acting as a generator which would be supplying power to charge the battery bank 602 and the second MGT unit 605 providing mechanical power to the drive wheels of the train. In such cases a clutch 606 would be installed between MGT units 604 and 605. MGT unit 604 serves as the generator and MGT unit 605 serves as the propulsion unit where at any point in time all three including the combustion engine 603 could be providing mechanical power to the drive shaft 607 to the drive wheels and at any point in time both units (MGT unit 604 and MGT unit 605) could be generating electricity to charge the batteries 602 while furnishing braking energy to stop the vehicle (e.g., a train).

In some applications, a hybrid vehicle may be equipped with a combustion engine that is very economical to operate but only of sufficient power to propel the vehicle at slow speed on level ground or higher speed on the interstate highway but insufficient for rapid acceleration or hill climbing. In such an application, the MGT unit is ideal in that it has a neutral and will draw no power when the combustion engine is operating in its most economical mode, but when stressed by the terrain or by additional pressure on the accelerator by the operator the central processor will activate one or more MGT units and move their rotors and switch their stator wires to supplement the power of the combustion engine with sufficient electromechanical power to meet the conditions or circumstances at hand. This same vehicle would also have the same battery recharge and braking features described above.

When the MGT units are used to propel the vehicle exclusive of the combustion engine they are highly efficient, more so than a conventional electric motor under variable speed and torque applications. Conventional electric motors are efficient under a very narrow range of speed and torque for which they were designed. High efficiency requires that the flow of flux or the interaction of the flux between the rotor and stator be balanced. A conventional electric motor can over a narrow range vary the voltage and amperage of the electricity in the stator coils and in the process change the strength of the stator magnetic field, but it cannot change the strength of the magnetic field of the rotors in a permanent magnet electric motor and only inefficiently in other AC electric motors. Thus, when the strength of the magnetic field of the stator in a conventional electric motor varies from its designed value it losses efficiency since it is not in balance with the magnetic field of the rotor. The disclosed MGT units can vary the magnetic flux from the rotors with that of the stators and further increase the variability of the stators by switching from all series to all parallel or combinations thereof in its stator coils, whereby the balance between the magnetic field of the rotor and the stator is maintained by commands from the computer system to move the rotor position, switch the stator wires between combinations of series and parallel and increase or decrease the voltage, amperage and frequency of the electricity flowing to the stator coils.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A propulsion system, comprising:
    a propulsion device;
    an engine to selectively power the propulsion device;
    a variable torque motor/generator/transmission to selectively power the propulsion device, the variable torque motor/generator/transmission comprising:
        a stator support extending longitudinally in a first direction, the stator support having a first stator and a second stator spaced apart from the first stator in the first direction;
        a rotor rotatably coupled with the stator support, the rotor having an axis of rotation and a longitudinal support structure extending in the first direction; and
        an interactive field element slidably coupled with the longitudinal support structure to translate along the longitudinal support structure parallel to its axis of rotation between a first orientation where the first stator is engaged with the interactive field element, a second orientation where the second stator is engaged with the interactive field element, and a third orientation where neither the first stator nor the second stator is engaged with the interactive field element;
    an energy storage device to store energy for powering the variable torque motor/generator/transmission; and
    a controller to selectively operate the propulsion system in a first mode where the variable torque motor/generator/transmission supplies power to the propulsion device, and a second mode where the engine supplies power to both the propulsion device and the variable torque motor/generator/transmission, wherein the variable torque motor/generator/transmission supplies energy for storage in the energy storage device when the propulsion system is operated in the second mode,
    wherein the variable torque motor/generator/transmission and the engine both supply power to the propulsion device in the first mode.

2. The propulsion system as recited in claim 1, wherein at least one of the first stator or the second stator comprises at least one of an outer ring or an inner ring with respect to the interactive field element.

3. The propulsion system as recited in claim 1, wherein the interactive field element comprises at least one of a permanent magnet or an electromagnet.

4. The propulsion system as recited in claim 1, wherein the first stator comprises a first wire winding having a first winding configuration and the second stator comprises a second wire winding having a second winding configuration different from the first winding configuration.

5. The propulsion system as recited in claim 1, wherein the longitudinal support structure comprises a central shaft with the first stator and the second stator of the stator support disposed around at least a portion of the central shaft.

6. The propulsion system as recited in claim 1, wherein the rotor is configured to couple with at least a second rotor of a second motor/generator/transmission to form a multi set motor/generator/transmission with a common axle formed by the rotor and the second rotor.

7. The propulsion system as recited in claim 1, further comprising at least a second interactive field element slidably coupled with the longitudinal support structure to translate along the longitudinal support structure parallel to its axis of rotation between the first stator engaged with the second interactive field element, the second stator engaged with the second interactive field element, and neither the first stator nor the second stator engaged with the second interactive field element.

8. The propulsion system as recited in claim 7, wherein the interactive field element and the second interactive field element are spaced apart from one another at a periphery of an outer surface of the rotor to form a ring.

9. The propulsion system as recited in claim 7, further comprising at least a third interactive field element slidably coupled with the longitudinal support structure to translate along the longitudinal support structure parallel to its axis of rotation between the first stator engaged with the third interactive field element, the second stator engaged with the third interactive field element, and neither the first stator nor the second stator engaged with the third interactive field element.

10. The propulsion system as recited in claim 9, wherein the interactive field element, the second interactive field element, and the third interactive field element are equally spaced apart from one another at a periphery of an outer surface of the rotor to form a ring.

11. The propulsion system as recited in claim 1, further comprising an actuator configured to move the interactive field element between the first orientation, the second orientation, and the third orientation.

12. The propulsion system as recited in claim 11, wherein the actuator comprises at least one of a solenoid, a linear motion screw, a pneumatic cylinder, or a hydraulic cylinder.

13. The propulsion system as recited in claim 1, wherein each of the first and second stators includes a ring of cores circumscribing a central stator axis that is coaxial with the axis of rotation of the rotor, wherein each phase of the ring of cores is wound with two or more non-twisted wires, in parallel with one another other, separated at a switchable center tap.

14. The propulsion system as recited in claim 13, further comprising:
    electronically controlled switches configured to selectively connect the two or more non-twisted wires in parallel or series.

15. The propulsion system as recited in claim 14, wherein the electronically controlled switches are configured to connect the two or more non-twisted wires of each phase all in parallel, producing a first torque/speed.

16. The propulsion system as recited in claim 14, wherein the electronically controlled switches are configured to connect the two or more non-twisted wires of each phase all in series, producing a second torque/speed.

17. The propulsion system as recited in claim 14, wherein the two or more non-twisted wires include multiple sets of two wires, wherein the electronically controlled switches are configured to connect the two wires of each set in parallel and are configured to connect the multiple sets in series with one another, producing a third torque/speed different from all parallel and all series configurations of the two or more non-twisted wires.

18. The propulsion system as recited in claim 14, wherein the two or more non-twisted wires include multiple sets of three wires, wherein the electronically controlled switches are configured to connect the three wires of each set in parallel and are configured to connect the multiple sets in series with one another, producing a fourth torque/speed different from all parallel and all series configurations of the two or more non-twisted wires.

19. The propulsion system as recited in claim 1, wherein the propulsion system comprises a hybrid propulsion system.

20. The propulsion system as recited in claim 1, wherein the engine comprises at least one of an internal combustion engine or a battery.

* * * * *